US006349252B1

(12) United States Patent
Imanishi et al.

(10) Patent No.: US 6,349,252 B1
(45) Date of Patent: Feb. 19, 2002

(54) INFORMATION MANAGEMENT DEVICE FOR CONSTRUCTION MACHINERY

(75) Inventors: Kunihiko Imanishi, Hirakata; Noritaka Nagata, Hiratsuka; Jin Yogita, Hirakata; Hideaki Saito, Oyama; Haruo Hashimoto, Kamakura, all of (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 09/549,688

(22) Filed: Apr. 14, 2000

(30) Foreign Application Priority Data

Apr. 15, 1999 (JP) ........................................ 11-108196

(51) Int. Cl.[7] ............................ E02F 9/00; H04Q 9/00; G08C 15/00

(52) U.S. Cl. ........................................ 701/50; 701/29

(58) Field of Search ............................ 701/29, 30, 33, 701/35, 50; 340/457.4

(56) References Cited

U.S. PATENT DOCUMENTS

| | | | | | |
|---|---|---|---|---|---|
| 4,748,843 | A | | 6/1988 | Schafer et al. | |
| 4,760,275 | A | | 7/1988 | Sato et al. | |
| 5,318,449 | A | * | 6/1994 | Schoell et al. | 434/305 |
| 5,325,082 | A | * | 6/1994 | Rodriguez | 340/438 |
| 5,347,260 | A | | 9/1994 | Ginzel et al. | |
| 5,400,018 | A | | 3/1995 | Scholl et al. | |
| 5,857,159 | A | | 1/1999 | Dickrell et al. | |
| 5,968,107 | A | * | 10/1999 | Vogan et al. | 701/102 |
| 5,995,886 | A | * | 11/1999 | Tanaka et al. | 701/30 |
| 6,073,063 | A | * | 6/2000 | Leong Ong et al. | 701/35 |
| 6,085,154 | A | * | 7/2000 | Leuthausser et al. | 702/34 |
| 6,189,057 | B1 | * | 2/2001 | Schwanz et al. | 710/72 |

FOREIGN PATENT DOCUMENTS

| | | |
|---|---|---|
| JP | 4117896 | 4/1992 |
| JP | 4353131 | 12/1992 |
| JP | 6-10748 | 1/1994 |
| JP | 6116988 | 4/1994 |
| JP | 6330539 | 11/1994 |
| JP | 7-30977 | 1/1995 |
| JP | 8201152 | 8/1996 |
| JP | 8333777 | 12/1996 |
| JP | 10168946 | 6/1998 |
| JP | 10168947 | 6/1998 |
| JP | 10283518 | 10/1998 |
| JP | 11-24744 | 1/1999 |

* cited by examiner

*Primary Examiner*—Michael J. Zanelli
*Assistant Examiner*—Eric M Gibson
(74) *Attorney, Agent, or Firm*—Varndell & Varndell, PLLC

(57) ABSTRACT

A plurality of on-board controllers are provided within a construction machine. The plurality of on-board controllers are connected with freedom to communicate with each other by means of a serial communications line allowing communications in accordance with a predetermined communications protocol. Also, an information management controller which manages information about the inside of the construction machine is provided. Further, a monitoring station which mmanages information relating to at least one construction machine including the construction machine is provided on the outside of the construction machine. Also, the serial communications line inside the construction machine and the monitoring station are connected with freedom to communicate with each other via the information management controller. Data acquired by the plurality of on-board controllers is gathered, processed and stored by the information management controller, and the stored data is sent to the monitoring station. In this way, detailed information obtained by collating data gathered by each of the different controllers in the construction machine can be easily acquired without the need for complicated communications processing.

8 Claims, 38 Drawing Sheets

| PRODUCT QUALITY INDEX | MAIN SUBJECT PARTS |
|---|---|
| (1) MECHANICAL STRESS : HIGH CYCLE FATIGUE | · CON RODS<br>· CRANK SHAFTS<br>· INJECTION SYSTEMS |
| (2) THERMAL STRESS : LOW CYCLE FATIGUE | · EXHAUST VALVES<br>· EXHAUST MANIFOLDS<br>· PISTON HEADS |
| (3) ABRASION : RUNNING CONDITIONS | · MOVING VALVE SYSTEMS<br>· PISTON RINGS<br>· SUCTION VALVES |

FIG.5

| CATEGORY | | EXAMPLE OF APPLICATION | | MONITORING ITEMS | | |
|---|---|---|---|---|---|---|
| | | PART PT | SITE | LOAD FREQUENCY MAP $M_1$ | CYCLE TIME $M_2$ | LOAD FREQUENCY MAP $M_3$ |
| FATIGUE DUE TO MECHANICAL STRESS (HIGH-CYCLE FATIGUE) (1) | PT1 | CRANKSHAFT | JOURNAL FILLET PART CRACKING (BENDING FATIGUE) | ○ | | |
| | | PISTON | PIN BOSS PART CRACKING (HIGH-TEMPERATURE FATIGUE) | ○ | | |
| | | EXHAUST VALVE | NECK BENDING DAMAGE (HIGH-TEMPERATURE FATIGUE) | ○ | | |
| | | | | | | |
| FATIGUE DUE TO THERMAL STRESS (LOW-CYCLE FATIGUE) (2) | PT2 | PISTON | COMBUSTION CHAMBER RIM CRACKING (THERMAL FATIGUE) | | ○ | ○ |
| | | EXHAUST VALVE | LOSS OF BRIM (THERMAL FATIGUE) | | ○ | ○ |
| | | EXHAUST MANIFOLD | SURFACE CRACKING (THERMAL FATIGUE) | | ○ | ○ |
| | | | | | | |
| ABRASION (3) | PT3 | PISTON | RING GROOVE | ○ | | |
| | | PISTON RING | OUTER CIRCUMFERENTIAL PART | ○ | | |
| | | CYLINDER LINER | INNER CIRCUMFERENTIAL PART | ○ | | |
| | | MAIN METAL | JOURNAL SURFACE | ○ | | |
| | | PIN METAL | JOURNAL SURFACE | ○ | | |
| | | CON ROD | SMALL END BUSH INNER DIAMETER | ○ | | |
| | | CAM SHAFT | CAM HEIGHT | ○ | | |
| | | VALVE | SEAT SURFACE, STEM DIAMETER | ○ | | |
| | | VALVE SEAT | SEAT SURFACE | ○ | | |
| | | VALVE GUIDE | INNER DIAMETER | ○ | | |
| | | | | | | |

FIG.6 n'ij Bij

ENGINE ROTATION SPEED Ne →

TORQUE Ti ↓

| | 0~1300 | ~1450 | ~1650 | ~1750 | ~1850 | ~1900 | ~1950 | ~2000 | ~2050 | ~2100 | ~2150 | ~2250 | ~2350 | ~2450 | ~2550 | ~2650 | ~2800 |
|---|---|---|---|---|---|---|---|---|---|---|---|---|---|---|---|---|---|
| 0~50 | 13.5 | 0.1 | 0.1 | 0.0 | 0.2 | 0.0 | 9.3 | 1.1 | 0.0 | 0.0 | 0.0 | 0.0 | 0.0 | 0.0 | 0.0 | 0.0 | 0.0 |
| ~100 | 1.1 | 0.0 | 0.1 | 0.0 | 0.0 | 23.7 | 12.2 | 0.0 | 0.0 | 0.0 | 0.0 | 0.0 | 0.0 | 0.0 | 0.0 | 0.0 | 0.0 |
| ~150 | 0.2 | 0.0 | 0.0 | 0.0 | 12.4 | 17.8 | 0.0 | 0.0 | 0.0 | 0.0 | 0.0 | 0.0 | 0.0 | 0.0 | 0.0 | 0.0 | 0.0 |
| ~200 | 0.3 | 0.7 | 0.2 | 0.3 | 6.6 | 0.0 | 0.0 | 0.0 | 0.0 | 0.0 | 0.0 | 0.0 | 0.0 | 0.0 | 0.0 | 0.0 | 0.0 |
| ~250 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| ~300 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| ~350 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| ~400 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

→TOTAL 100%

FIG.11

| ROTATION VARIATION RANGE ΔNei | Bij DWELL TIME Δτ1 SHORT (5sec) | DWELL TIME Δτ2 LONG (20sec) |
|---|---|---|
| 0-200 | niJ | |
| 201-400 | | |
| 401-600 | | |
| 601-800 | | |
| 801-1000 | | |
| 1001-1200 | | |
| 1201-1400 | | |
| 1401-1600 | | |

→ j

| DIRECTION Ui | Bij DWELL TIME $\Delta\tau_1$ SHORT (5sec) | DWELL TIME $\Delta\tau_2$ LONG (20sec) |
|---|---|---|
| $A_1$ TO $A_2$ | nij | |
| $A_2$ TO $A_1$ | | |
| $A_1$ TO $A_3$ | | |
| $A_3$ TO $A_1$ | | |
| $A_1$ TO $A_4$ | | |
| $A_4$ TO $A_1$ | | |
| $A_2$ TO $A_3$ | | |
| | | |

↓ i

Bij → j

| | REGION Ai | | | |
|---|---|---|---|---|
| CONTINUOUS RUNNING TIME CATEGORY $\Delta\tau_1$ | $A_1$ | $A_2$ | $A_3$ | $A_4$ |
| 5 ~ 10 sec | nij | | | |
| 10 ~ 20 sec | | | | |
| 20 sec ~ | | | | |

↓ i

| | Tm(kgm) | OVERHAUL TIME |
|---|---|---|
| LIFESPAN S RANK | 28 ~ 31 | 8,000 ~ 10,000 |
| A RANK | 25 ~ 28 | 10,000 ~ 12,000 |
| B RANK | 23 ~ 25 | 12,000 ~ 14,000 |
| C RANK | 23 OR LESS | 14,000 ~ 18,000 |

FIG.21

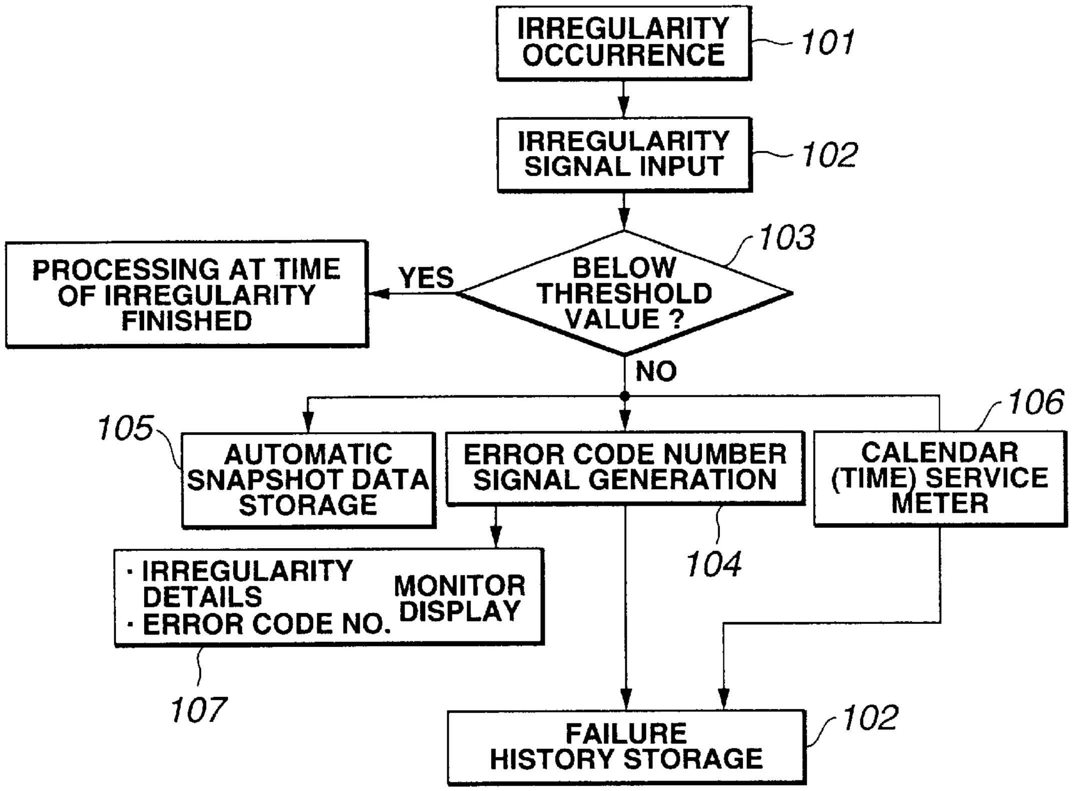
FIG.42(a)
FIG.42(b)
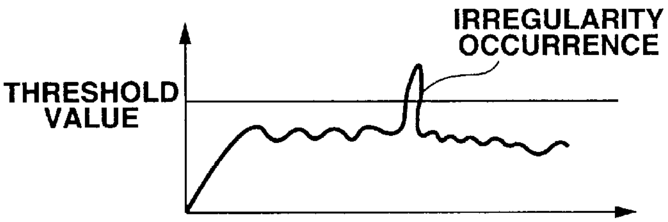
FIG.42(c)
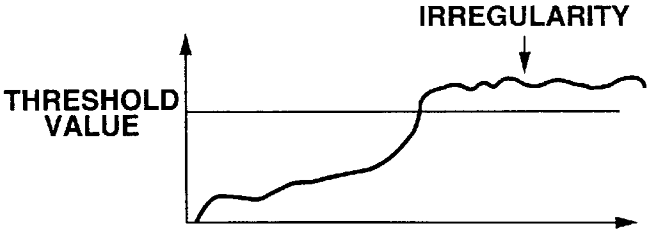

| ERROR CODE | SERVICE METER VALUE | DATE AND TIME OF OCCURRENCE | RECTIFICATION SERVICE METER VALUE | RECTIFICATION COMPLETED DATE AND TIME | CONFIRMATION | ERROR MESSAGE |
|---|---|---|---|---|---|---|
| E883 | 210.0 | 11/20/1998 11 : 46 : 01 | 210.0 | 11/20/1998 11 : 46 : 04 | 1 | Low engine oil pressure (F) |
| E012 | 210.0 | 11/20/1998 11 : 46 : 02 | 210.0 | 11/20/1998 11 : 46 : 04 | 1 | Caution for Change voltage lower (F) |
| E884 | 210.0 | 11/20/1998 11 : 51 : 04 | 210.0 | 11/20/1998 11 : 51 : 05 | 1 | Low engine oil pressure (R) |
| E012 | 210.0 | 11/20/1998 11 : 52 : 08 | 210.0 | 11/20/1998 11 : 52 : 11 | 1 | Caution for Change voltage lower (F) |
| E062 | 210.0 | 11/20/1998 11 : 52 : 09 | 210.0 | 11/20/1998 11 : 52 : 10 | 1 | Caution for Change voltage lower (R) |
| E883 | 210.0 | 11/20/1998 11 : 52 : 09 | 210.0 | 11/20/1998 11 : 52 : 12 | 1 | Low engine oil pressure (F) |
| E883 | 211.0 | 11/20/1998 11 : 54 : 11 | 211.0 | 11/20/1998 11 : 54 : 12 | 1 | Low engine oil pressure (F) |
| E884 | 211.0 | 11/20/1998 11 : 54 : 49 | 211.0 | 11/20/1998 11 : 54 : 12 | 1 | Low engine oil pressure (R) |
| E062 | 211.0 | 11/20/1998 11 : 54 : 50 | 211.0 | 11/20/1998 11 : 54 : 51 | 1 | Caution for Change voltage lower (R) |
| E884 | 211.0 | 11/20/1998 11 : 55 : 44 | 211.0 | 11/20/1998 11 : 54 : 53 | 1 | Low engine oil pressure (R) |

FIG.43

| | ENGINE OIL | ENGINE OIL FILTER | H FILTER | D FILTER | FUEL FILTER | |
|---|---|---|---|---|---|---|
| REFERENCE INTERVAL | 250 | 250 | 250 | 250 | 500 | |
| SET INTERVAL | 250 | 250 | 250 | 250 | 500 | |
| 1ST TIME | 200 | 290 | 0 | 0 | 0 | |
| 2ND TIME | 230 | 230 | 0 | 0 | 0 | |
| 3RD TIME | 0 | 0 | 0 | 0 | 0 | |
| 4TH TIME | 0 | 0 | 0 | 0 | 0 | |
| | | | | | | |

INFORMATION MANAGEMENT DEVICE FOR CONSTRUCTION MACHINERY

BACKGROUND OF THE INVENTION

1. Field of the Invention

The present invention relates to an information management device for construction machinery which manages data such as the lifespan of parts and the replacement timing of parts comprised in the construction machinery, and the work volume, the operating state and irregularities such as failures of construction machinery, which it does by gathering data about the inside of the body of the construction machinery.

2. Description of the Related Art

Data such as that of the service meter, the amount of fuel and the rotational speed of the engine of construction machinery are necessary information in managing vehicles.

Conventional methods of acquiring data relating to construction machinery of this type have entailed a member of maintenance staff (a service man) going out to an item of construction machinery, and either checking it visually or connecting a personal computer to the item of construction machinery and thereby downloading data relating to the item of construction machinery which was written into a memory within the item of construction machinery. Also, a plurality of items of construction machinery have been managed by storing and holding data gathered from a plurality of items of construction machinery in the memory of a computer in a monitoring station (management unit).

However, the gathering of information requires human intervention and, as the number of items of construction machinery becomes greater, data gathering becomes more troublesome and there is a substantial loss of information-gathering work efficiency.

Thus, as seen from Japanese Patent Application Laid-open (Kokai) No. 6-330539 and elsewhere, there have been attempts to acquire construction-machinery information automatically using a communications means and without relying on human intervention.

In the abovementioned invention, the management unit and the construction machinery are connected with freedom to communicate two-ways using communications means, and data requests are sent from the management unit, the data is extracted by the construction machinery and sent back to the management unit. In this way, information acquired within the construction machinery is gathered by the management unit which made the request. In the abovementioned Japanese Patent Application Laid-open No. 6-330539, a single running controller is provided within the construction machinery, data acquired by this single running controller is stored in a storage unit of the running controller, and the stored data is sent to the management unit.

However, in recent years a plurality of controllers have been provided in each of the constituent elements, such as engines and hydraulic pumps, within construction machinery. Japanese Patent Publication No. 8-28911 discloses an invention in which data is sent and received by various controllers by connecting a plurality of controllers by means of a serial communications line and transmitting frame signals over the serial communications line.

When the invention disclosed in the abovementioned Japanese Patent Application Laid-open No. 6-330539 is employed in construction machinery provided with a plurality of controllers, data respectively acquired from the plurality of controllers has to be stored in storage units provided for each of the controllers, and the data has to be sent to the management unit, each controller separately. Because it has to be sent separately for each controller, communications processing is complicated.

Further, Japanese Patent Application Laid-open No. 7-30977 discloses an invention in which a personal computer is connected inside construction machinery, data such as error information acquired and stored separately for each of a plurality of controllers within the construction machinery is downloaded and is stored in a storage medium of the personal computer.

Because this invention also requires the information of separate controllers to be downloaded, communications processing is complicated.

Also, the technology of the prior art entails no more than the gathering of data of separate controllers by a management unit or personal computer. There is therefore a requirement to acquire more detailed information about construction machinery by collating the data gathered by the separate controllers within the construction machinery. However, simply gathering the data of separate controllers in a management unit or personal computer does not allow the acquisition of more detailed information resulting from the collation of data gathered by separate controllers.

The present invention has taken this situation into account and has a first aim of allowing the acquisition of detailed information resulting from the collation of data gathered by separate controllers within construction machinery, in a simple fashion without requiring complicated communications processing.

It will be appreciated that construction machinery has different types of controllers, acting as on-board electronic control devices, depending on factors such as the type of machine, the grade of vehicle and the delivery destination.

For this reason, there are situations where some controllers can send and receive frame signals in accordance with a predetermined communications protocol, while other controllers are unable to send and receive frame signals in accordance with the abovementioned predetermined communications protocol.

In situations where a plurality controllers having different communications protocol specifications coexist within construction machinery, serial communications between controllers are essentially impossible.

In the past, therefore, data has been sent and received between controllers using the arrangement shown in FIG. 4.

As shown in the FIG. 4, a pump controller 3 and a monitor (display controller) 4 are provided within the cab (operating compartment) of an item of construction machinery.

The pump controller 3 is connected to various sensor groups 23 and actuator groups 33, receives input in the form of various detection signals such as signals indicating the operating position of an operating lever, and outputs various drive signals to, by way of example, an inclined-plate-drive actuator which drives the inclined plate of a hydraulic pump. The monitor 4 is a controller provided with a display screen and various switches, and operating a switch makes a selection and gives an instruction for the desired work mode among various forms of work which the construction machine performs, and information required for running is displayed on the display screen.

The pump controller 3 and monitor 4 are connected by means of a serial communications line 11 which effects communications in accordance with a predetermined communications protocol A, and data is exchanged between the pump controller 3 and monitor 4 by transmitting frame signals over the serial communications line 11. Thus, the display screen of the monitor 4 displays details of data to be output to the actuator group 33 or detected by the sensor group 23 connected to the pump controller 3.

On the other hand, an engine controller 5 is provided outside the cab of the construction machine.

The engine controller 5 is connected to various sensor groups 25 and actuator groups 35, and receives input in the form of various detection signals such as a first throttle signal SD indicating the position of a throttle operated and set by a fuel dial (target engine rotational speed setting means) 40, and outputs various drive signals to, by way of example, a fuel-supply actuator (such as a motor which drives a governor) which supplies fuel to the engine.

The engine controller 5 is a controller with a specification allowing serial communications in accordance with a communications protocol B which is different to the abovementioned communications protocol A.

Thus, two-way serial communications cannot take place directly between the pump controller 3 and the engine controller 5.

For this reason, signals lines are provided in parallel for each type of signal between the pump controller 3 and the engine controller 5, and data is exchanged by parallel communications. Signals lines therefore have to be provided to a number which corresponds to the number of types of signal. Moreover, types of data are restricted to types which are input and output as ON and OFF signals, or transmitted as analog signals between the controllers 3 and 4.

Because there are limits on the input and output of data in this way, only the minimum required data is exchanged between the pump controller 3 and the engine controller 5.

More specifically, the abovementioned first throttle signal SD is input to the A/D input terminal of the engine controller 5 and is input to the A/D input terminal of the pump controller 3 via the signals line 92.

Also, a second throttle signal is transmitted from the D/A output terminal of the pump controller 3 to the A/D input terminal of the engine controller 5 via the signal line 91. "Second throttle signal" refers to an engine rotation command signal which is produced in accordance with data acquired by the pump controller 3 and is supplied to the engine controller 5, such as an automatic deceleration signal, overheat signal or automatic warm signal. By way of example, an "automatic deceleration signal" is an engine rotation command signal which gives an instruction to reduce the rotational speed of the engine to a lower rotational speed when the operating lever is in the neutral position.

In the engine controller 5 the first throttle signal SD and the second throttle signal are compared, and the driving of the abovementioned fuel-supply actuator is controlled in accordance with the throttle signal indicating the lower value (the one with the lower target engine rotational speed).

In contrast, there is no signal line connection between the engine I and the monitor 4.

In cases where irregularity (failure) data relating to the engine has been acquired by the engine controller 5, for example in cases where an irregularity has occurred such as an irregular increase in the rotational speed of the engine or an irregular increase in the temperature of the coolant water, a corresponding light in a caution-light group 16 located separately to the monitor 4 is lit up via a caution signal line 17.

Thus the operator can ascertain the details of cautions relating to engine irregularities by the way in which the caution-light group 16 lights up. However, the operator is not always able to see the engine operating state on the display screen of the monitor 4.

Further, even though the status of the hydraulic pump is displayed on the display screen of the monitor 4, the status of the engine is not displayed and it is therefore not possible to manage, as a whole, information relating to all of the equipment within the construction machine.

In addition, a signals line 17 dedicated to the caution-light group 16 also then has to be provided. This therefore leads to increased harnesses and an increase in the number of parts, and to an increase in costs.

In addition, because data cannot be sent directly from the monitor 4 to the engine controller 5 and only limited analog data (second throttle signal) can be sent from the pump controller 3, there is the problem that the precision of engine control is poor.

The present invention has taken this situation into account and, in addition to its first aim discussed above, has a second aim of improving the precision of control of various items of equipment such as the engine, and not causing an increase in the number of signals lines (harnesses), by allowing serial communications between various controllers, even in construction machines in which controllers having different communications protocol specifications coexist.

It will be appreciated that accurately predicting the timing of engine overhaul is extremely important when checking and maintenance servicing construction machinery.

This is because, if the overhaul timing can be accurately predicted, major setbacks such as excessive age related deterioration of the engine can be prevented by upkeep carried out at appropriate timing. Further, if the overhaul timing can be accurately predicted, maintenance can be planned. More specifically, there are advantages in that, inter alia, production plans such as vehicle-allocation plans can be accurately formulated, parts needed for overhaul can be provided in readiness at requisite times, and management of maintenance staff is facilitated.

However, where construction machinery is concerned, there are major differences of operating environment and, depending on the ways in which individual users handle it, operating regime, and even identical models of engine on identical types of machine can differ widely in terms of the timings with which they will need to be overhauled, and the overhaul timing for an engine cannot be set down using a single rule.

Consequently, there is a requirement to accurately predict the respective overhaul timings, which is to say the engine life, for individual construction machines and individual engines.

Engine life is believed to be determined according to the amount of damage inflicted on the engine up until that time, which is to say the accumulation of loads imposed on the engine.

However, in practice it is difficult to place a numerical value on the amount of damage inflicted on an engine, and hitherto there have been attempts to place a value on the amount of damage inflicted on the engine, indirectly from the operating regime of the engine on occasion.

More specifically, hitherto, the operating regime of the engine has been recorded periodically using a service tool, and a decision has been made that it is time for an overhaul by comparing this with a previously established threshold value. For example, it has been the case that the valve clearance is actually measured and the measured value is compared with a threshold value given by a shop manual, and a decision is made that it is time for an overhaul once the measured value exceeds the threshold value. Further, it has been the case that engine noise is carefully listened to, and a decision is made that it is time for an overhaul if an unusual noise emerges.

However, this occasional operating regime of the engine is not necessarily an accurate indication of the amount of damage inflicted on the engine to date, and even the decision as to whether it is time for an overhaul relies to a considerable extent on the skill and experience of the maintenance staff. It is therefore difficult to claim that predicting the timing of an overhaul is always accurately done.

Further, it is not just this occasional operating regime of the engine that has been attempted, but also gathering engine data (e.g. engine horsepower) over a long period and deciding on the overhaul timing from changes in this engine data over time.

However, it is difficult to decide on the lifespan of the engine by using such time-related data to place a numerical value on the amount of damage actually inflicted on the engine. More specifically, if an engine is continuously run under a constant load (e.g. if it is always run at its rating point) the amount of damage increases in proportion to time and the amount of damage can be relatively easily predicted, but it is difficult to place a numerical value on the amount of damage in cases where the engine load varies over the course of time. Thus the decision as to whether it is time for an overhaul perforce lies with the skill and experience of the maintenance staff.

In addition, Japanese Patent Application Laid-open No. 6-10748 discloses an invention in which the amount of damage actually inflicted on the engine is determined and converted into a numerical value from a computational formula, and a decision is taken about the overhaul time by comparing the amount of damage so determined with a reference value (a threshold value for deciding if it is time for an overhaul).

In the invention a computational formula is used to determine the ratio between the amount of fuel consumed at a rating point on the engine torque curve and the amount of fuel actually consumed for various predetermined running times, and the amount of damage inflicted on the engine is converted into a numerical value using this ratio.

However, if one attempts to overhaul an engine in accordance with the decision process of the prior art discussed above, it frequently happens that there is actually an adequate remaining life. Conversely, damage can be caused to the engine if the engine continues to operate without an overhaul following a decision that it is not time for an overhaul. Thus the present situation is that the prior art has a low hit rate in predicting the lives of engines.

Conventional methods of predicting overhaul timing are therefore lacking in accuracy since they differ depending on the level of skill of the maintenance staff.

There have also been attempts to place a numerical value on the amount of damage but these involve making a decision by indiscriminately placing a numerical value on the amount of damage to the engine as a whole and are lacking in accuracy. More specifically, when one considers the constituent parts of an engine, there are, for example, some parts which are susceptible to rotational variations (parts where abrasion is liable to proceed apace) and some parts which are strongly resistant to substantial rotational variations (parts where abrasion is not liable to proceed apace), and different types of part have different lifespans. One cannot, therefore, indiscriminately place a numerical value on the amount of damage to the engine as a whole.

The present invention has taken this situation into account and has a third aim of allowing automatic and accurate prediction of the lifespan of an engine, without requiring any skill, by accurately placing a numerical value on the amount of damage inflicted on the engine.

Similarly to engines, it is also difficult to predict the timing for overhaul and repair of hydraulic pumps or hydraulic motors ("hydraulic pumps and the like" hereinbelow) which are activated by an engine.

In a method currently employed, the time for overhaul of hydraulic pumps and the like is set in advance as an experience-related numerical value such as 10,000 hours, and an overhaul is undertaken at the time when the value on the service meter of the engine reaches the abovementioned overhaul time.

However, when one attempts to overhaul hydraulic pumps and the like using the abovementioned method, it frequently happens that there has actually been no major deterioration of constituent parts and there is adequate remaining life. This is to say that unnecessary disassembly and checking undertaken by the maintenance staff results in economic losses. Conversely, damage can be caused to hydraulic pumps and the like if a hydraulic pump or the like continues to work without an overhaul following a decision that it is not time for an overhaul. Hydraulic pumps and the like comprise high-cost parts and thus there are substantial economic losses if they are damaged.

Thus the present situation is that the prior art has a low hit rate in predicting the lives of hydraulic pumps and the like. Further, the life of the hydraulic pump or the like as a whole has been set indiscriminately and there has been a lack of accuracy. This is to say, when one considers the constituent parts of hydraulic pumps and the like, there are, for example, some parts which are greatly affected by the engine load and some parts which are greatly affected by the oil temperature, and different factors affect the lifespans of different types of part. One cannot, therefore, indiscriminately set the lifespan of a hydraulic pump or the like as a whole.

The present invention has taken this situation into account and has a fourth aim of allowing automatic and accurate prediction of the lifespan of a hydraulic pump or hydraulic motor.

It will be appreciated that, in locations involving work over a wide area such as mines, a hydraulic shovel performs loading work whereby excavated earth and sand or the like is loaded onto a dump truck.

It is extremely important, in terms of establishing a production management plan, that monitoring stations, which manage and monitor locations involving work over a wide area, acquire management information in the form of the work volumes of a plurality of hydraulic shovels during operation.

The work volume V per hour ($m^3/h$) of a hydraulic shovel is determined theoretically by means of the following Formula (1).

$$V=Qv\cdot(3600/St)\cdot\alpha\cdot(1/\beta) \quad (1)$$

Where Qv is the bucket volume ($m^3$), St is the cycle time (sec) for the loading work, $\alpha$ is the operating percentage and $\beta$ is the constituent percentage of loading.

Here, the abovementioned operating percentage a and constituent percentage of loading $\beta$ are calculated based on operator reports. More specifically, when one day's work is finished, the operator of the hydraulic shovel makes a record in a day log of the additional time on the service meter for the day. The service meter is an instrument in which the operating time of the engine is added up. Similarly, the operator of the dump truck makes a record in a day log of the volume of earth and sand loaded over the day and the number of times dumping was performed. Then the data recorded in the day logs is collated, the operating percentage $\alpha$ and $\beta$ are calculated, and the work volume V per hour is determined.

However, it often happens that the value of the abovementioned work volume V is inaccurate since it relies on records made by operators. Moreover, because the work volume V is determined from a value obtained by adding together the operating times of the engine, an accurate operating percentage $\alpha$ will not be obtained and the work volume V cannot be accurately calculated in cases involving working conditions where there is a long engine-warm time (dump-waiting time) and a commensurately shorter time over which the working machine operates.

The present invention has taken this situation into account and has a fifth aim of precisely acquiring the work volume V of a construction machine by automatically and accurately determining the accurate operating percentage a under any working conditions.

Further, in the method of calculating the work volume V discussed above, because the work volume V is determined from a value obtained by adding together the operating times of the engine, an accurate constituent percentage of loading $\beta$ will not be obtained and the work volume V cannot be accurately calculated in cases involving working conditions where, for example, there is a long traveling time, and a commensurately shorter time over which the working machine is used to actually load earth and sand.

The present invention has taken this situation into account and has a sixth aim of precisely acquiring the work volume V of a construction machine by automatically and accurately determining the accurate constituent percentage of loading $\beta$ under any working conditions.

It will be noted that the construction machine comprises a service meter in which the operating times of a normal engine are added up. Conventionally the added value on the service meter is gathered every day, an operating map showing the engine operating time as a bar chart is compiled every day at the monitoring station, and the operating state of the hydraulic shovel is ascertained.

However, because the operating map is no more than a map simply showing the time over which the engine has been operating, one cannot ascertain from the abovementioned operating map if one is looking at stand-by time when the engine is not actually being operated even though the engine key switch has been turned on, or even if one is looking at warm time (dump-wait time) when the working machine, such as a boom, is not actually operating even though the engine is operating.

The present invention has taken this situation into account and has a seventh aim of making it possible to more accurately ascertain the operating state of construction machinery.

SUMMARY OF THE INVENTION

In order to achieve the abovementioned first aim, a first aspect of the present invention is featured by an information management device for a construction machine, in which a plurality of on-board controllers in the construction machine are connected with freedom to communicate with each other by means of a serial communications line allowing communications in accordance with a predetermined communications protocol, and information relating to the construction machine is managed based on data acquired by each of the plurality of on-board controllers, wherein the information management device is arranged in such a way that on an inside of the construction machine is provided an information management controller which manages information about the inside of the construction machine, and on an outside of the construction machine is provided a monitoring station which manages information relating to at least one construction machine including the construction machine;

the serial communications line within the construction machine and the monitoring station are connected with freedom to communicate with each other via the information management controller; and the information management controller gathers, processes and stores data acquired by each of the plurality of on-board controllers, and sends the stored data to the monitoring station.

The first aspect of the invention is described with reference to FIG. 1.

Provided on the inside of a construction machine are a plurality of on-board controllers 6, 7 and 4. The plurality of on-board controllers 6, 7 and 4 are connected with freedom to communicate with each other by means of a serial communications line 11 allowing communications in accordance with a predetermined communications protocol.

An information management controller 1 which manages information about the inside of the construction machine is also provided. Further, outside of the construction machine is provided a monitoring station 19 which manages information relating to at least one construction machine including the construction machine.

Also, the serial communications line 11 within the construction machine and the monitoring station 19 are connected with freedom to communicate with each other via the information management controller 1.

Data acquired by each of the plurality of on-board controllers 6, 7 and 4 is gathered, processed and stored in the information management controller 1. Also, the stored data is sent to the monitoring station 19.

Consequently, in contrast to the situation when the invention of the abovementioned Japanese Patent Application Laid-open No. 6-330539 is employed, there is no need for complicated communications processing in which data respectively acquired by the plurality of controllers 6, 7 and 4 is stored on storage units provided for each of the controllers 6, 7, and 4, and the data to the monitoring station 19 has to be sent separately for each controller 6, 7 and 4. This is to say, there is the advantage that it is sufficient to perform simple communications processing in which data stored in the information management controller 1 is collectively sent to the monitoring station 19.

In addition, the information management controller 1 gathers the data of each of the on-board controllers 6, 7 and 4, and stores data obtained by collating and processing the data of each of the on-board controllers 6, 7 and 4. Thus the information management controller 1 stores detailed information relating to the construction machine, obtained by collating the data of each of the on-board controllers 6, 7 and 4 within the construction machine. To illustrate the point using fuel volume and a service meter value by way of example, when the prior art is employed one can only acquire individual data for fuel volume and the service meter value respectively. However, when the present invention is employed, the relationship between the engine operating time and fuel consumption can be acquired as monitoring information by collating fuel-volume data and service-meter-value data and carrying out data processing.

Therefore, if the data stored in the information management controller 1 is collectively sent to the monitoring station 19, the abovementioned detailed information relating to the construction machine can be easily acquired in the monitoring station 19. In the monitoring station 19, there is no need to carry out processing in which data relating to one construction machine is first reprocessed in order to produce detailed information.

There is therefore the advantage that information relating to one or a plurality of construction machines can be managed extremely efficiently in the monitoring station 19.

Further, in order to achieve the abovementioned first aim, a second aspect of the invention is featured by an information management device for a construction machine, in which a plurality of on-board controllers in the construction machine are connected with freedom to communicate with each other by means of a serial communications line allowing communications in accordance with a predetermined communications protocol, and information relating to the construction machine is managed based on data acquired by each of the plurality of on-board controllers, wherein the information management device is arranged in such a way that on an inside of the construction machine is provided an information management controller which manages information about the inside of the construction machine, and on an outside of the construction machine is provided an information gathering means which gathers information about the inside of the construction machine and stores it on a storage medium;

the serial communications line within the construction machine and the information gathering means are connected with freedom to communicate with each other via the information management controller; and the information management controller gathers, processes and stores data acquired by each of the plurality of on-board controllers, and sends the stored data to the information gathering means.

The second aspect of the invention is described with reference to FIG. 1.

Provided on the inside of a construction machine are a plurality of on-board controllers 6, 7 and 4. The plurality of on-board controllers 6, 7 and 4 are connected with freedom to communicate with each other by means of a serial communications fine 11 allowing communications in accordance with a predetermined communications protocol.

An information management controller 1 which manages information about the inside of the construction machine is also provided. Further, outside of the construction machine is provided a data gathering means 18 (personal computer, IC card writer) which gathers information about the inside of the construction machine and stores it on a storage medium.

Also, the serial communications line 11 within the construction machine and the information gathering means 18 are connected with freedom to communicate with each other via the information management controller 1.

Data acquired by each of the plurality of on-board controllers 6, 7 and 4 is gathered, processed and stored in the information management controller 1. Also, the stored data is sent to the information gathering means 18.

Consequently, in contrast to the situation when the invention of the abovementioned Japanese Patent Application Laid-open No. 7-30977 is employed, there is no need for complicated communications processing in which data respectively acquired by the plurality of controllers 6, 7 and 4 is stored in storage units provided for each of the controllers 6, 7, and 4, and the data has to be downloaded to a personal computer, separately each controller 6, 7 and 4. This is to say, there is the advantage that it is sufficient to perform simple communications processing in which data stored in the information management controller 1 is collectively sent to a personal computer 18.

In addition, the information management controller 1 gathers the data of each of the on-board controllers 6, 7 and 4, and stores data obtained by collating and processing the data of each of the on-board controllers 6, 7 and 4. Thus the information management controller 1 stores detailed information relating to the construction machine, obtained by collating the data of each of the on-board controllers 6, 7 and 4 within the construction machine. To illustrate the point using fuel volume and a service meter value by way of example, when the prior art is employed one can only acquire individual data for fuel volume and the service meter value respectively. However, when the present invention is employed, the relationship between the engine operating time and fuel consumption can be acquired as management information by collating fuel-volume data and service-meter-value data and carrying out data processing.

Therefore, if the data stored in the information management controller 1 is collectively sent to the data gathering means 18, the abovementioned detailed information relating to the construction machine can be easily acquired in the data gathering processing means 18. In the data gathering means 18, there is no need to carry out processing in which data relating to the construction machine stored in the storage medium is first reprocessed in order to produce detailed information.

Thus, detailed information relating to the construction machine can be easily acquired from just the data stored on the storage medium, both in situations where a personal computer 18 is used as the information gathering means 18 and the personal computer 18 does not have any data-processing software loaded, and in situations where an IC card writer 18 which does not have a data-processing function is used. Because the data stored on the storage medium in this way does not need to undergo computational processing or the like, servicing operations such as checking and conservation, and work such as management can be carried out extremely efficiently.

Further, in order to achieve the abovementioned second aim, in a third aspect of the invention there is an information management device for a construction machine, in which a plurality of on-board controllers in the construction machine are connected with freedom to communicate with each other by means of a serial communications line allowing communications in accordance with a predetermined communications protocol, a frame signal is transmitted between the plurality of on-board controllers, data is sent and received between the plurality of on-board controllers, and data acquired by each of the plurality of on-board controllers is described in the frame signal, and information relating to the construction machine is gathered by reading the data described in the frame signal, wherein the information management device is arranged in such a way that on an inside of the construction machine is provided an information management controller which manages information about the inside of the construction machine;

an on-board controller which differs from the plurality of on-board controllers is connected in a freely communicating fashion with a serial communications line allowing communications in accordance with a communications protocol which differs from the predetermined communications protocol;

the serial communications lines in the construction machine are inter-connected with freedom to communicate with each other via the information management controller; and the information management controller ensures that data is sent and received between an on-board controller connected to one of the serial communications lines and an on-board controller connected to the other serial communications line, and information relating to the construction machine is gathered by reading data respectively described in the frame signal transmitted over one of the serial communications lines and the frame signal transmitted over the other serial communications line.

The third aspect of the invention is described with reference to FIG. 3.

Provided on the inside of a construction machine are a plurality of on-board controllers 3 and 4. The plurality of on-board controllers 3 and 4 are connected with freedom to communicate with each other by means of a serial communications line 11 allowing communications in accordance with a predetermined communications protocol A. Thus, when a frame signal is transmitted between the plurality of on-board controllers 3 and 4, data is sent and received between the plurality of on-board controllers 3 and 4, and data acquired by each of the plurality of on-board controllers 3 and 4 is described in the frame signal.

An information management controller 1 which manages information about the inside of the construction machine is also provided. An on-board controller 5 which differs from the abovementioned plurality of on-board controllers 3 and 4 is connected in a freely communicating fashion with a serial communications line 12 allowing communications in accordance with a communications protocol B which differs from the first abovementioned predetermined communications protocol A.

The two serial communications lines 11 and 12 in the abovementioned construction machine are inter-connected with freedom to communicate with each other via the information management controller 1.

Thus the information management controller 1 gathers information relating to the construction machine by reading in data respectively described in the frame signal transmitted over one of the serial communications lines 11 and the frame signal transmitted over the other serial communications line 12.

To elaborate, not only the data of each of the on-board controllers 3 and 4 having the same communications protocol specification (communications protocol A), but also data acquired by the on-board controller 5 allowing communication in accordance with a different communications protocol B is gathered together in the information management controller 1, where the data is collated, and the processed data is stored. Thus, the information management controller 1 stores detailed information relating to the construction machine obtained by collating data from each of the on-board controllers 3, 4 and 5 in the construction machine.

Thus the present third aspect of the invention yields similar advantages to the first aspect and the second aspect.

Also, when the third aspect of the invention is employed, data is sent and received between the on-board controllers 3 and 4 connected to the first serial communications line 11 and the on-board controller 5 connected to the other serial communications line 12, via the data management controller 1.

Thus digital data can be sent serially directly from the monitor 4 to the engine controller 5, and the precision of engine control is improved.

Further, just using the two serial communications lines 11 and 12, serial communications can easily take place, without leading to an increase in harnesses, even between an engine controller 5 and a monitor 4 which do not conventionally exchange data due to limitations on the input and output of data. Further, just using the two serial communications lines 11 and 12, data can be sent from the engine controller 5 to a pump controller 3 without leading to an increase in harnesses.

In this way, when the third aspect of the invention is employed, serial communications are possible between each of the controllers 3, 4 and 5 even in a construction machine in which controllers having different communications protocol specifications coexist. Thus there is an improvement in the precision of control of various items of equipment to be controlled by the controllers, such as the engine. Further, on-board communications can take place without leading to an increase in signals lines (harnesses).

Further, in order to achieve the third aim, a fourth aspect of the invention is featured by an information management device for a construction machine, which gathers data about operating parameters with variable values during operation of an engine of the construction machine, and which computes a lifespan of each type of constituent part of the engine based on the data about operating parameters and manages information about the lifespan of each type of part so computed, wherein the information management device comprises a load frequency integrating means which divides a torque of the engine or a rotational speed of the engine into various levels, and integrates frequencies with which values of the operating parameters fall into the various levels, for each level until a predetermined time has elapsed;

a rotational variation range frequency integrating means which divides a variation range of the rotational speed of the engine into various levels, and integrates the frequencies with which the values of the operating parameters fall into the various levels, for each level until a predetermined time has elapsed;

a variation locus frequency integrating means which classifies a variation locus of the torque of the engine or a variation locus of the rotational speed of the engine into various loci, and integrates a frequency with which values of the operating parameters vary along each locus, for each locus until a predetermined time has elapsed; and a lifespan computing means which prearranges one of or a combination of two or more of the load frequency integrating means, the rotational variation range frequency integrating means and the variation locus frequency integrating means for each of types of part, and computes the lifespan for each type of part based on the integrated value obtained from the corresponding one or two or more frequency computing means.

If the fourth aspect of the invention is employed, then, as shown in FIG. 6, correspondences are pre-arranged between the various types of constituent parts PT of the engine and any combination of 1 or 2 or more of a load frequency integrating means M1, rotational variation range frequency integrating means M2 and variation locus frequency computing means M3.

As shown in FIG. 10, in the load frequency computing means M1 the torque T of the engine or the rotational speed Ne of the engine is divided into various levels Bij, and the frequency nij with which the value of the operating parameter T,Ne falls into the various levels Bij is integrated, for each level Bij until a predetermined time τ has elapsed.

Further, as shown in FIG. 11, in the rotational variation range frequency computing means NU, the variation range ΔNe of the rotational speed Ne of the engine is divided into various levels Bij, and the frequencies with which the values of the operating parameters ΔNe fall into the various levels Bij are integrated, for each level Bij until a predetermined time τ has elapsed.

Further, as shown in FIG. 14 and FIG. 15, in the variation locus frequency integrating means M3, the variation locus of the torque T of the engine or the variation locus u of the rotational speed Ne of the engine is classified into various loci Bij, and the frequency nij with which the value of the operating parameter T,Ne vary along each locus Bij is integrated, for each locus Bij until a predetermined time τ has elapsed.

Also the lifespan for each type of part is computed based on the integrated value obtained from the corresponding 1 or 2 or more frequency computing means M1, M2 and M3. The lifespan of the engine can therefore be accurately determined from the lifespans of the various parts.

Thus the fourth aspect of the invention takes account of the fact that, among the constituent parts of an engine, there are, for example, some parts which are susceptible to rotational variations (parts where abrasion is liable to proceed apace) and some parts which are strongly resistant to substantial rotational variations (parts where abrasion is not liable to proceed apace), and different types of part have different lifespans. It is also arranged in such a way that, for each type of part, the amount of damage is evaluated using different combinations of the frequency integrating means M1, M2 and M3, and lifespans are determined for each different type of part. It will be noted that, as shown in FIG. 6, the "part PT" may comprise "parts groups PT1, PT2 and PT3" corresponding to various categories (1), (2) and (3). Thus, when the present invention is employed, a numerical value can be accurately placed on the amount of damage to the engine as a whole, and the lifespan of the engine can be accurately determined. Also, accurate information regarding the lifespan of the engine determined in this way can be managed for separate construction machines. Further, in contrast to the prior art, deciding the lifespan of an engine does not require skill. Further, the fourth aspect of the invention may involve no more than gathering and managing information relating to the lifespan of different types of constituent part of an engine. In this case there is the advantage that accurate information about lifespan can be acquired for different types of constituent part of the engine.

Further, in order to achieve the fourth aim, a fifth aspect of the invention is featured by an information management device for a construction machine, which gathers data about operating parameters with variable values during operation of an engine of the construction machine, and which computes a lifespan of a hydraulic pump or a hydraulic motor actuated in accordance with driving of the engine based on the data about operating parameters, and manages the lifespan of the hydraulic pump or hydraulic motor so computed, wherein the information management device comprises a bearing-part lifespan computing means which successively measures loads imposed on the hydraulic pump or hydraulic motor until a predetermined time has elapsed and, based on the measured successive load values, computes the lifespan of a bearing part comprised in the hydraulic pump or hydraulic motor;

a hydraulic-sealing part lifespan computing means which successively measures a temperature of the discharge hydraulic oil of the hydraulic pump or of an activating oil of the hydraulic motor until a predetermined time has elapsed and, based on the measured successive temperature values, computes the lifespan of a hydraulic-sealing part comprised in the hydraulic pump or hydraulic motor; and a lifespan computing means which computes the lifespan of the hydraulic pump or hydraulic motor based on various lifespan values obtained from the parts lifespan computing means.

If the fifth aspect of the invention is employed, then, as shown in FIG. 19, loads T imposed on the hydraulic pump or hydraulic motor are successively (Δt) measured until a predetermined time τ has elapsed and, as shown in FIG. 20, based on the measured successive load values T, the lifespans (ranks S, A, B, C) of bearing parts comprised in the hydraulic pump or hydraulic motor are computed.

Also, the temperature Rt of the discharge hydraulic oil of the hydraulic pump or activating oil of the hydraulic motor are successively measured until a predetermined time τ has elapsed and, as shown in FIG. 24, based on the measured successive temperature values Rt, the lifespans (ranks S, A, B, C) of hydraulic-sealing parts comprised in the hydraulic pump or hydraulic motor are computed.

Also, the lifespan of the hydraulic pump or hydraulic motor is computed based on the lifespan values.

The present invention takes account of the fact that, among the constituent parts of hydraulic pumps and the like, there are, for example, some parts which are greatly affected by the engine load and some parts which are greatly affected by the oil temperature, and different factors affect the lifespans of different types of part. Also, the lifespan of hydraulic pumps and the like is mainly determined by the lifespan of bearing parts where load is a factor. This is revised by the lifespan of oil-sealing parts where the activating oil temperature is a factor. The lifespan of hydraulic pumps and the like is determined to a high degree of precision using this revision. Also, the accurate information about the lifespan of hydraulic pumps and the like can be managed for each of the construction machines.

Further, in order to achieve the fifth aim, a sixth aspect of the invention is featured by An information management device for a construction machine, which computes a work volume of a construction machine comprising a working machine, and manages the computed work-volume information, wherein the information management device comprises a timing means which measures a length of time over which the working machine operates; and a work-volume computing means which computes the work volume based on the time measured by the timing means and a planned operating time of the construction machine.

If the sixth aspect of the invention is employed, then, as shown in FIG. 26, the time SER over which the working machine operates is measured. Also, the operating percentage a is determined and the work volume V is computed based on the measured time SER and on the planned operating time SMR0 of the construction machine.

When the present invention is employed, the value of the work volume V is automatically and accurately obtained without relying on records made by operators. Because the work volume V is determined from the integrated value SER of the time over which the working machine operates, an accurate operating percentage $\alpha$ can be obtained and the work volume V can be accurately calculated even in cases involving working conditions where there is a long engine-warm time (dump-waiting time) and a commensurately shorter time over which the working machine operates for example as shown in FIG. 25.

Further, in order to achieve the sixth aim, a seventh aspect of the invention is featured by An information management device for a construction machine, which computes a work volume of a construction machine comprising a working machine, a swiveling body and a traveling body, and which manages data of the computed work-volume, wherein the information management device comprises

- a working machine integrating means which integrates a frequency of operation or length of time of operation of the working machine, until a predetermined time has elapsed;
- a swiveling-body integrating means which integrates a frequency of operation or length of time of operation of the swiveling body, until a predetermined time has elapsed;
- a traveling-body integrating means which integrates a frequency of operation or length of time of operation of the traveling body, until a predetermined time has elapsed; and
- a work-volume computing means which computes the work volume based on a ratio of the integrated working-machine value obtained by the integration using the working machine integrating means, the integrated swiveling-body value obtained by the integration using the swiveling-body integrating means, and the integrated traveling-body value obtained by the integration using the traveling-body integrating means.

If the seventh aspect of the invention is employed, then, as shown in FIG. 30, the frequency of operation or the length of time of operation n'w of the working machine is integrated until a predetermined time has elapsed.

Further, the frequency of operation or length of time of operation n's of the swiveling body is integrated until a predetermined time has elapsed.

Further, the frequency of operation or length of time of operation n't of the traveling body is integrated until a predetermined time has elapsed.

Also, the ratios between the integrated working machine value n'w, the integrated swiveling-body value n's and the integrated traveling-body value n't are determined as shown in FIG. 30. Then the constituent percentage $\beta$ is determined from this ratio and the work volume V is computed.

When the present invention is employed, an accurate constituent percentage $\beta$ for loading can be obtained, and the work volume V can be accurately calculated even in cases involving working conditions where there is a long traveling time and a commensurately shorter time over which the working machine is actually being used for loading sand and earth.

Further, in order to achieve the seventh aim, an eighth aspect of the invention is featured by An information management device for a construction machine, in which a power source is turned on in accordance with a switch means, and in which there is management of information about an operating state of the construction machine comprising a working machine activated using an engine as a power source, wherein the information management device comprises

- a first timing means which measures a time during which the switch means is turned on;
- a second timing means which measures a time during which the engine is operating;
- a third timing means which measures a time during which the working machine is operating; and
- an operating information gathering means which determines values of differences between the times measured by the first, second and third timing means, and gathers information about the operating state of the construction machine based on the difference values.

If the eighth aspect of the invention is employed, then, as shown in FIG. 25, the time SMR1 when the switch means is on is measured by a first timing means SM1.

Further, the time SMR2 when the engine is operating is measured by a second timing means SM2.

Further, the time SER when the abovementioned working machine is operating is measured by a third timing means SM3.

Also, the values of the differences between the times SMR1, SMR2 and SER measured by the abovementioned first, second and third timing means SM1, SM2 and SM3 are determined, and information about the operating state of the construction machine is determined based on the difference values.

The present invention makes it possible to ascertain not only the engine operating time pure and simple, but also the stand-by time when the engine is not actually operating even though the key switch of the engine has been turned to “on”, and even ascertain the warm time (dump-wait time) when the working machine, such as a boom, is not actually operating even though the engine is operating. It thus becomes possible to manage and monitor the operating status of construction machinery more accurately than hitherto.

BRIEF DESCRIPTION OF THE DRAWINGS

FIG. 5 is a figure explaining factors causing damage to engines;

FIG. 6 is a figure in which maps which are employed had been allocated correspondences to different factors causing damage to engines;

FIG. 11 is a figure showing a table in which various divisional elements of a load frequency map have been calculated as percentages;

FIG. 21 is a figure showing the correspondence between lifespan rank and overhaul time;

FIG. 42(*a*) is a figure showing a processing routine when an irregularity has occurred, and FIGS. 42(*b*) and 42(*c*) are figures showing the situation when a value detected by a sensor exceeds a threshold value;

FIG. 43 is a figure showing details of failure history data;

DESCRIPTION OF THE PREFERRED EMBODIMENTS

There now follows a description of modes of embodiment of a data management device for a construction machine according to the present invention, with reference to the figures.

Figure 1:
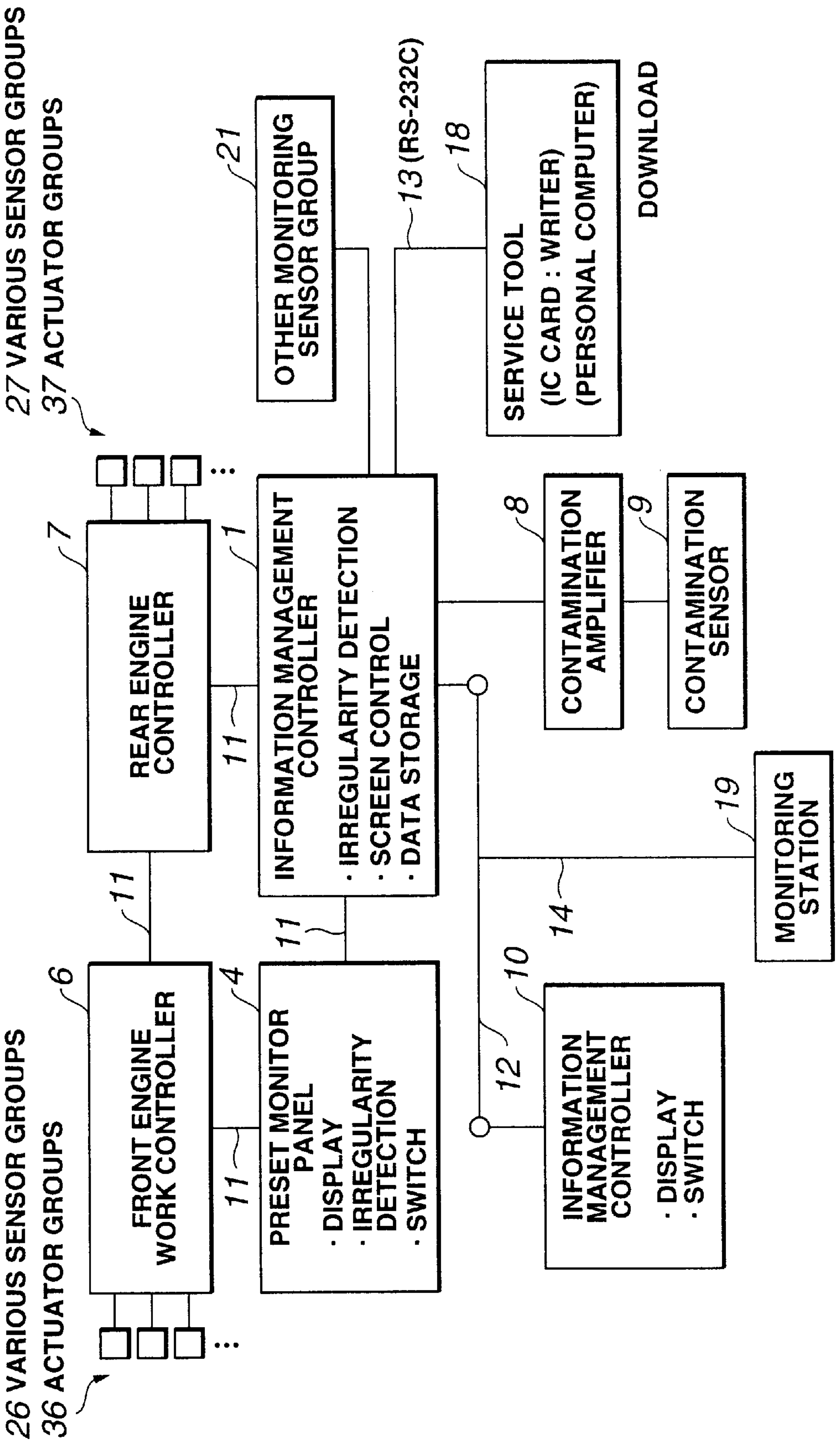
FIG. 1 is a block diagram showing the configuration within the vehicle body of (i.e. on board) a construction machine.

FIG. 1 is a block diagram showing the configuration within the vehicle body of a construction machine. Moreover the mode of embodiment shown in FIG. 2 allows for a construction machine in the form of a hydraulic shovel in which the front portion and rear portion have respectively been provided with an engine. However the present invention can be employed in any desired form of construction machine.

As shown in the FIG. 1, a plurality of on-board controllers 6, 7 and 4 are provided within the vehicle body of (on board) a construction machine.

The on-board controller 6 is a front-engine/working machine controller which controls the drive of the front engine and the working machine.

Various sensor groups 26 and actuator groups 36 are connected to the controller 6. Examples of sensor groups 26 include sensors which detect a throttle signal indicating the position of a throttle operated and set by a fuel dial (front engine target rotational speed setting means); sensors which detect the actual rotational speed of the front engine; sensors which detect the temperature of a coolant (cooling water) which cools the front engine; sensors which detect fuel quantity (the amount of remaining fuel); sensors which detect a service meter (front engine operating time); sensors which detect the operating position of an operating lever which operates a working machine, in the form of pilot pressure; and sensors which detect the oil temperature of a working machine.

Examples of actuator groups 36 include fuel-supply actuators (such as a motor driving a governor) which supply fuel to the front engine; and electromagnetic solenoids provided in operating valves (flow-control valves) with which hydraulic oil is supplied to a hydraulic actuator (hydraulic cylinder, hydraulic motor) which drives a working machine.

The controller 6 receives input of various detection signals from the sensor groups 26 provided in the front engine and working machine, and outputs various drive signals to actuator groups 36 provided in the front engine and the working machine.

The on-board controller 7 is a rear engine controller which controls the drive of the rear engine.

Various sensor groups 27 and actuator groups 37 are connected to the controller 7. Examples of sensor groups 27 include sensors which detect a throttle signal indicating the position of a throttle operated and set by a fuel dial (rear engine target rotational speed setting means); sensors which detect the actual rotational speed of the rear engine; sensors which detect the temperature of a coolant (cooling water) which cools the rear engine; and sensors which detect a service meter (rear engine operating time).

Examples of actuator groups 37 include fuel-supply actuators (such as a motor driving a governor) which supply fuel to the rear engine.

The controller 7 receives input of various detection signals from the sensor groups 27 provided in the rear engine, and outputs various drive signals to rear actuator groups 37 provided in the rear engine.

The on-board controller 4 is a preinstalled monitor panel provided with a display screen and various switches.

The monitor panel 4 receives input in the form of a signal corresponding to the operating position of a switch, and outputs a drive signal to a display control actuator in such a way as to display a screen image on the display screen.

By way of example, there is input of a signal giving the desired work mode among various forms of work which the construction machine performs, by the selection and operation of a work-mode-selection switch of the monitor panel 4.

The controllers 6, 7 and 4 are connected with each other with freedom to communicate by means of a serial communications line 11 allowing communication in accordance with a predetermined communications protocol A.

Figure 2:
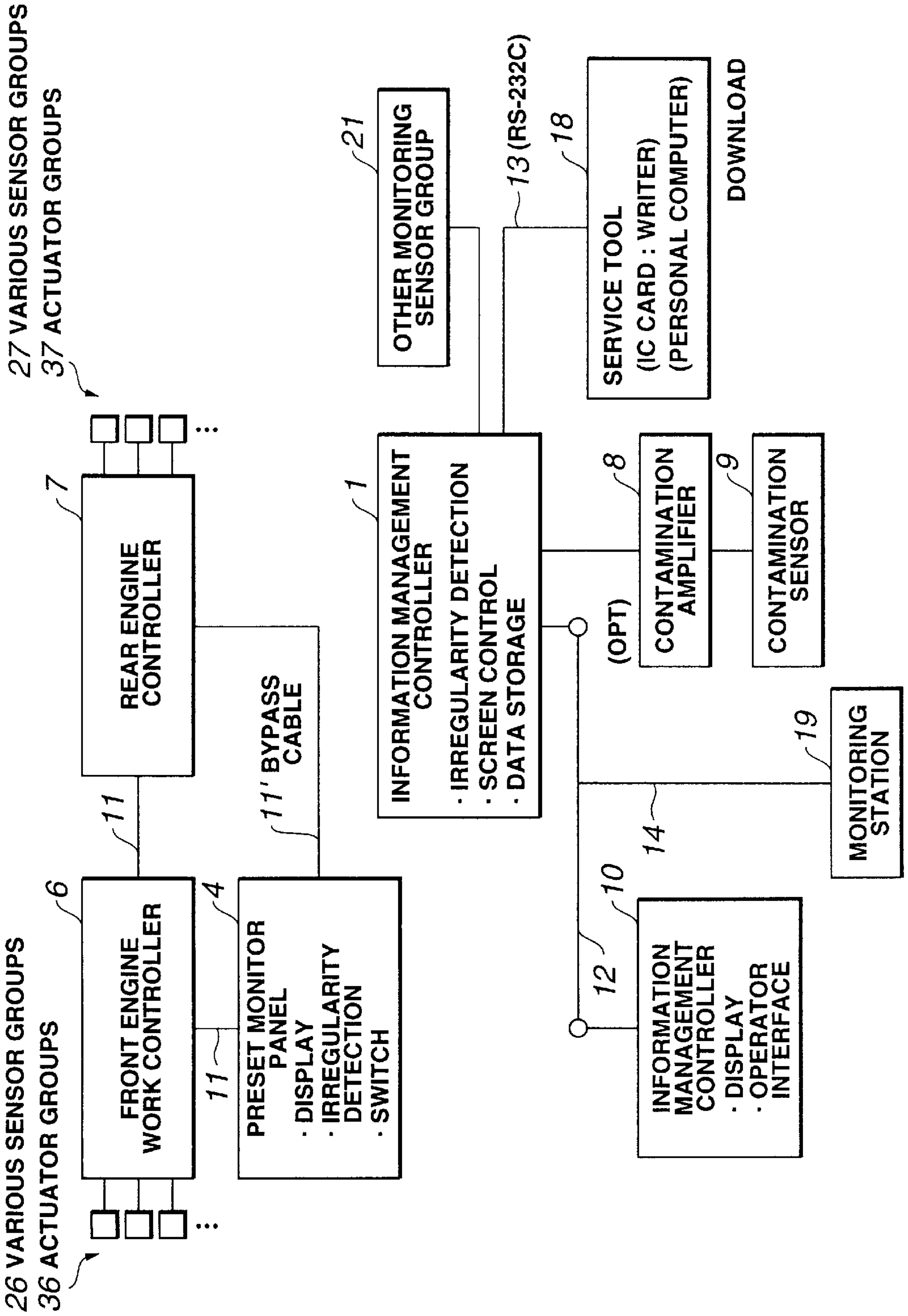
FIG. 2 is a block diagram showing the configuration within the vehicle body of (i.e. on board) a construction machine.

Consequently, as shown in FIG. 2, the on-board network using communications protocol A is independently constituted by connecting the controller 4 and the controller 7 using a bypass cable 11' of the serial communications line 11.

This is to say, frame signals of the abovementioned communications protocol A are transmitted over the serial communications line 11. When this is done, a frame signal is transmitted to the controllers 4, 6 and 7 . . . , a drive signal is output to actuators connected to the controllers 4, 6 and 7 . . . in accordance with data described in the frame signal, and as the drive of these actuators is controlled, detection data detected by sensors connected to the controllers 4, 6 and 7 . . . is acquired and described in the frame signal.

The data structure of the frame signal differs depending on the protocol used, but by way of example is a data structure comprising data giving the ID of the request-originating controller, data giving the ID of the request-destination controller, and data giving the request details.

By transmitting frame signals between a plurality of controllers 4, 6 and 7 in this way, data is sent and received between the plurality of controllers 4, 6 and 7, and data acquired from each of the plurality of controllers 4, 6 and 7 is described in the frame signal.

By way of example, when a switch is used to select and give an instruction for a heavy excavation mode, designating work under a heavy load, as the work mode using the monitor panel 4, data designating the heavy excavation mode is described in the abovementioned frame signal and is sent, via the serial communications line 11, to the front engine/working machine controller 6 and the rear engine controller 7.

Thus the controller 6 receives a frame signal and reads in data designating the heavy excavation mode which has been described. Also, the drive of the fuel-supply actuator of the front engine is controlled in such a way as to achieve a target engine rotational speed corresponding to the heavy excavation mode. Similarly, the controller 7 also reads in data designating the heavy excavation mode described in the received frame signal, and the drive of the rear engine is controlled in such a way as to achieve a target rotational speed corresponding to the heavy excavation mode.

Meanwhile, in the rear engine controller 7, if by way of example an abnormal rise in the water temperature of the coolant is detected, data indicating the coolant water temperature is described in the abovementioned frame signal and is sent, via the serial communications line 11, to the front engine/working machine controller 6 and the monitor panel 4.

Thus the monitor panel 4 receives the frame signal and reads in data indicating the coolant water temperature which has been described. Also, the display screen shows a display to the effect that an irregularity has occurred in the rear engine (coolant water irregularity).

Further, the front engine/working machine controller 6 also receives the abovementioned frame signal, and thus the front engine and the working machine can be controlled in a fashion corresponding to the irregularity in the rear engine.

An information management controller 1 which manages information within the construction machine is provided in the vehicle body of the construction machine.

This information management controller 1 can be added to an existing in-vehicle (on-board) network after the construction machine has been produced, by detaching the bypass cable 11' of the serial communications line 11 shown in FIG. 2.

Further, as shown in FIG. 1, the controllers 4, 5 and 6 and the information management controller 1 can be connected with each other by means of the serial communications line 11 from the time when the construction machine has been produced onwards.

Meanwhile, an on-board controller 2 having a specification allowing communication in accordance with a communications protocol B which differs from the abovementioned communications protocol A is provided within the vehicle body of (i.e. on-board) the construction machine.

The on-board controller 2 is a display provided with various switches and a display screen.

The information management monitor 2 receives input in the form of signals corresponding to the operating positions of the switches, and outputs a drive signal to a display control actuator in such a way as to display an image on the display screen.

The information management monitor 2 is connected to the information management controller 1 via a serial communications line 12 using the communications protocol B. Other controllers may also be connected to the serial communications line 12. Thus, frame signals with a data structure conforming to the communications protocol B are transmitted over the serial communications line 12.

A monitoring sensor group 21 is connected to the information management controller 1.

The monitoring sensor group 21 comprises sensors which are not connected to the other controllers 4, 6 and 7, such as sensors which detect the oil temperature of the engine, sensors which detect the oil temperature of a PTO shaft, sensors which detect the discharge pressure of a variable-capacity hydraulic pump, and sensors which detect the discharge pressure of a fixed-capacity hydraulic pump. Further, a contamination sensor 9 is connected via a contamination amplifier 8 to the information management controller 1.

In the contamination sensor 9 the amount of detritus in the actuating oil in a decelerator is detected and output in the form of an analog signal which is amplified by the contamination amplifier 8 before being input to the information management controller 1.

A service tool 18 is connected via an interface 13 such as RS-232C to the information management controller 1.

The service tool 18 is an information gathering means which stores data on a storage medium by downloading data stored in the information management controller 1 as discussed hereinbelow. Examples include personal computers and IC card writers where data is written into an IC card.

A monitoring station 19 is connected to the information management controller 1, via the abovementioned serial communications line 12 and a wireless communications line 14. When the communications protocol differs between the communications network 12 and the wireless communications line 14, protocol conversion takes place at a predetermined gateway, and signals are transmitted between the serial communications line 12 and the wireless communications line 14.

The monitoring station 19 is provided externally to the construction machine and manages information relating to a plurality of construction machines.

Here, the information management controller 1 has the function of converting frame signals in communications protocol A on the serial communications line 11 into the data structure of communications protocol B and transmitting them as frame signals to the serial communications line 12, as well as of converting frame signals in communications protocol B on the serial communications line 12 into the data structure of communications protocol A and transmitting them as frame signals to the serial communications lines 11. Further, the information management controller 1 reads in data described in the frame signal on the serial communication line 11, reads in data described in the frame signal on the serial communications line 12, gathers and processes items of data read in this way, and carries out a process of storing the processed data in a predetermined memory.

Consequently, data is sent and received between the controllers 4, 6 and 7 connected to one of the serial communications lines 11, and the controller 2 connected to the other serial communications line 12, via the information management controller 1.

Thus, by way of example, digital data can be sent serially from the controller 6 which uses the specification of communications protocol A, to the information management monitor 2 which uses the specification of a different protocol B.

Further, the information management controller 1 gathers information relating to a construction machine by reading in data respectively described in a frame signal transmitted over one of the serial communications line 11 and in a frame signal transmitted over the other serial communications line 12.

This is to say, the information management controller 1 gathers together and collates not only the data of each of the controllers 4, 6 and 7 having the same communications protocol specification (communications protocol A), but also the data acquired by the controller 2 allowing communications in accordance with a different communications protocol B, and stores the processed data. Thus detailed information relating to the construction machine, obtained by collating the data of separate controllers 4, 6, 7 and 10 within the construction machine, is stored in the information management controller 1. Further, data detected by the contamination sensor 9 and the monitoring sensor group 21 connected to the data management controller 1 is also collated, and detailed information relating to the construction machine is produced and stored.

Here, when a signal which requests data from the monitoring station 19 is transmitted to the information management controller 1 via the wireless communications line 14 and the serial communications line 12, the information management controller 1 executes a process of sending data stored on the controller 1 to the monitoring station 19, via the serial communications line 12 and the wireless communications line 14.

Consequently, in contrast to the situation when the invention of Japanese Patent Application Laid-open No. 6-330539 is employed, there is no need for a complicated communications process in which data respectively acquired by the plurality of controllers 6, 7 and 4 has to be stored in storage units provided in each of the controllers 6, 7 and 4, and data to the monitoring station 19 has to be sent separately for each controller 6, 7 and 4. This is to say, it is sufficient to have a simple communications process in which data stored in the information management controller 1 is collectively sent to the monitoring station 19.

The information management controller 1 gathers the data of the separate controllers 6, 7 and 4 (and also the data acquired by the other separate sensors 21 and 9 and the other controller 2), and here the items of data are collated and the processed data is stored. This is to say, detailed information relating to the construction machine, obtained by the collation of data about the inside of the construction machine, is stored in the information management controller 1.

Therefore, when the data stored in the information management controller 1 is collectively sent to the monitoring station 19, the abovementioned detailed information relating to the construction machine can be easily acquired at the monitoring station 19. This is to say there is no need in the monitoring station 19 to execute a process of producing detailed information by first reprocessing data relating to a single construction machine.

Thus information relating to a plurality of construction machines gathered from various construction machines can be managed extremely efficiently in the monitoring station 19.

Here, the service tool 18 is connected to the information management controller 1 via the interface 13 and, when a signal requesting data has been sent from a service tool such as a personal computer 18, via the interface 13, to the information management controller 1, the information management controller 1 carries out a process of sending data stored on the controller 1, via the interface 13, to the personal computer 18.

Consequently, in contrast to the situation when the invention of Japanese Patent Application Laid-open No. 7-30977 is employed, there is no need for a complicated communications process in which data respectively acquired by the plurality of controllers 6, 7 and 4 has to be stored in storage units provided in each of the controllers 6, 7 and 4, and data for a personal computer has to be downloaded separately for each controller 6, 7 and 4. This is to say, it is sufficient to have a simple communications process in which data stored in the information management controller 1 is collectively sent to the personal computer 18.

Also, the information management controller 1 gathers the data of the separate controllers 6, 7 and 4 (and also the data acquired by the other separate sensors 21 and 9 and the other controller 2), and here the items of data are collated and the processed data is stored. This is to say, detailed information relating to the construction machine, obtained by the collation of data about the inside of the construction machine, is stored in the information management controller 1.

Therefore, when the data stored in the information management controller 1 is collectively sent to the personal computer 18, the abovementioned detailed information relating to the construction machine can be easily acquired by the personal computer 18. This is to say there is no need in the personal computer 18 to execute a process of producing detailed information by reprocessing data relating to the construction machine stored on a storage medium (hard disk or the like).

Thus, detailed information relating to the construction machine can be easily acquired from the data stored on the storage medium alone, both in situations where a personal computer 18 is used as the information gathering means 18 and the personal computer 18 does not have any data-processing software loaded, and in situations where an IC card which does not have a data-processing function is used. Because the data stored on the storage medium does not need to undergo computational processing or the like in this way, servicing such as checking and conservation, and work such as management can be carried out extremely efficiently.

Further, when the mode of embodiment shown in FIG. 1 is employed, the following advantages are obtained.

Allowance is made for situations in which some form of irregularity occurs in, for example, the controller 2 connected to the serial communications line 12 or the serial communications line 12 of FIG. 1 itself.

In such situations, as shown in FIG. 2, the serial communications line 12 where the irregularity has occurred is cut off from the serial communications line 11 together with the information management controller 1, and the bypass cable 11' is attached to the serial communications line 11, and thus the on-board network constituted using communications protocol A can be independently configured.

Thus communications can continue normally between the controllers 4, 6 and 7 without sustaining any adverse effects from the serial communications line 12 where the irregularity has occurred. Further, while communications are continuing normally between the controllers 4, 6 and 7, the serial communications line 12 where the irregularity has occurred can be repaired.

Figure 3:
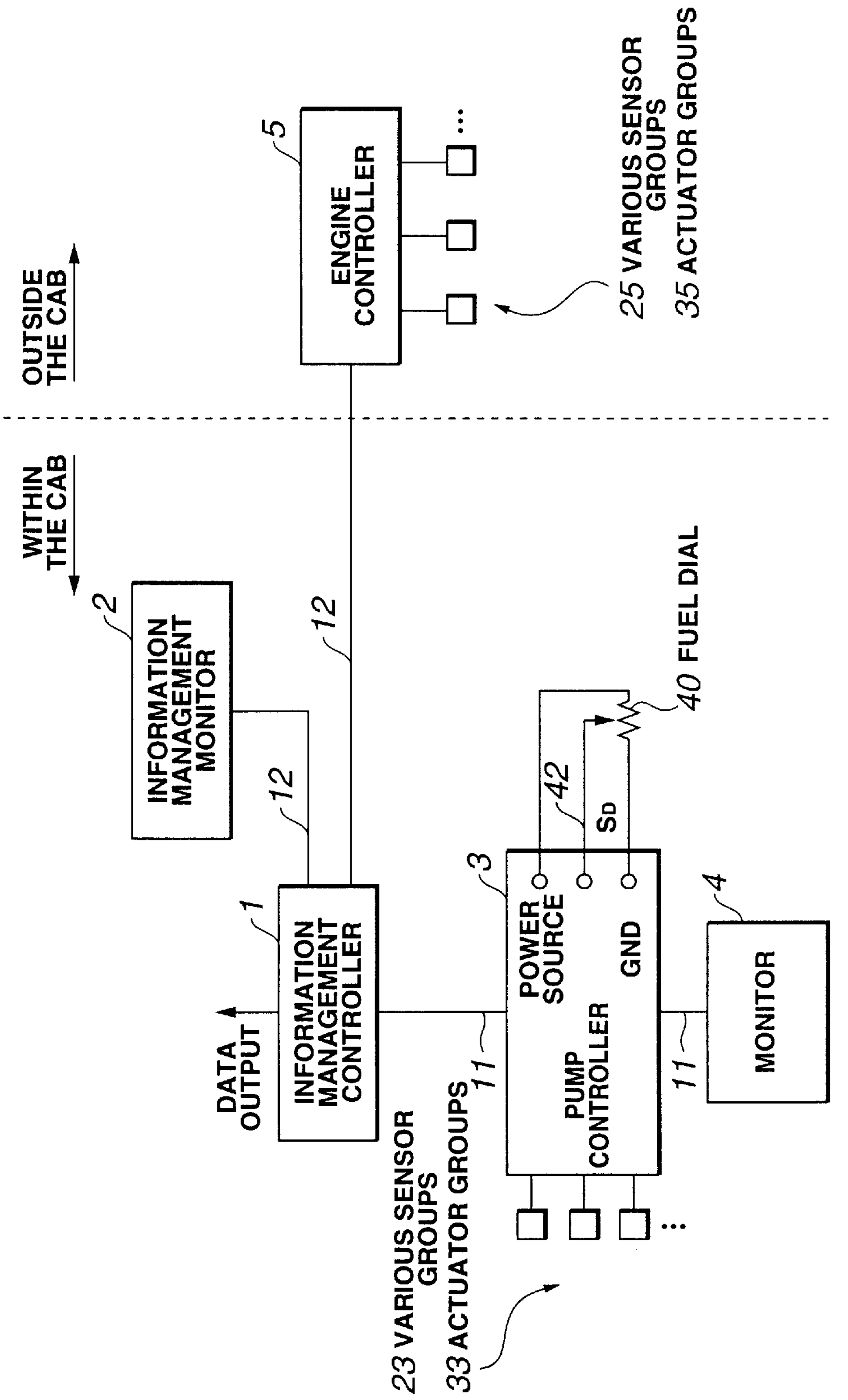
FIG. 3 is a block diagram showing the configuration within the vehicle body of (i.e. on board) a construction machine.
Figure 4:
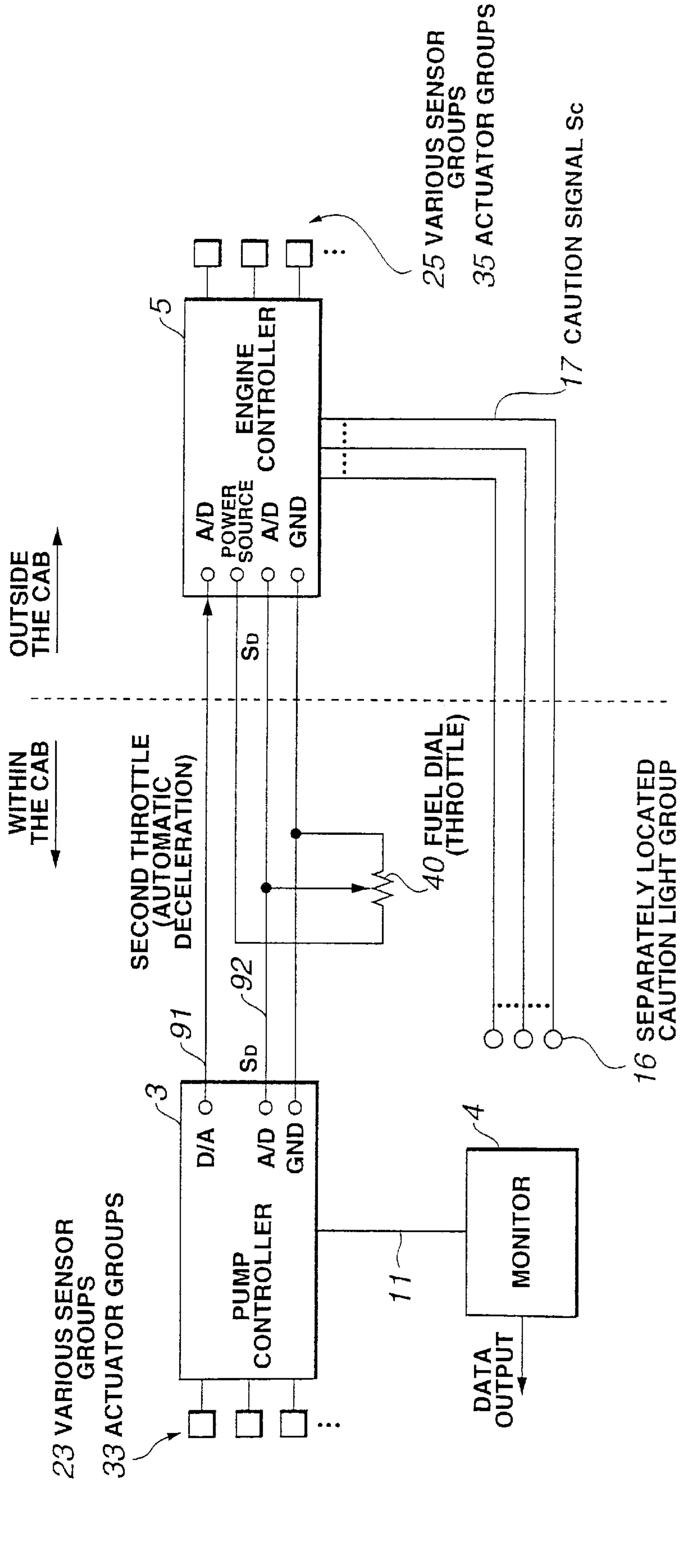
FIG.4 (PRIOR ART)
FIG. 4 is a block diagram showing the configuration within the vehicle body of (i.e. on board) a construction machine, and is a figure showing the prior art.

A different mode of embodiment is now described with reference to FIG. 3. FIG. 3 is a mode of embodiment corresponding to FIG. 4. In FIG. 3 allowance is made for a construction machine in which a hydraulic pump is driven by an engine, and hydraulic oil ejected from the hydraulic pump is supplied via an operating valve to a hydraulic actuator which drives a working machine.

A pump controller 3, a monitor 4, an information management controller 1 and an information management monitor 2 are provided within the cab (operating compartment) of a construction machine.

The pump controller 3 is a controller which controls the drive of the hydraulic pump.

Various sensor groups 23 and actuator groups 33 are connected to the pump controller 3. The pump controller 3 receives input in the form of various detection signals such as signals designating the operating position of an operating lever, and outputs various drive signals to, for example, an inclined plate drive actuator which drives an inclined plate of the hydraulic pump. Further, the pump compressor 3 receives input, via the signals line 42, in the form of a first throttle signal SD designating the position of a throttle operated and selected by a fuel dial (target engine rotational speed setting means) 40.

The monitor 4 is a controller provided with a display screen and various switches. The monitor 4 is used to select and give an instruction for a predetermined work mode among various forms of work which the construction machine performs, by means of a switch operation, and information required for running is displayed on the display screen.

The information management controller 1, pump controller 3 and monitor 4 are connected by means of a serial communications line 11 allowing communications in accordance with the communications protocol A. Thus data is exchanged between the information management controller 1, pump controller 3 and monitor 4 by transmitting frame signals over the serial communications line 11.

In contrast, an engine controller 5 is provided outside the cab of the construction machine.

The engine controller 5 is a controller which controls the drive of the engine.

Various sensor groups 25 and actuator groups 35 are connected to the engine controller 5.

Sensor groups 25 includes sensors which detect the actual rotational speed of the engine; sensors which detect the temperature of a coolant (cooling water) which cools the engine; sensors which detect fuel quantity (the amount of remaining fuel); and sensors which detect a service meter (front engine operating time).

Examples of actuator groups 35 include fuel-supply actuators (such as a motor driving a governor) which supply fuel to the front engine.

The controller 5 receives input in the form of various detection signals from the sensor groups 25 provided in the engine, and outputs various drive signals to actuator groups 35 provided in the engine.

The engine controller 5 is a controller having a specification allowing serial communications in accordance with a communications protocol B which differs from the abovementioned communications protocol A.

The information management controller 1, information management monitor 2 and engine controller 5 are connected by means of a serial communications line 12 allowing communications in accordance with the abovementioned communications protocol B. Thus data is exchanged between the information management controller 1, information management monitor 2 and engine controller 5 by transmitting frame signals over the serial communications line 12.

Here, the information management controller 1 has the function of converting frame signals in communications protocol A on the serial communications line 11 into the data structure of communications protocol B and transmitting them as frame signals to the serial communications line 12, as well as of converting frame signals in communications protocol B on the serial communications line 12 into the data structure of communications protocol A and transmitting them as frame signals to the serial communications line 11. Further, the information management controller 1 reads in data described in the frame signal on the serial communications line 11, reads in data described in the frame signal on the serial communications line 12, gathers and processes items of data read in this way, and carries out a process of storing the processed data in a predetermined memory.

Consequently, data is sent and received between the controllers 2, 3 and 4 connected to one of the serial communications lines 11, and the controller 5 connected to the other serial communications line 12, via the information management controller 1.

Thus digital data can be sent serially from the pump controller 3 and monitor 4 which use the specification of communications protocol A, to the engine controller 5 which uses the specification of a different communications protocol B.

By way of example, a frame signal in which is described data giving a first throttle signal SD and a second throttle signal is sent from the pump controller 3 to the engine controller 5. A "second throttle signal" refers to an engine rotation command signal which is produced in accordance with data acquired by the pump controller 3 and is supplied to the engine controller 5, such as an automatic deceleration signal, overheat signal or automatic warm signal. An "automatic deceleration signal" is an engine rotation command signal which gives an instruction to reduce the rotational speed of the engine to a lower rotational speed when the operating lever is in the neutral position. An "overheat signal" is an engine rotation command signal which gives an instruction to reduce the set rotational speed of the engine to the idling rotational speed when the engine is overheating. An "automatic warm signal" is an engine rotation command signal which gives an instruction to increase the set rotational speed of the engine to a warm rotational speed when the engine is cold.

Further, a frame signal, in which data giving the work mode is described, is sent from the monitor 4 to the engine controller 5.

The engine controller 5 reads in various items of data about the first throttle signal SD, the second throttle signal and the work mode described in the frame signal, on the basis of which the engine target rotational speed is determined, and the drive of the fuel-supply actuator is controlled.

Since digital data can be sent directly to the engine controller 5 not only from the pump controller 3 but also from the monitor 4 in this way, there is the advantage that precision of engine control is improved.

Further, when the present mode of embodiment is employed, serial communications can easily take place even between the engine controller 5 and the monitor 4, where data exchange has not conventionally taken place due to restrictions on the input and output of data, without causing an increase in harnesses simply because of the two serial communications lines 11 and 12.

By way of example, when a switch is used to select and give an instruction for a heavy excavation mode, designating work under a heavy load, as the work mode using the monitor panel 4, data designating the heavy excavation mode is described in the abovementioned frame signal and is sent, via the serial communications lines 11 and 12, to the engine controller 5.

Thus the controller 5 receives a frame signal and reads in data designating the heavy excavation mode which has been described. Also, the drive of the fuel-supply actuator of the engine is controlled in such a way as to achieve a target engine rotational speed corresponding to the heavy excavation mode.

Meanwhile, in the engine controller 5, if by way of example an abnormal rise in the water temperature of the coolant is detected, data indicating the coolant water temperature is described in the abovementioned frame signal and is sent, via the serial communications lines 12 and 11, to the monitor 4.

Thus the monitor 4 receives the frame signal and reads in data indicating the coolant water temperature which has been described. Also, the display screen shows a display to the effect that an irregularity has occurred in the engine (coolant water temperature irregularity).

Further, data can also be sent from the engine controller 5 to the pump controller 3 without causing an increase in harnesses simply by using the two serial communications lines 12 and 11.

One can assume, by way of example, a situation in which data having the effect of altering the work mode (pump suction torque) due to the occurrence of an irregularity in the engine, is described in a frame signal and is sent from the engine controller 5 to the pump controller 3. In the pump controller 3, the data described in the frame signal is read in, and the inclined plate of the hydraulic pump is controlled in such a way that the suction torque of the hydraulic pump reaches a torque corresponding to the engine irregularity.

Thus, when the present mode of embodiment is employed, serial communication is possible between the controllers 3, 4 and 5, even in construction machines where controllers having different communications protocol specifications coexist. There is therefore an improvement in the precision of control of various items of equipment to be controlled by various controllers, such as engines. Further, on-board communications can be effected without causing an increase in the number of signal lines (harnesses).

Further, in the same way as in the mode of embodiment shown in FIG. 1, the information management controller 1 gathers the data of each of the on-board controllers 3, 4 and 5, and here the items of data are collated and the processed data is stored. Thus the data stored in the information management controller 1 is collectively sent to the monitoring station 19 or the service tool 18, in accordance with a request from the monitoring station 19 and/or the service tool 18, in the same way as in the mode of embodiment shown in FIG. 1. Detailed information relating to the construction machine can therefore be easily acquired in the monitoring station 19 and/or the service tool 18 and information relating to the construction machine can be managed extremely efficiently.

There now follows a description of specific details of processing carried out by the information management controller 1.

The information management controller 1 gathers data about operating parameters whose value changes during operation of the engine of the construction machine, and, based on this data about operating parameters, lifespans are computed for different types of constituent part of the engine, and information about the lifespans of the different types of part so computed is managed. Further, based on the information about the lifespan of parts, the lifespan of the engine is computed, and information about the lifespan of the engine so computed is managed.

The information management controller 1 carries out the following computational processing.

It should be noted that there are 3 different conditions/factors due to which damage is inflicted on an engine, and these are classified in FIG. 5. FIG. 5 shows the factors behind the damage inflicted on an engine, divided into:

(1) mechanical stress (high cycle fatigue)

(2) thermal stress (low cycle fatigue)

(3) abrasion (running conditions).

The "mechanical stress (high cycle fatigue)" of factor (1) refers to strength reduction due to exposure of the engine to high temperatures. The "thermal stress (low cycle fatigue)" of factor (2) refers to thermal deterioration caused by repeated increases and decreases in temperature. It is also referred to as "thermal fatigue".

Further, the "abrasion (running conditions)" of factor (3) refers to mechanical fatigue.

The amount of effect of each of these factors (1), (2) and (3) differs depending on the type of constituent part of the engine. This is because, for example, there are some parts which are susceptible to rotational variations (parts where abrasion is liable to proceed apace) and some parts which are strongly resistant to substantial rotational variations (parts where abrasion is not liable to proceed apace).

FIG. 6 shows a table in which the different factors (1), (2) and (3) behind damage have been given matched with affected constituent parts groups PT1, PT2 and PT3 of the engine. In addition, the parts groups PT1, PT2 and PT3 have been given matched parts PT.

Also, the abovementioned different factors (1), (2) and (3) behind damage, which is to say the parts groups PT1, PT2 and PT3 have been given corresponding evaluation methods which are used to evaluate the amount of damage (degree of severity). This is shown with a circle mark in FIG. 6. More specifically, in the case of parts group PT1, the amount of damage can be determined and the lifespan computed using a load frequency map M1. Again, in the case of parts group PT2, the amount of damage can be determined and the lifespan computed using cycle time M2 and a load movement map M3. Again, in the case of parts group PT3, the amount of damage can be determined and the lifespan computed using a load frequency map M1.

For example, a crankshaft which is a part PT comprised in the parts group PT1 is affected by mechanical stress (high cycle fatigue) of factor (1), and its lifespan can be computed using the load frequency map M1.

There now follows a description of a method of gathering operating parameters Ne and T in a mode of embodiment.

In the present mode of embodiment the information management controller gathers the actual rotational speed Ne (rpm) of the engine from an engine rotational speed sensor, and a throttle signal SD from the fuel dial 40, at spaced sampling times Δt.

Figure 8A:
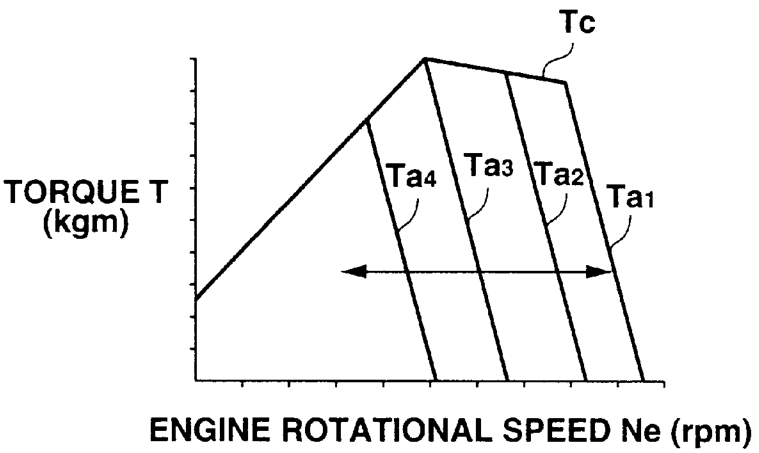
FIGS. 8(*a*), 8(*b*) and 8(*c*) are figures explaining the process of computing the torque of an engine.
Figure 8B:
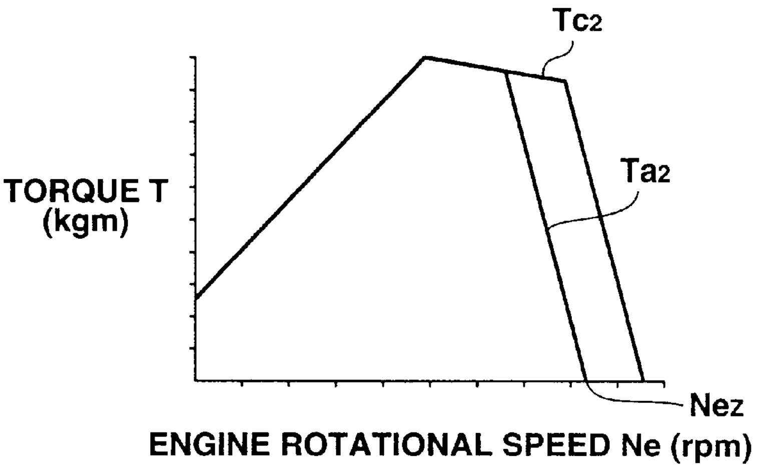
Figure 8C:
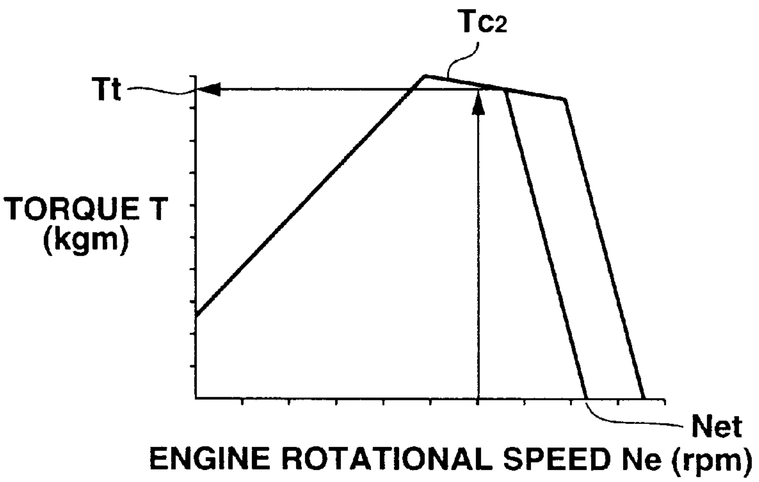

FIGS. 8(*a*) to 8(*c*) are figures explaining a method of detecting torque T. In the FIGS. 8(*a*) to 8(*c*), the torque curve Tc of the engine is plotted with the engine rotational speed Ne on the horizontal axis and the torque T on the vertical axis.

The present mode of embodiment allows for a diesel engine as the engine. It is envisaged that a mechanical governor rather than an electrical governor is used as the governor of the fuel-injection pump.

As shown in FIG. 8(*a*), the information management controller 1 stores the torque curve Tc with separate regulation lines Ta1, Ta2, Ta3, Ta4 . . .

The engine target rotational speed Ne2 is computed based on the current throttle signal SD output from the fuel dial 40. Also, as shown in FIG. 8(*b*), a torque curve Tc2 corresponding to the engine target rotational speed Ne2 is determined.

Next, as shown in FIG. 8(*c*), a torque value Tt on the torque curve Tc2, corresponding to the current engine rotational speed Net output from the engine rotational speed sensor, is determined.

It should be noted that, if an electrical governor is used, the control rack position can be substituted as the torque T. The control rack position is equivalent to the amount of fuel injected, and constitutes a substitute for the torque T.

There now follows a description of a method for calculating the load frequency map M1.

Figure 9:
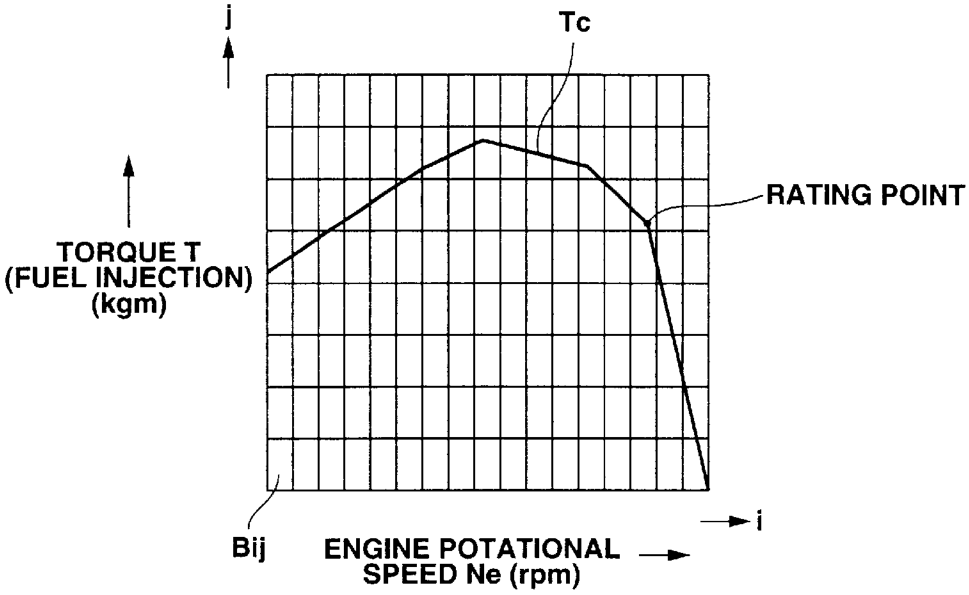
FIG. 9 is a figure showing the division of a two dimensional surface of engine rotational speed and torque.

FIG. 9 is an engine performance graph showing the engine rotational speed Ne on the horizontal axis and the torque T on the vertical axis. The reference Tc is the torque curve.

The engine rotational speed Ne on the horizontal axis of the engine performance graph is divided into 17, and the torque T (fuel injection amount) is divided into 8. Thus, taking the horizontal access as i and the vertical axis as j, it is divided into various blocks (levels) Bij expressed as Bij.

The information management controller 1 successively decides whether the values of the operating parameters T and Ne obtained at each separate sampling time Δt fall within the blocks Bij. Thus, the in-fall frequencies nij are integrated for each of the blocks Bij. The frequencies nij with which the values of the operating parameters T and Ne fall within the blocks Bij are integrated for each of the blocks Bij.

Figure 10:
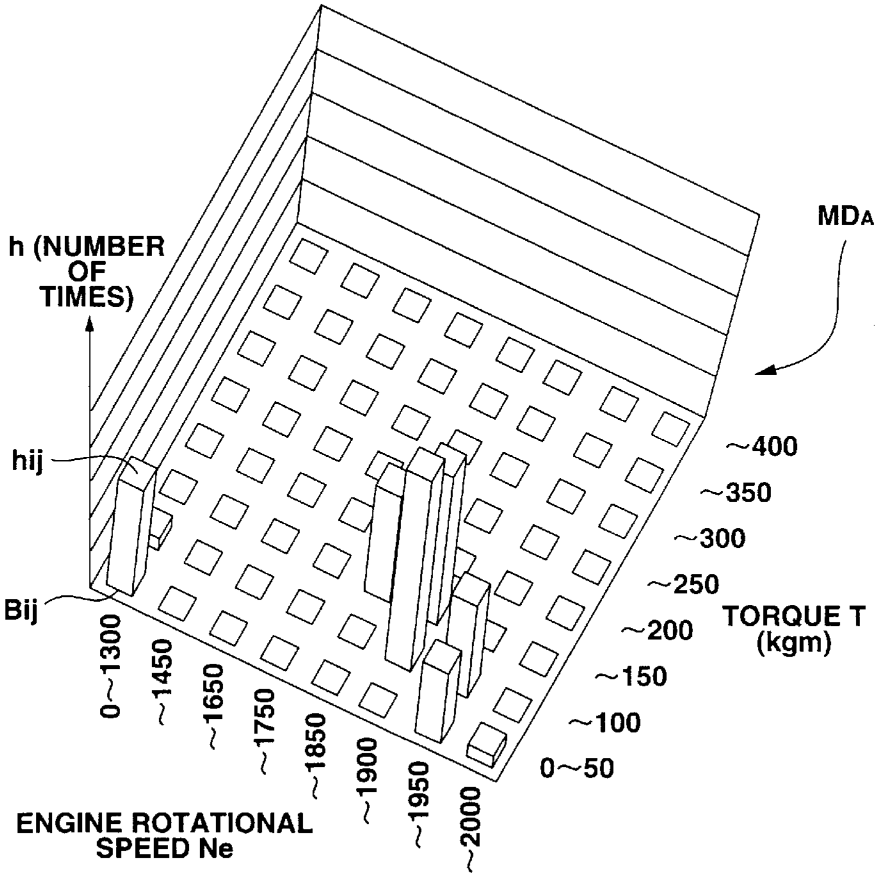
FIG. 10 is a figure giving an oblique view of a load frequency map.

FIG. 10 is an oblique view illustrating the concept of a load frequency map M1. In the FIG. 10, areas for divisions larger than 2000 rpm have been omitted from the 17 divisions for engine rotational speed.

The present mode of embodiment is provided with 2 mode frequency maps M1: a permanent map MDA where the frequency nij is integrated continuously from the time when the construction machine is shipped, and a temporary map MDB where the integrated value of the frequency nij is reset following an instruction to clear data. An information management monitor 2 is provided with a data-clearing switch to clear data. A switch whereby details of an instruction are input by touching a screen can be used as the data-clearing switch.

Figure 12A:
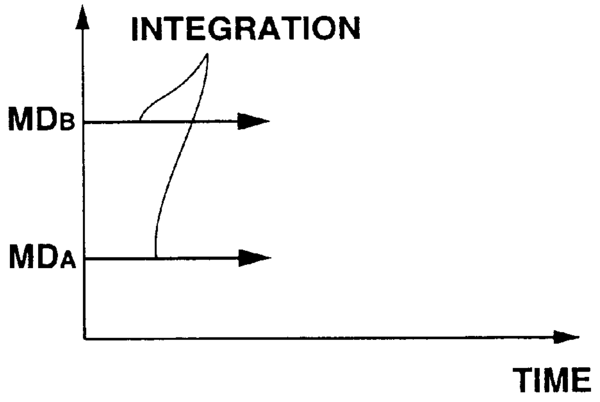
FIGS. 12(*a*), 12(*b*) and 12(*c*) are figures explaining the way in which the data of the load frequency map is reset.
Figure 12B:
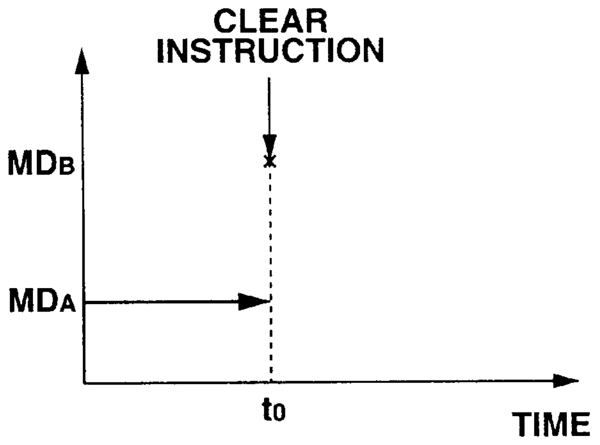
Figure 12C:
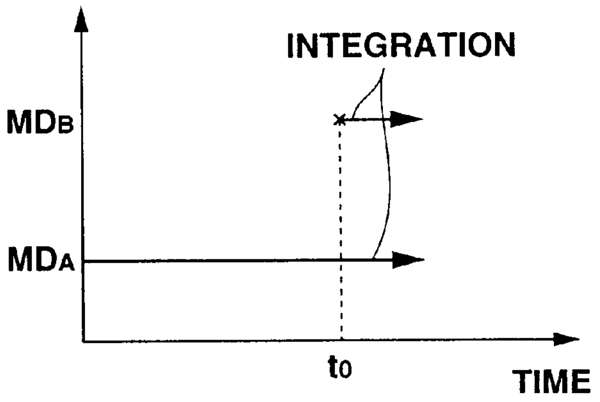

FIGS. 12(*a*) to 12(*c*) show the way in which integration processing is carried out as time passes in these 2 load frequency maps MDA and MDB.

As shown in the FIG. 12(*a*), in the load frequency map MDB the frequency nij continues to be integrated from the time of shipping of the construction machine (engine shipping time), provided that the data-clearing switch is not operated. However, as shown in FIG. 12(*b*), the integrated value of the load frequency map MDB is cleared following operation of the data-clearing switch and the input of an instruction to clear data at a time to. The integrated value before clearing the load frequency map MDB is either downloaded into a service tool 18 or sent to the monitoring station 19. Then, in the load frequency map MDB, the integrated value is reset and integration begins anew from the time to as shown in FIG. 12(*c*). In the permanent load frequency map MDA, on the other hand, integration continues regardless of whether the data-clearing switch has been operated or not. It should be noted that the integrated value of the load frequency map MDB may be automatically reset when the integrated value is downloaded to the service tool 18 or sent to the monitoring station 19. Resetting may be carried out at fixed times τ, and the integrated value stored automatically at each reset.

FIG. 11 shows a table in which the frequencies nij for each of the blocks Bij of the load frequency map M1 have been converted to percentages. 100% is taken to be the value obtained upon totaling the percentage-converted frequencies n'ij for all of the blocks Bij. For example, in the block B11 in which the engine rotational speed Ne is between 0 and 1300 rpm and the torque T is between 0 and 50 kgm, the percentage-converted frequency n'11 is 13.5%. It will be noted that the reason for converting the frequency nij into percentages is to reduce memory volume.

A weighting γij corresponding to the magnitude of the load in the block in question is respectively set in each of the blocks Bij of the load frequency frequency map M1. For example, a maximum weighting can be set in a block B corresponding to the rating point on the engine torque curve Tc in FIG. 9, since this constitutes the conditions where the largest load acts.

The amount of damage δ1 based on the load frequency map M1 is determined from the following equation (2).

$$\delta 1=\Sigma n'ij\cdot\gamma ij \quad (2)$$

This is to say, there is a weighting n'ij·γij which is obtained by applying the weighting γij to the percentage-converted frequency nij, and the value obtained upon applying this to all of the blocks Bij is taken as the amount of damage (degree of severity) δ1 inflicted on the engine up until a predetermined time τ has elapsed.

As shown in FIG. 6, lifespan can be determined for the parts group PT1 and the parts group PT3 based on the corresponding load frequency map M1. By way of example, lifespan is computed as follows.

Figure 7:
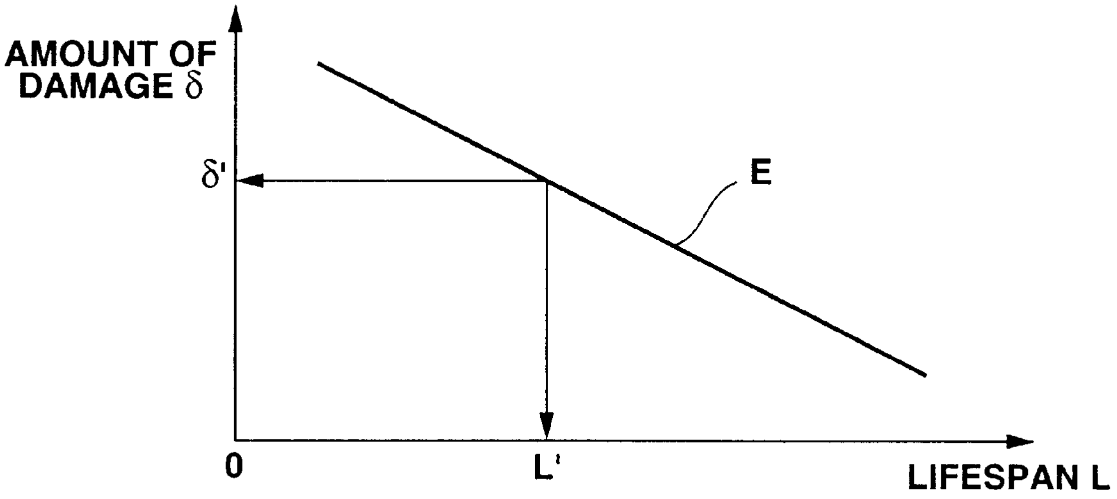
FIG. 7 is a figure showing the relationship between the amount of damage and lifespan.

FIG. 7 shows the correlation E between the amount of damage δ and the length L of the lifespan of a parts group (part). This correlation E can be predetermined as a lifespan line during development of the engine, by first carrying out durability tests and then inspecting tested parts.

The lifespan L' is determined from the point on the line E corresponding to the amount of damage δ' obtained in the abovementioned formula (2).

The value of the weighting γij can be made to differ for each of the parts groups PT1 and PT3. Further, when the lifespan is computed for each of the parts PT, the value of the weighting γij can be made to differ for each of the parts.

There now follows a description of the cycle time (cycle interval) M2.

Figures 13, 14:
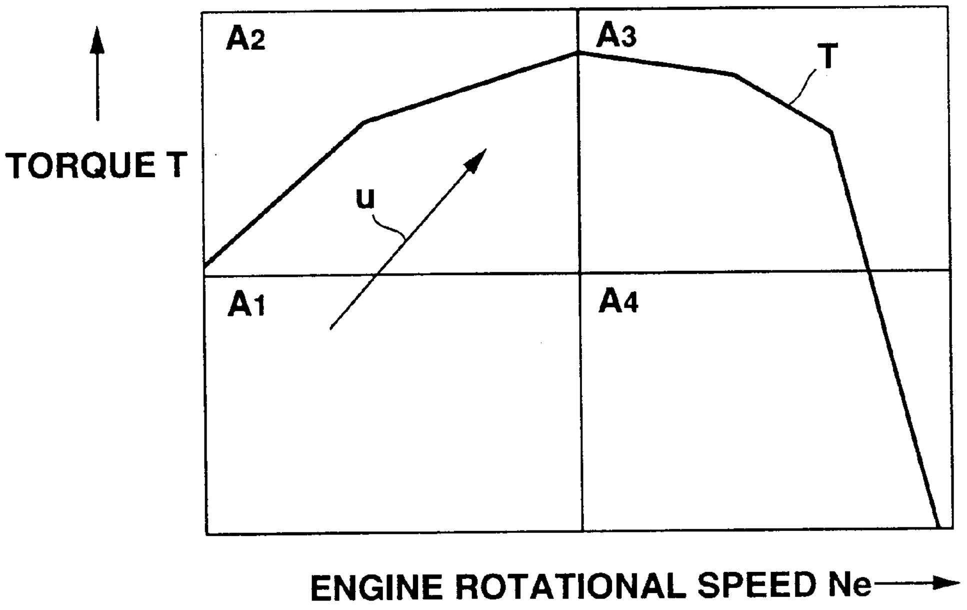
FIG. 13 is a figure showing a cycle time map.
FIG. 14 is a figure showing the division of a two dimensional surface of engine rotational speed and torque.

FIG. 13 shows details of the data of the cycle interval M2.

As shown in the FIG. 13, various variation ranges ΔNei of the engine rotational speed Ne are entered along the vertical axis i, and dwell times Δτ1 and Δτ2 are entered along the horizontal axis j. The dwell time Δτ1 is set at for example 5 seconds and the dwell time Δτ2 is set at for example 20 seconds. Also, there is division into the various blocks Bij.

Also, the operating parameter Ne is input at different sampling times Δt, and processing is carried out by the line flow method. The rotation variation range ΔNe in the dwell time Δτ1 and the rotation variation range ΔNe in the dwell time Δτ2 are determined, and a decision is taken as to whether or not the values of the rotation variation ranges ΔNe so determined fall into one or other of the blocks Bij. For example, if the rotation variation range (the difference between the minimum value and the maximum value of rotational speed) over a 5 second interval is 100 rpm, the decision is taken that this falls in the block B11 corresponding to the dwell time Δτ1 (5 seconds) and the rotation variation range ΔNe1 (0 to 200 rpm). In this way the in-fall frequencies nij are integrated for each of the blocks Bij. The integration is carried out until a predetermined time τ has elapsed, and integrated values are output every time that the predetermined time τ has elapsed. Similarly to the load frequency map M1, the map for the cycle time M2 can also have two types of map, a permanent map and a resetable map.

The frequencies nij of each of the blocks Bij of the cycle time M2 of FIG. 13 are converted into percentages in the same way as in FIG. 11 discussed hereinabove. 100% is taken to be the value obtained upon totaling the percentage-converted frequencies n'ij for all of the blocks Bij.

A weighting γij is respectively set for each of the blocks Bij of the cycle time M2.

The amount of damage δ2 based on the cycle time M2 is determined from the following equation (3).

$$\delta 2=\Sigma n'ij\cdot\gamma ij \quad (3)$$

This is to say, there is a weighting n'ij·γij which is obtained by applying the weighting γij to the percentage-converted frequency nij, and the value obtained upon applying this to all of the blocks Bij is taken as the amount of damage (degree of severity) δ2 inflicted on the engine up until the predetermined time τ has elapsed.

There now follows a description of the load movement map M3.

FIG. 14 shows an engine performance graph in which the engine rotational speed Ne is placed on the horizontal axis and the torque T is placed on the vertical axes. The reference Tc is the torque curve.

The engine rotational speed Ne on the horizontal axis of the engine performance graph is divided into two, and the torque T (the amount of fuel injection) is divided into two. Thus the graph is divided into four regions A1, A2, A3 and A4.

Figures 15, 16, 17:
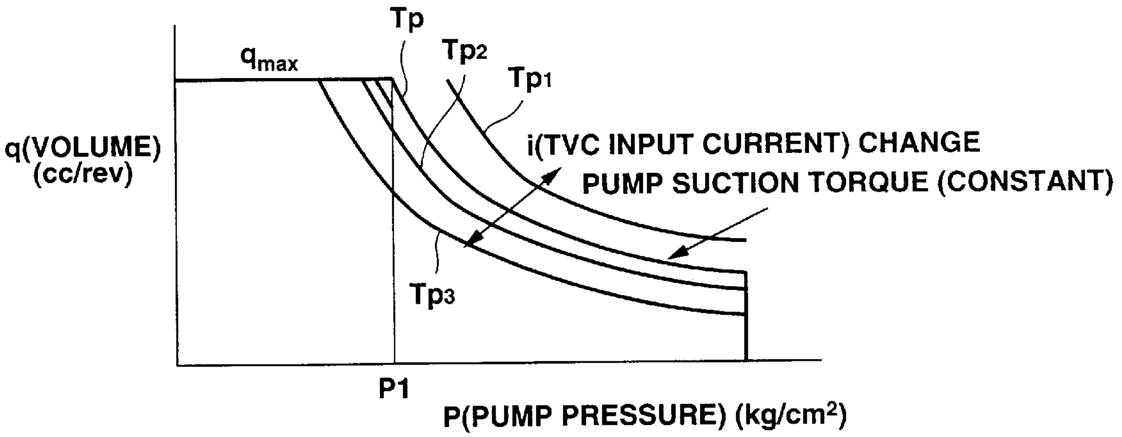
FIG. 15 is a figure showing a load movement map.
FIG. 16 is a figure showing a continuous running time map.
FIG. 17 is a figure showing the relationship between the pump pressure and the pump capacity.

FIG. 15 gives details of the data of the load movement map M3.

As shown in the FIG. 15, variation loci (variation directions) ui across the regions are entered along the vertical axis i, and the dwell times Δτ1 and Δτ2 are entered along the horizontal axis j. The dwell time Δτ1 is set at for example 5 seconds and the dwell time Δτ2 is set at for example 20 seconds. Also, there is division into the various blocks Bij.

The information management controller 1 successively decides whether the values of the operating parameters T and Ne obtained at each separate sampling time Δt fall within any of the regions A1 to A4. Also, the variation locus u in the dwell time Δτ1 and the variation locus u in the dwell time Δτ2 are determined, and a decision is taken as to whether or not the variation loci u so determined fall within any of the blocks Bij. For example, if the variation locus (the direction from the start of variation to the end of variation) over 5 seconds is u shown in FIG. 14, then the decision is taken that this falls in the block B11 corresponding to the dwell time Δτ1 (5 seconds) and variation locus ul (from A1 to A2). In this way the in-fall frequencies nij are integrated for each of the blocks Bij. The integration is carried out until a predetermined time τ has elapsed, and integrated values are output every time that the predetermined time τ has elapsed. Similarly to the load frequency map M1, the map of the load variation map M3 can also have two types of map, a permanent map and a resetable map.

The frequencies nij of each of the blocks Bij of the load variation map M3 of FIG. 15 are converted into percentages in the same way as in FIG. 11 discussed hereinabove. 100% is taken to be the value obtained upon totaling the percentage-converted frequencies n'ij for all of the blocks Bij.

A weighting γij is respectively set in each of the blocks Bij of the load movement map M3.

The amount of damage δ3 based on the load movement map M3 is determined from the following equation (4).

$$\delta=\Sigma n'ij\cdot\gamma ij \quad (4)$$

This is to say, there is a weighting n'ij·γij which is obtained by applying the weighting γij to the percentage-converted frequency nij, and the value obtained upon applying this to all of the blocks Bij is taken as the amount of damage (degree of severity) δ3 inflicted on the engine up until the predetermined time τ, has elapsed.

Here, as shown in FIG. 6, the lifespan of the parts group PT2 can be determined based on the corresponding cycle time M2 and load movement map M3.

In this case, the lifespan of the parts group PT2 can be determined in the following way. The amount of damage δ2 obtained from the abovementioned formula (3) and the amount of damage δ3 obtained from the abovementioned formula (4) are compared and the larger amount of damage δ is selected. Then, as shown in FIG. 7, the lifespan L is determined as the point on the lifespan line E corresponding to the selected amount of damage δ. It should be noted that one may optionally adopt a computation whereby the amount of damage 6 is determined from the values of the 2 amounts of damage δ2 and δ3, for example by averaging the values of the amount of damage δ2 and the amount of damage δ3.

Further, the respective lifespans L for the amount of damage δ2 and the amount of damage δ3 may be determined, and it may ultimately be decided that the shorter of the lifespans is the lifespan. In this case as well, one may optionally adopt a computation whereby the lifespan is judged from the values of 2 lifespans, for example by averaging the lifespan determined from the amount of damage δ2 and the lifespan determined from the amount of damage δ3.

It should be noted that, when lifespans are computed for different constituent parts PT of a parts group PT2, the value of the weighting γij can be made to differ for each of the parts.

The lifespan of the engine is determined in the following way.

The lifespan L determined for the parts group PT1, the lifespan L determined for the parts group PT2, and the lifespan L determined for the parts group PT3 are compared and it is ultimately judged that the shortest of the lifespans is the lifespan of the engine. It should be noted that one may optionally adopt a computation method whereby the lifespan of the engine is ultimately judged from the values of the 3 lifespans, for example by averaging the lifespans.

Further, one may also compute the lifespans of different parts PT, and ultimately judge that the shortest value lifespan determined for the different parts PT is the lifespan of the engine. In this case as well, one may optionally adopt a computation method in which the lifespan of the engine is ultimately judged from the values of the lifespans of different types of part, for example by averaging the values of the lifespans.

When the present mode of embodiment is employed as outlined above, lifespans are computed for different parts groups or parts based on integrated values obtained from 1, 2 or more corresponding maps M1, M2 and M3, and the lifespan of the engine is determined from the lifespans of the different parts groups or parts, and thus numerical values can be accurately placed on the amount of damage inflicted on the various parts of the engine, and the lifespan of the engine can be accurately determined. Therefore the engine can be overhauled, repaired or the like with the most appropriate timing, the efficiency of servicing operations such as repairs and checks of construction machinery can be dramatically improved, and one can avoid causing major damage to the engine.

It will be noted that, as shown in FIG. 6, in the present mode of embodiment the parts group PT1 is matched with the load frequency map M1, the parts group PT2 is matched with the cycle time M2 and the load movement map M3, and the parts group PT3 is matched with the load frequency map M1. However the present invention is not limited to the matchings shown in FIG. 6.

The load frequency map M1 can evaluate the amount of damage arising from the factors (1) mechanical stress (high cycle fatigue), (2) thermal stress (low cycle fatigue) and (3) abrasion (running conditions). Further the cycle time M2 can evaluate the amount of damage arising from the factors (2) thermal stress (low cycle fatigue) and (3) abrasion (running conditions). Further the load movement map M3 can evaluate the amount of damage arising from the factors (2) thermal stress (low cycle fatigue) and (3) abrasion (running conditions).

Thus the parts group PT1 may be matched with the load frequency map M1, the parts group PT2 may be matched with the cycle time M2 and the parts group PT3 may be matched with the load movement map M3. In essence, the various parts groups may be matched the map M1, M2 or M3 which is appropiate for evaluating the amount of damage. Further, depending on the circumstances, lifespan may be determined using the two maps: the load frequency map M1 and the cycle time M2, and lifespan may be determined using the two maps: the load frequency map M1 and the load movement map M3, and not using the load frequency map M1, cycle time M2 and load movement map M3.

Further, lifespan may be computed by adding a continuous running time map M4 discussed hereinbelow.

FIG. 16 shows details of data in the continuous running time map M4. The continuous running time map M4 is produced based on data of the load movement map M3.

As shown in the FIG. 16, the continuous running time Δτi is entered along the vertical axis i, and the regions A1, A2, A3 and A4 are entered along the horizontal axis j. Continuous running times Δτ1, Δτ2 and Δτ3 are, by way of example, respectively set at from 5 to 10 seconds, 10 to 20 seconds, and 20 seconds and longer. Also, there is division into the various blocks Bij.

The information management controller 1 integrates the in-fall frequencies nij for each of the blocks Bij. For example, if there is continuous operation in the region A1 for 7 seconds, a decision is made that this falls within the block B11 corresponding to the continuous running time Δτ1 (5 to 10 seconds) and the region A1. The integration is carried out until a predetermined time τ has elapsed, and integrated values are output every time that the predetermined time τ has elapsed. Similarly to the load frequency map M1, the continuous running time map M4 may also have two types of map, a permanent map and a resetable map. Then in the same way the amount of damage δ4 is computed based on the percentage-converted frequencies n'ij and the weighting γij, and the lifespans of the product groups or products are computed.

The continuous running time map M4 can evaluate the amount of damage arising from the factors (2) thermal stress (low cycle fatigue) and (3) abrasion (running conditions).

Thus, in FIG. 6, evaluation may be made by adding the continuous running time map M4 in order to compute the lifespan of the parts group PT2. Further, depending on the circumstances, the continuous running time map M4 may be used instead of the load movement map M3.

It will be noted that the lifespan of the engine can be determined even more precisely if the evaluation is made with additional adjustment for irregularities occuring in the engine added to the amount of damage (degree of severity). Irregularities occuring in the engine can be decided from, by way of example, data about the blow-by pressure, the engine rotational speed during the maximum blow-by pressure, the hot pressure during the maximum blow-by pressure, the exhaust gas temperature, the engine oil temperature, the atmospheric temperature, and the atmospheric pressure.

Data about the lifespan of the engine and data about the lifespan of each of the abovementioned parts groups or parts computed by the information management controller 1 is sent to the monitoring station 19. Thus the monitoring station 19 can manage the lifespan of the engine of a plurality of construction machines. Thus the timing of servicing operations such as repairs and checks of a plurality of items of construction machinery dispersed in various places can be accurately decided, and servicing instructions can be given to appropriate members of staff at appropriate times. Further, data about the lifespan of the engine and data about each of the abovementioned parts groups and parts computed by the information management controller 1 is downloaded to a service tool 18. Thus a member of maintenance staff (a service man) can promptly decide whether or not it is time to carry out a check or repair, without the need for the task of analyzing data on site. Thus the work efficiency in servicing operations such as checks and repairs is dramatically improved.

There now follows a description of a mode of embodiment involving the computation of the lifespan of a hydraulic pump or hydraulic motor provided in a construction machine.

The hydraulic pump is driven by the engine. In hydraulic pumps of the variable capacity type the drive source is a hydraulic actuator (hydraulic cylinder, hydraulic motor). In hydraulic pumps of the fixed capacity type the drive source is pilot hydraulic oil occurring when an operational signal produced by an operating lever is supplied via pilot tubing to a flow control valve, for example. A "hydraulic motor" is a hydraulic actuator driven in rotation by means of the flow of hydraulic oil ejected from a hydraulic pump, via a flow control valve and into a hydraulic in-flow port. The hydraulic motor actuates, by way of example, a swiveling body or traveling body.

In the description of the present mode of embodiment a hydraulic pump is taken as representative. The present mode of embodiment allows for a pump of the variable capacity type, and allows for a configuration in which an inclined plate (volume) q (cc/rev) is controlled by a TVC (torque-variable control) valve. The TVC valve is, by way of example, driven by means of a control signal i output from the pump controller 3 shown in FIG. 3. Details of the control by the TVC valve are discussed using FIG. 17.

FIG. 17 is a graph showing the P-q curve of the hydraulic pump. The horizontal axis gives the pump pressure P ($kg/cm^2$) which is the pressure of the hydraulic oil ejected from the hydraulic pump, and the vertical axis gives the capacity q (cc/rev) which is the flow ejected at each rotation of the pump.

Figure 18:
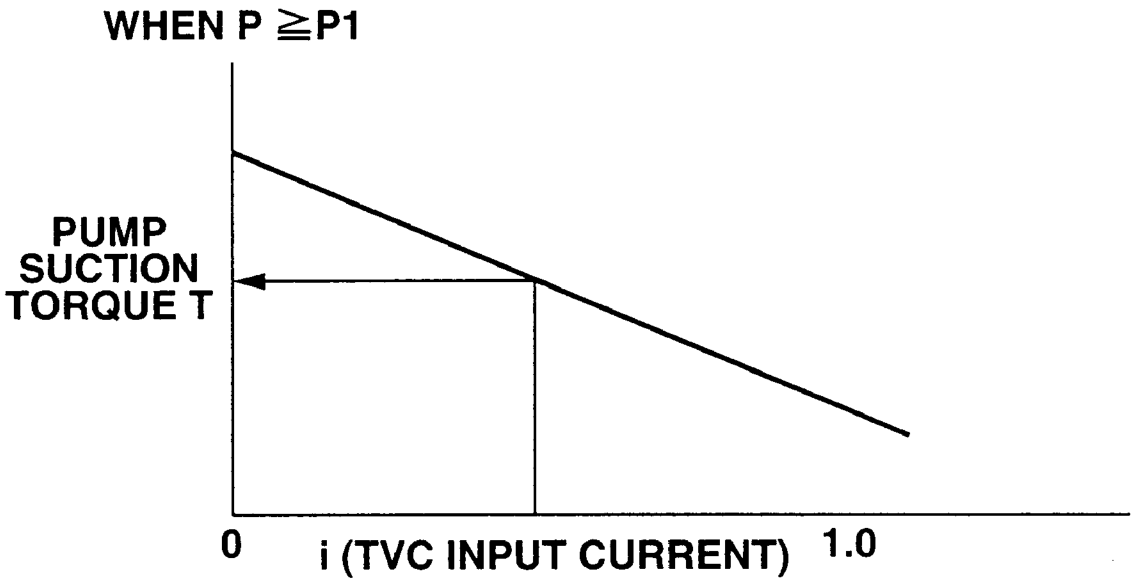
FIG. 18 is a figure showing the relationship between the TVC valve input electrical current and the pump suction torque.

The line Tp on the P-q curve shows the line where the pump suction torque has a constant value Tp. The TVC valve is provided in order to keep the suction torque of the hydraulic pump constant. This is to say, the angle of rotation of the inclined plate is controlled in such a way that the product of the pump pressure P and the volume q is constant. Moreover, the TVC valve is used in order to keep the combined suction torque of a plurality of hydraulic pumps constant. As shown in FIG. 18, the TVC valve controls the inclined plate of the hydraulic pump in such a way that the pump suction torque T diminishes as the control current value i input to the TVC valve increases. Thus, as shown in FIG. 17, the P-q curve changes in accordance with the magnitude of the current i input to the TVC valve, and the torque-constant line changes to T1, T2, T3 . . . .

Because the suction torque T of the hydraulic pump is fixed in this way in accordance with the current i output from the pump controller 3, the current value i can be acquired by the pump controller 3. Moreover a sensor which detects the current value i may be provided. Data about the current value i is sent to the information management controller 1. The information management controller 1 computes the pump suction torque T from the current value i. Here there is the proviso that, when the pump pressure P is less than P1, the pump suction torque T is computed using the following formula (5) since it does not fall on the line Tp, as shown in FIG. 17.

$$T=P\cdot q\max/200\pi \qquad (5)$$

It should be noted that the pump suction torque T may be detected by providing a sensor which directly detects torque. Further, the pump suction torque T may be computed by detecting the volume q of the hydraulic pump and the pump discharge pressure P.

Figure 19:
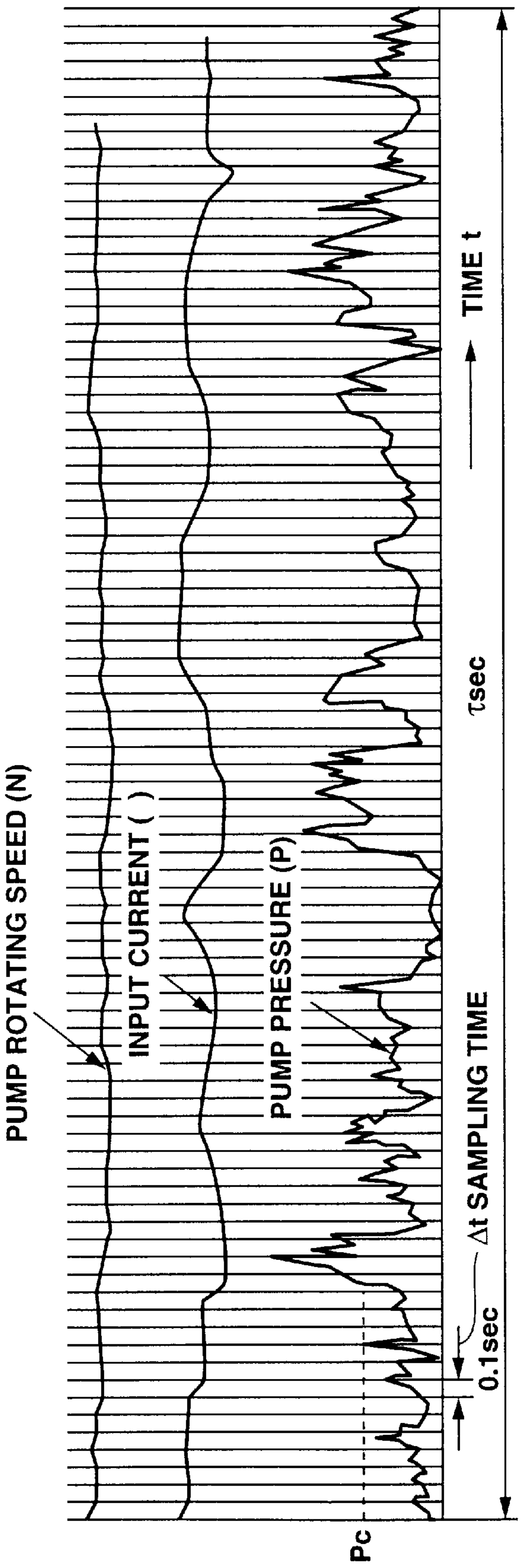
FIG. 19 is a figure showing data gathered at different sampling intervals.

FIG. 19 shows operating parameters, which is to say the pump rotational speed N, the input current i to the TVC valve, and the pump discharge pressure P, which are gathered in the information management controller 1 at different sampling times Δt. FIG. 19 shows the way in which operating parameters change over a predetermined length of time τ. Operating parameters are integrated each time that a predetermined length of time τ (e.g. 20 hours) has elapsed, as discussed hereinbelow.

The rotational speed N of the hydraulic pump is obtained by multiplying the rotational speed of the engine Ne detected by an engine rotational-speed sensor, by a known constant. Thus, the rotational speed N of the pump is acquired at different sampling times Δt from values detected by the engine rotational-speed sensor. The pump suction torque T is computed at different sampling times Δt based on the current i input at the different sampling times Δt.

A threshold value Pc is set for the pump pressure P, and a decision is taken as to whether or not successive pressure values P are above the threshold value Pc. Also, the number of times that the pressure value P reaches a peak pressure above the threshold value Pc at the different sampling times Δt is counted up and is integrated whenever the predetermined length of time τ (20 hours) elapses. Also, the peak pressure frequency np per unit time (times/H) is determined by dividing the integrated peak pressure frequency by the predetermined length of time τ (20 hours).

The lifespan of the hydraulic pump is basically governed by the lifespan of the bearings (bearing parts).

A formula whereby the lifespan of bearings is determined can be expressed by the following formula (6) in which Tm is the average equivalent pump suction torque.

Bearing lifespan $$-1/(\text{pump rotating speed N})\cdot(\text{average equivalent pump suction torque Tm})\ 3.33 \qquad (6)$$

In the present mode of embodiment, the bearing lifespan is computed on the assumption that the bearing rotating speed N has a constant value. The average equivalent pump suction torque Tm can be determined, as shown in the following formula (7), by integrating, until the predetermined length of time τ (20 hours) has elapsed, the pump suction torque value Ti computed at each of the sampling times Δt, and taking the average value.

$$Tm=(\Sigma Ti^{3.33}/\Delta t)^{0.3} \quad (7)$$

It will be noted that the average equivalent pump rotational speed may similarly be determined for the pump rotational speed N as well.

Figure 20:
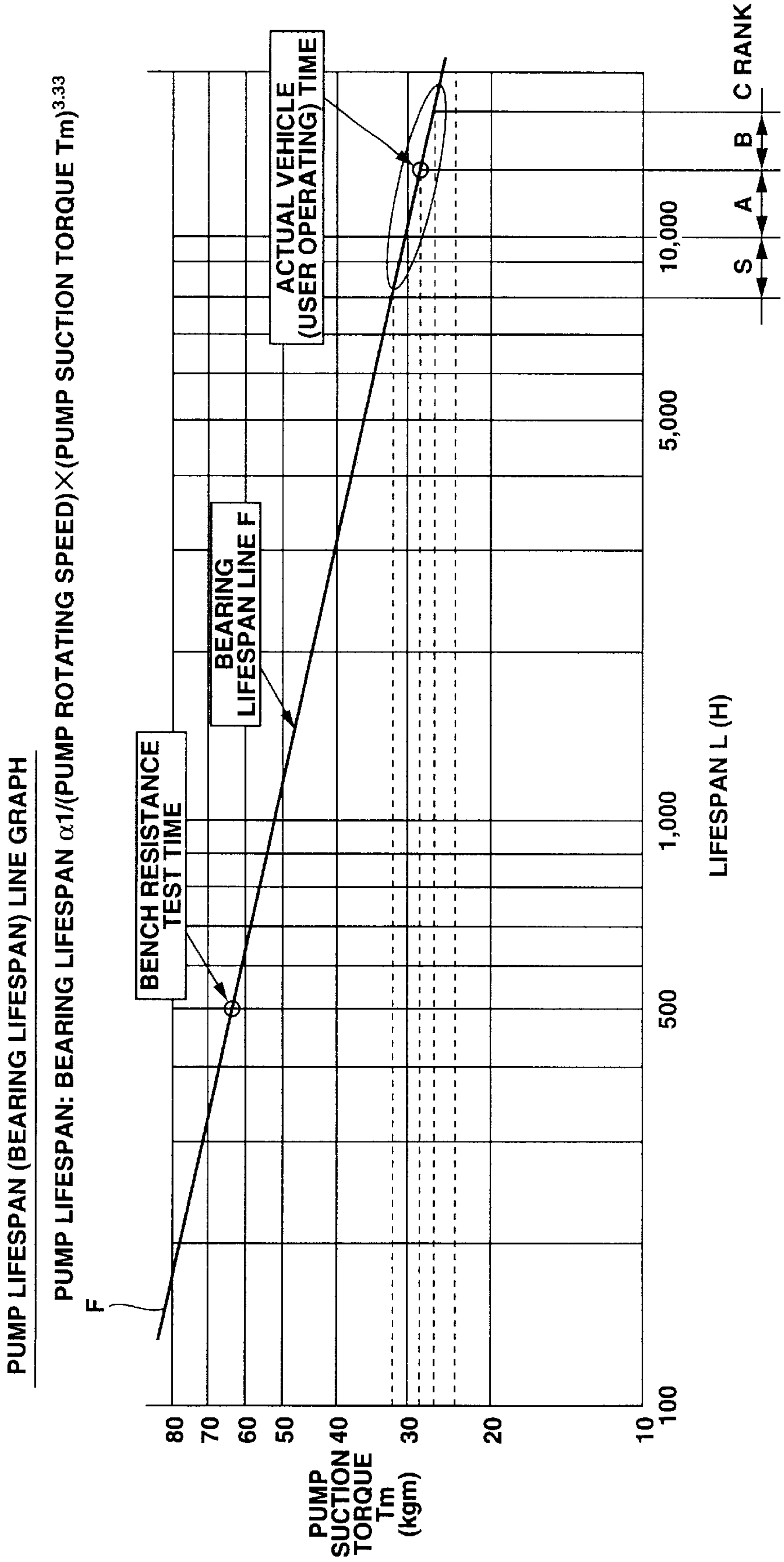
FIG. 20 is a figure showing the relationship between average equivalent pump suction torque and lifespan.

FIG. 20 shows a lifespan line F in which the lifespan of a bearing is computed in accordance with the abovementioned formula (6).

FIG. 20 shows the correspondence F between the average equivalent pump suction torque Tm and the length L (H) of the lifespan of the bearing (lifespan ranks S, A, B and C). This correspondence F can be determined in advance as a lifespan line during development of the engine, by first carrying out durability tests and then inspecting tested parts.

Lifespan rank is determined from the point on the lifespan line F corresponding to the average equivalent pump suction torque Tm computed as discussed hereinabove.

FIG. 21 shows the correspondence between various ranges of the average equivalent pump suction torgue Tm on the vertical axis of FIG. 20 and the lifespan ranks S, A, B and C on the horizontal axis of FIG. 20. Overhaul (recommendation) times (H) are matched with the lifespan ranks S, A, B and C.

Here, the pump suction torque T is proportional to the pump pressure P. Thus the average equivalent pump pressure Pm can be determined in the same way as with the abovementioned formula (7), and the lifespan rank of the bearing can be fixed in the same way.

Figure 22:
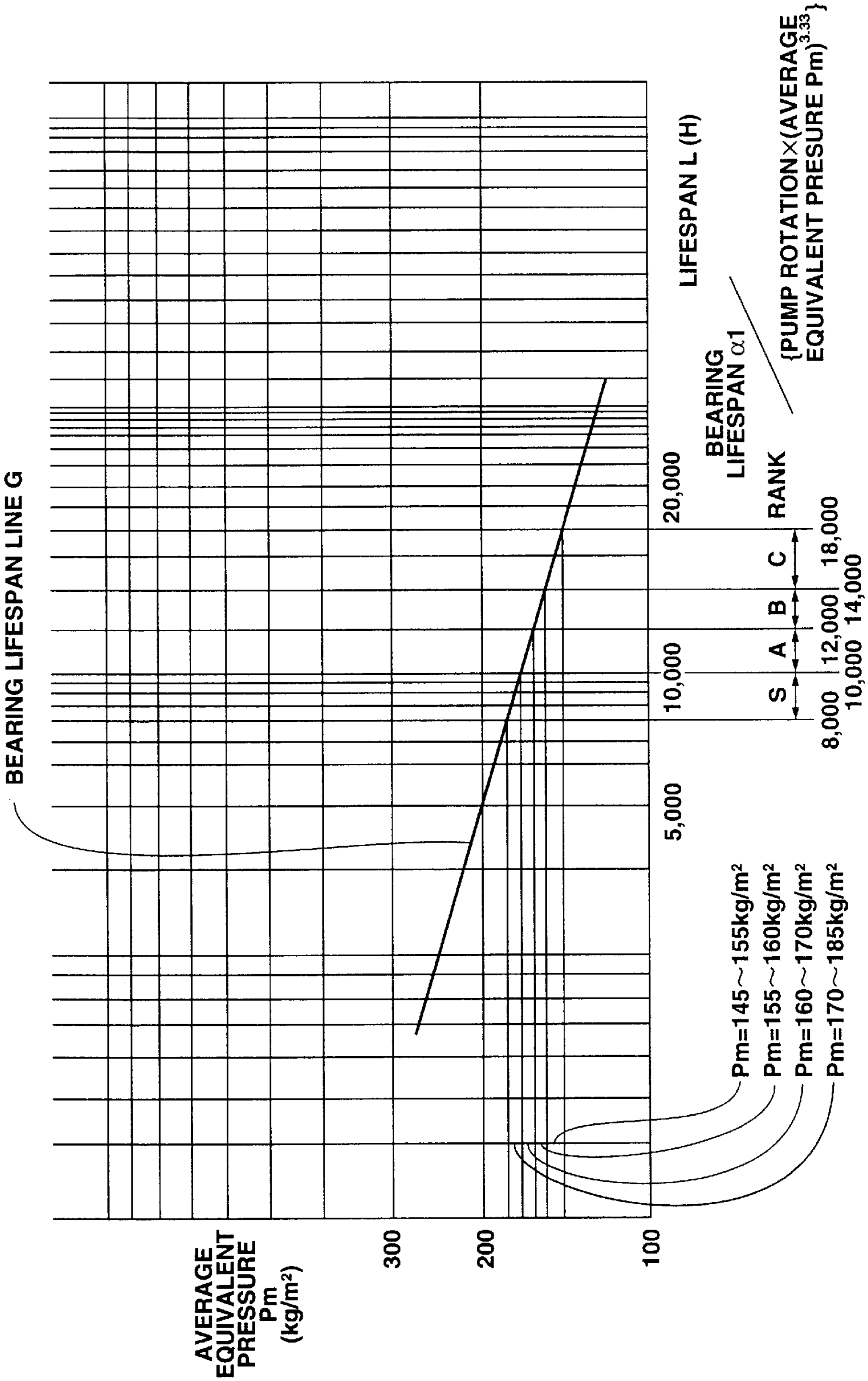
FIG. 22 is a figure showing the relationship between average equivalent pressure and lifespan.

FIG. 22 shows the correspondence G between the average equivalent pump pressure Pm and the length L (H) of the lifespan of the bearing (lifespan ranks S, A, B and C).

Also, lifespan rank is determined from the point on the lifespan line G corresponding to the average equivalent pump pressure Pm computed as discussed hereinabove.

The range of between 170 and 185 kg/cm$^2$ in the average equivalent pump pressure Pm on the vertical axis of FIG. 22 corresponds to the lifespan rank S (between 8000 and 10,000 hours) on the horizontal axis of FIG. 20. Similarly, the range of between 160 and 170 kg/cm$^2$ in the pressure Pm corresponds to the lifespan rank A (between 10,000 and 12,000 hours), the range of between 155 and 160 kg/cm$^2$ in the pressure Pm corresponds to the lifespan rank B (between 12,000 and 14,000 hours), and the range of between 145 and 155 kg/cm$^2$ corresponds to the lifespan rank C (between 14,000 and 18,000 hours).

The peak pressure frequency np per unit time (times/H) computed in the same way as discussed hereinabove is used in order to evaluate the load levels of various pumps when there is a plurality of hydraulic pumps. The larger the peak pressure frequency np per unit time, the greater will be the frequency of operation of working machines such as booms, the upper swiveling body and the lower traveling body, to which extent a correspondingly greater load is placed on the hydraulic pump.

Figure 23:
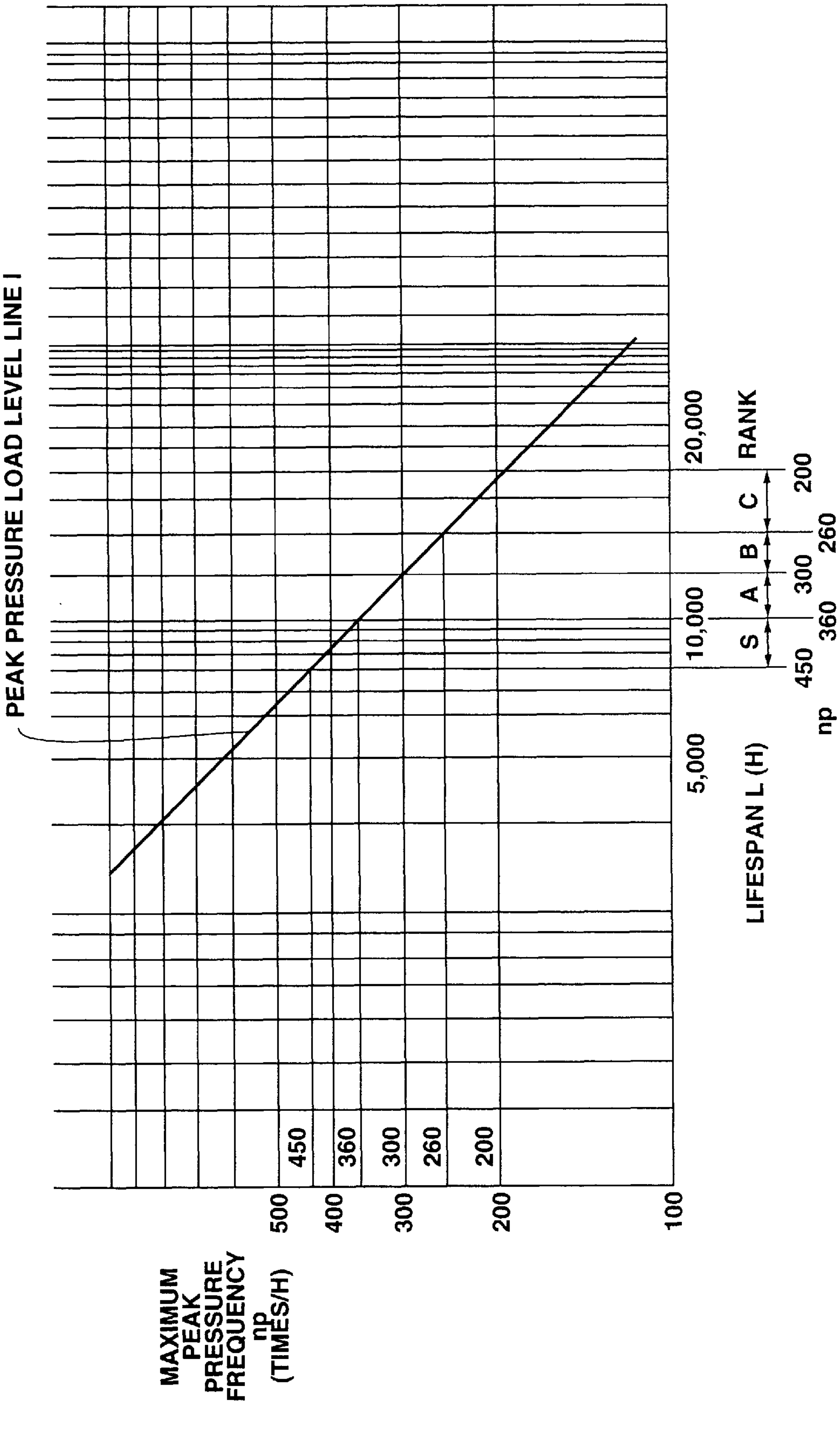
FIG. 23 is a figure showing the relationship between the peak pressure frequency per unit time and lifespan.

FIG. 23 shows the correspondence I between the peak pressure frequency np per unit time and the length L (H) of lifespan (load levels S, A, B and C).

Also, the load level is determined from the point on the load level line I corresponding to the peak pressure frequency np per unit time computed as discussed hereinabove.

The range of between 360 and 430 times/H in the peak pressure frequency np per unit time on the vertical axis in FIG. 23 corresponds to the load level S (severity level) on the horizontal axis in FIG. 23. Similarly, the range of between 300 and 360 times/H in the peak pressure frequency np corresponds to the load level A (heavy load level), the range of between 260 and 300 times/H in the peak pressure frequency np corresponds to the load level B (moderate load level), and the range of between 200 and 260 times/H in the peak pressure frequency np corresponds to the load level C (light load level).

The load level is respectively determined for the plurality of hydraulic pumps. Also, a decision can be made as to which of the loads on the hydraulic pumps is substantial, with a short lifespan, by comparing the load levels.

This is to say, in construction machines such as hydraulic shovels, it will often be the case that a maximum of about 6 hydraulic pumps will be used. However, the way in which loads come to bear on hydraulic pumps differs depending on the working conditions, and it is not always the case that equivalent loads are borne by the plurality of hydraulic pumps. Thus the load level is determined for each of the hydraulic pumps and the load levels of the hydraulic pumps are compared, and thus one can ascertain which of the hydraulic pumps has a long lifespan and which has a short one.

The present mode of embodiment allows for a case in which the lifespan of the bearing is not computed based on the peak pressure frequency np (times/H). It will be noted that it is also possible to adopt an embodiment in which the lifespan of the bearing is computed based on the peak pressure frequency np (times/H).

The lifespan of the hydraulic pump is mainly governed by the lifespan of bearings where load is a factor. However, the deterioration level in bearings also varies due to the factor of the activating oil temperature. The activating oil temperature is a factor governing the lifespan of oil-sealing parts such as O-rings. Thus the lifespan of a hydraulic pump determined using the lifespan of bearings is revised using the lifespan of oil-sealing parts where activating oil temperature is a factor. The lifespan of hydraulic pumps is determined to a high degree of precision using this revision.

In the present mode of embodiment, the temperature Rt of the hydraulic oil circulating within the tank is used as the activating oil temperature. The oil temperature within the tank is detected at different sampling times Δt using an oil-temperature sensor, and is input to the information management controller 1. Also, in the same way, the tank average equivalent oil temperature Rt (° C) is computed when a predetermined length of time τ has elapsed.

Figure 24:
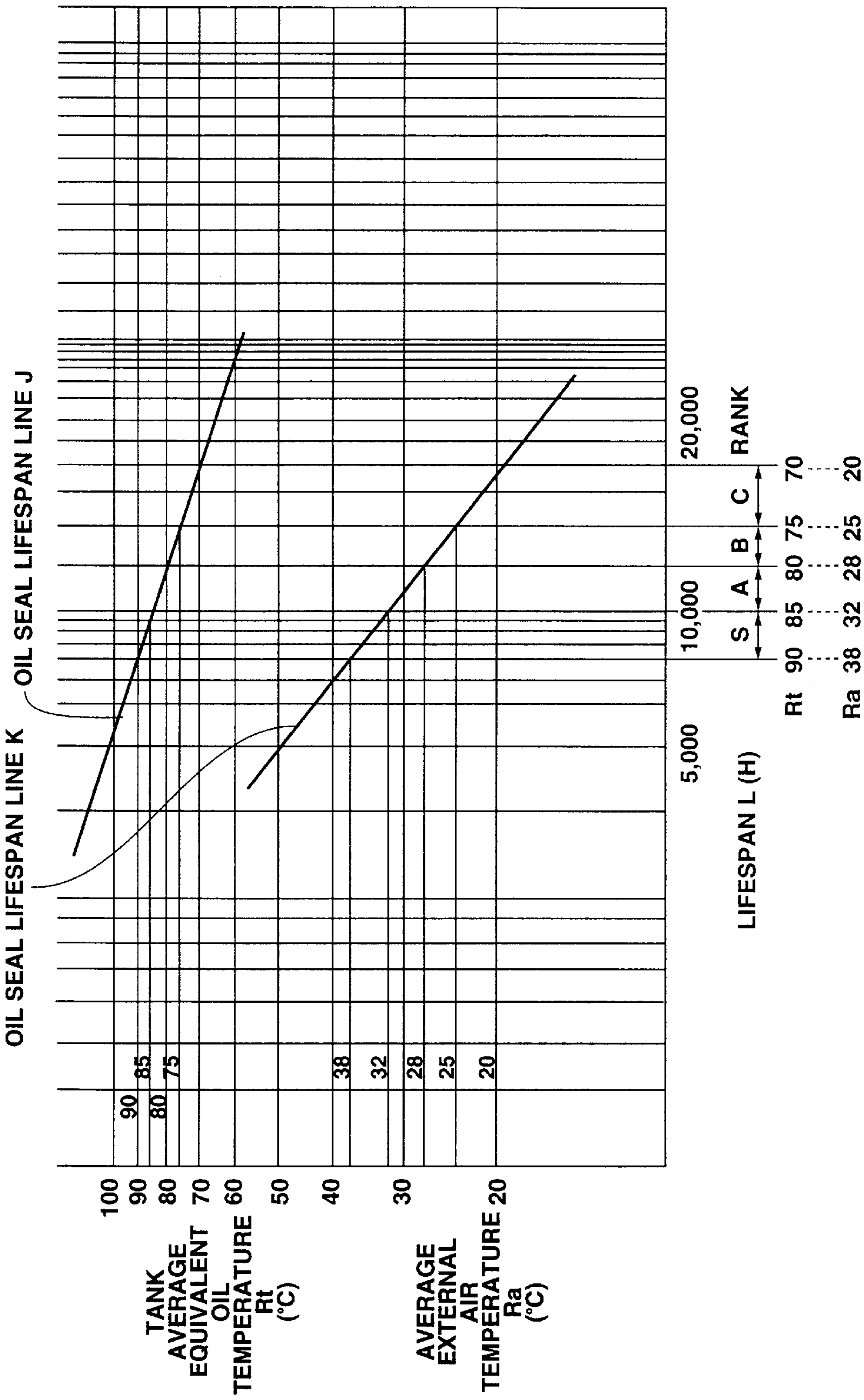
FIG. 24 is a figure showing the relationship between the tank average equivalent oil temperature, average external air temperature and lifespan.

FIG. 24 shows the correspondence J between the tank average equivalent oil temperature Rt and the length L (H) of the lifespan of the oil seal (lifespan ranks S, A, B and C).

Also, the lifespan rank is determined from the point on the lifespan line J corresponding to the tank average equivalent oil temperature Rt computed as discussed above.

The region of between 85 and 90° C. in the tank average equivalent oil temperature Rt on the vertical axis of FIG. 24 corresponds to the lifespan rank S (between 8000 and 10,000 hours) on the horizontal axis of FIG. 24. Similarly, the range of between 80 and 85° C. in the oil temperature Rt corresponds to the lifespan rank A (between 10,000 and 12,000 hours), the range of between 75 and 80° C. in the oil temperature Rt corresponds to the lifespan rank B (between 12,000 and 14,000 hours), and the range of between 70 and 75° C. in the oil temperature Rt corresponds to the lifespan rank C (between 14,000 and 18,000 hours).

In the present mode of embodiment the lifespan of the oil seal is computed using the atmospheric temperature Ra besides the oil temperature Rt inside the tank. The external air temperature is detected at the different sampling times Δt by means of a temperature sensor, and is input to the information management controller 1. Also, in the same way, the average external air temperature Ra (° C.) is computed when a predetermined length of time τ elapses.

The FIG. 24 shows the correspondence K between the average external air temperature Ra and the length L (H) of the lifespan of an oil seal (lifespan rank S, A, B and C).

Also, the lifespan rank is determined from the point on the lifespan line K corresponding to the average external air temperature Ra computed as discussed above.

The range of between 32 and 38° C. in the average external air temperature Ra on the vertical axis of FIG. 24 corresponds to the lifespan rank S (between 8000 and 10,000 hours) on the horizontal axis of FIG. 24. Similarly, the range of between 28 and 32° C. in the average external air temperature Ra corresponds to the lifespan rank A (between 10,000 and 12,000 hours), the range of between 25 and 28° C. in the average external air temperature Ra corresponds to the lifespan rank B (between 12,000 and 14,000 hours), and the range between 20 and 25° C. in the average external air temperature Ra corresponds to the lifespan rank C (between 14,000 and 18,000 hours).

The lifespan of the hydraulic pump is determined as follows.

The lifespan (overhaul timing) of the hydraulic pump is ultimately judged to be the following lifespan rank which lasts the shortest time: the lifespan rank determined from the average equivalent pump suction torque Tm, the lifespan rank determined from the average equivalent pressure Pm, the lifespan rank determined from the tank average equivalent oil temperature Rt, and the lifespan rank determined from the average external air temperature Ra. There are no particular restrictions on the method of ultimately judging the lifespan of the hydraulic pump from the lifespan ranks which have respectively been determined, for example averaging the central values of the various lifespan ranks.

In the present invention the lifespan of a hydraulic pump can be determined to a high degree of precision provided that it is at least possible to determine the lifespan rank which is determined from the average equivalent pump suction torque Tm, and the lifespan rank which is determined from the tank average equivalent oil temperature Rt.

The lifespan of a hydraulic motor can also be determined in the same way as a hydraulic pump.

As outlined above, when the present mode of embodiment is employed, the lifespan of a hydraulic pump and/or hydraulic motor is determined automatically and accurately. Thus operations such as overhauling and repairing hydraulic pumps and hydraulic motors can be carried out with the most appropriate timing, and the efficiency of servicing operations such as repair and checking of construction machines is dramatically improved. Further, one can avoid causing major damage to the hydraulic pump and/or hydraulic motor.

Data about the lifespan of the hydraulic pump and/or hydraulic motor computed by the information management controller 1 is sent to the monitoring station 19. Thus the monitoring station 19 can manage the lifespans of hydraulic pumps and/or hydraulic motors provided in a plurality of construction machines. Thus the timing of servicing operations such as repairs and checks of a plurality of items of construction machinery dispersed in various places can be accurately decided, and servicing instructions can be given to appropriate members of staff at appropriate times. Further, data about the lifespan of the hydraulic pump and/or hydraulic motor computed by the information management controller 1 is downloaded to a service tool 18. Thus a member of maintenance staff (a service man) can promptly decide whether or not it is time to carry out a check or repair, without the need for the task of analyzing data on site. Thus the work efficiency in servicing operations such as checks and repairs is dramatically improved.

The information management controller 1 produces and manages information about the work volume and operating state of the construction machine. This is discussed hereinbelow.

In locations involving work over a wide area such as mines, a hydraulic shovel performs loading work whereby excavated earth and sand or the like is loaded onto a dump truck. It is extremely important, in terms of establishing a production management plan, that a monitoring station, which manages and monitors the locations involving work over a wide area, acquires management information in the form of the work volumes of a plurality of hydraulic shovels during operation.

The work volume V per hour (m3/h) of a hydraulic shovel is determined theoretically by means of the Formula (1) discussed hereinabove ($V=Qv\cdot(3600/St)\cdot a\cdot(1/\beta)$).

In the present mode of embodiment, the abovementioned operating percentage $\alpha$ and constituent percentage of loading $\beta$ are accurately calculated, and the work volume V per hour is accurately determined.

Figure 25:
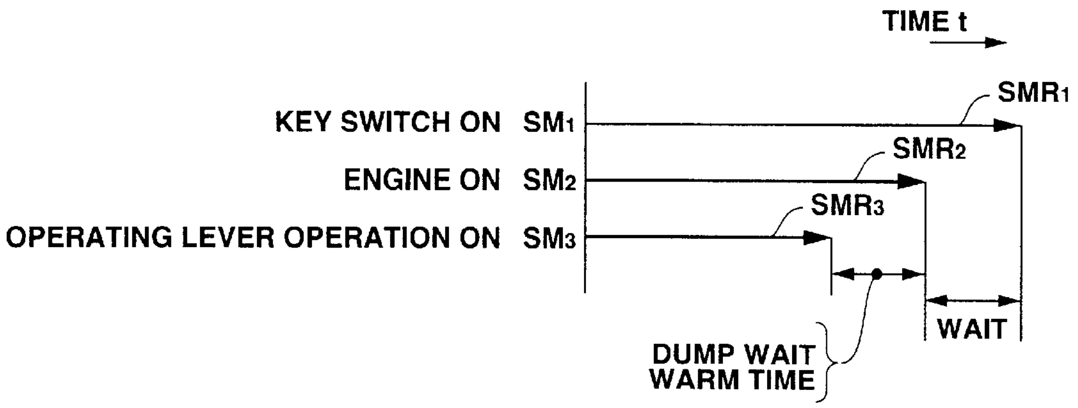
FIG. 25 is a figure showing, in concept, changes in the integrated values of various service meters.

On the inside of the construction machine is provided a first service meter SM1 and a third service meter SM3, separately from a service meter SM2 (referred to as the second service meter) which integrates the engine operating time. FIG. 25 shows the concept of how these three service meters are used to integrate the time t.

The second service meter SM2 is an integrating means which integrates the time over which the engine rotates, and it integrates the engine operating time SMR2 by integrating the time over which the voltage value of an alternator is above a predetermined threshold value, or the time over which the engine rotational speed Ne is above a predetermined threshold value (a rotational speed which is larger than 0 revolutions and higher than the idling rotational speed).

The first service meter SM1 integrates a key switch on time SMR1 when the engine key switch is turned on and electrical power is supplied to the controller from a power source (battery).

In the construction machine, a working machine such as a boom is activated by operating a working machine operating lever out of a neutral position. Further, an upper swiveling body is driven so as to swivel by the operation of a swiveling body operating lever from its neutral position. Further, a lower traveling body is driven so as to travel by the operation of a traveling body operating lever from its neutral position. If the operating lever is a hydraulic type of lever, a pilot pressure corresponding to the amount by which the operating lever is operated is supplied, via pilot tubing, to a flow control valve. A pressure sensor is provided in the pilot tubing, and the fact that the operating lever has been operated can be detected by having the pressure sensor detect that the pilot pressure Pr within the pilot tubing is above a predetermined threshold value. It will be appreciated that if the operating lever is an electrical operating lever, an electrical signal corresponding to the amount by which the operating lever has been operated can be detected as, for example, the voltage output value of a potentiometer for detecting the amount of twisting of the operating lever. Thus the fact that the operating lever has been operated can similarly be detected from an electrical signal output from a potentiometer or the like.

The present mode of embodiment allows for an operating lever of the hydraulic type. A hydraulic signal Prw (a pilot pressure above a predetermined threshold value) indicating that the working machine operating lever has been operated is detected by a working machine pressure sensor. Further, a pressure signal Prs (a pilot pressure above a predetermined threshold value) indicating that the swiveling body operating lever has been operated is detected by a swiveling-body pressure sensor. Further, a pressure signal Prt (a pilot pressure above a predetermined threshold value) indicating that the traveling-body operating lever has been operated is detected by a traveling-body pressure sensor.

The third service meter SM3 integrates the time SER over which the operating levers are operated following the detection signals Prw, Prs and Prt from the abovementioned pressure sensors, which is to say the time SER over which any of the working machine, swiveling body and traveling body are operated. It should be noted that the third service meter SM3 may integrate a time SER over which only the working machine operating lever operates following only the detection signal Prw of the working machine pressure sensor, which is to say the time SER over which the working machine operates.

Figure 26:
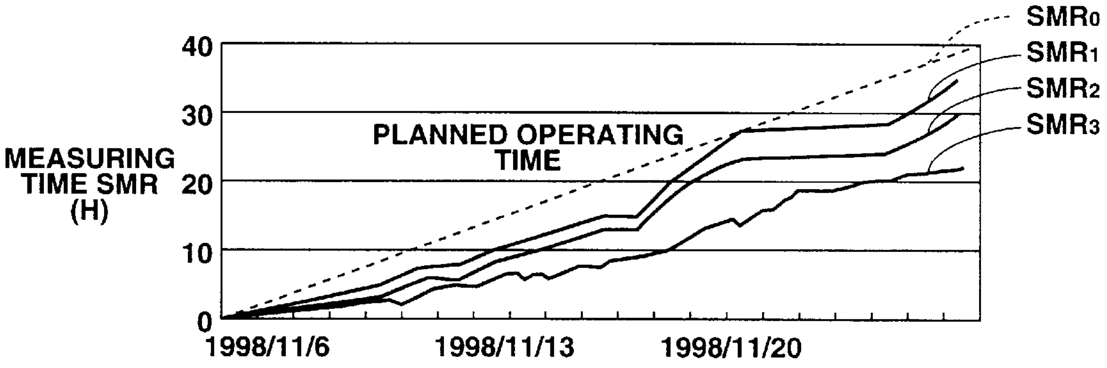
FIG. 26 is a figure showing how integrated values of various service meters change together with changes in the date.

FIG. 26 shows an example of the relationship between the planned operating time SMR0 of the construction machine, and the actual integrated values SMR1, SMR2 and SER of the service meters SM1, SM2 and SM3. The horixontal axis of the FIG. 26 is the date, and the vertical axis shows the measured service meter value SMR. The planned operating time SMR0 differs depending on the type of construction machine and the user. This is input as data in advance. For example 20 hours per day is input and set as the total operating time SMR0.

In the present mode of embodiment, the operating percentage a is computed from the following formula (8).

$$\alpha=(SER3/SMR0)\cdot 100(\%) \quad (8)$$

SMR0–SER is the time over which the hydraulic shovel is not actually engaged in loading work, which is to say the down time. The relationship is such that the larger the down time the smaller the value of the abovementioned operating percentage c.

Thus in the present mode of embodiment the operating percentage $\alpha$ is determined from the integrated value SER of the operating time over which the -working machine operates. Thus an accurate operating percentage a can be obtained, and the work volume V can be accurately calculated based on this accurate work percentage of even in cases involving working conditions where there is a long engine-warm time (dump-waiting time) and a commensurately shorter time over which the working machine operates for example as shown in FIG. 25.

There now follows an explanation of the computational processing of the constituent percentage of loading $\beta$.

Figure 28:
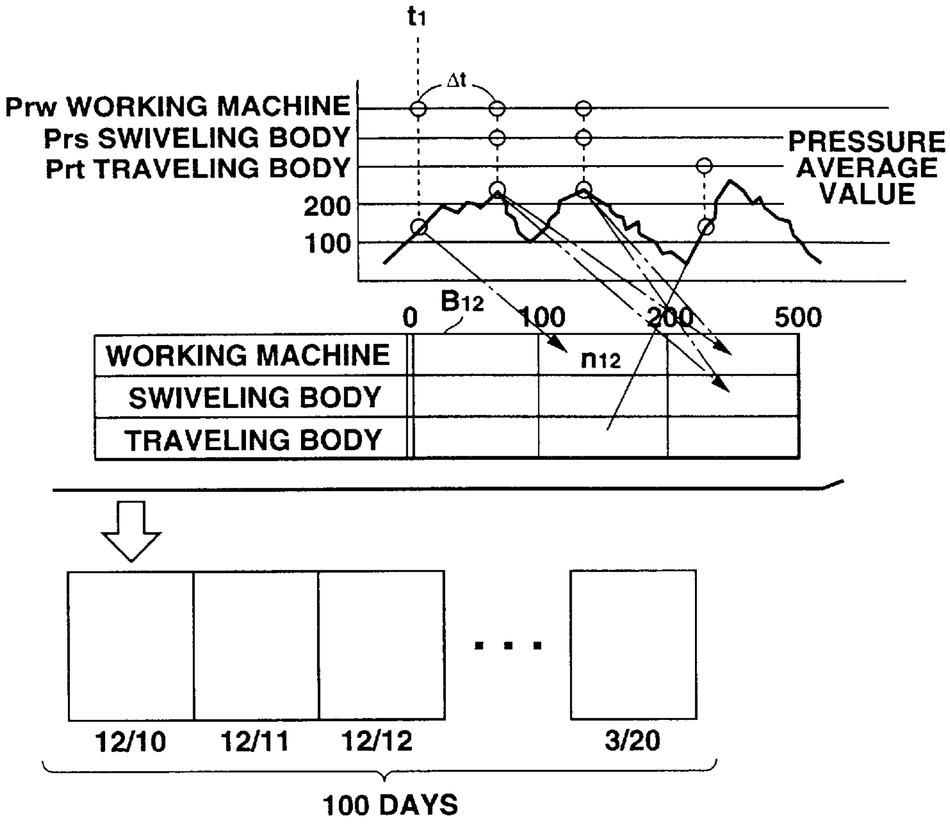
FIG. 28 is a figure showing how data is stored in accordance with changes in the operating pilot pressure of the working machine, swiveling body and traveling body.

FIG. 28 shows how the various output detection signals Prw, Prs and Prt output from the abovementioned working machine pressure sensor, swiveling-body pressure sensor and traveling-body pressure sensor vary together with changes in time.

Figure 29:
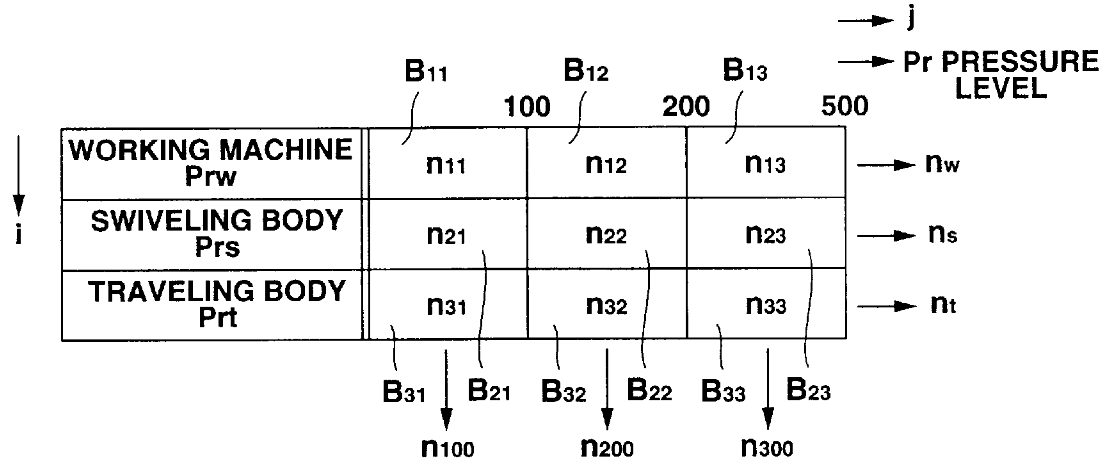
FIG. 29 is a figure showing an operating frequency map.

FIG. 29, for its part, shows details of data of the operation frequency map for the operating lever.

As shown in the FIG. 29, the types of the pressure detection signal Prw, Prs or Prt are entered along the vertical axis, and pressure levels Pr are entered along the horizontal axis j. The pressure levels Pr are, by way of example, divided into three levels of 0 to 100 kg/cm$^2$, 100 to 200 kg/cm$^2$ and 200 to 500 kg/cm$^2$. Also there is division into blocks Bij.

As shown in FIG. 28, the pressure detection signals Prw, Prs and Prt are input at different sampling times $\Delta t$, and a decision is made as to whether the pressure values fall within one of the blocks Bij. By way of example, when the pressure detection signal Prw of the working machine indicates a value of 130 kg/cm$^2$ at a time t1, the decision is made that this falls in the block B12 corresponding to working machine Prw, pressure level Pr2 (100 to 200 kg/cm$^2$) on the operating frequency map. In this way the in-fall frequencies nij are integrated for each of the blocks Bij. The integration is carried out until 1 day has elapsed, and integrated values are output every time that a day elapses. Also the integrated values of each day can be stored in memory and a maximum of 100 days worth can be stored. In order to reduce memory capacity, the oldest dated item of data is deleted after 100 days have elapsed, and is replaced by the integrated value of the most recently-dated item of data.

The frequencies nij of each of the blocks Bij in the operating frequency map of FIG. 29 are converted into percentages in the same way as in FIG. 11 discussed hereinabove. 100% is taken to be the value obtained upon totaling the percentage-converted frequencies nij for all the blocks Bij.

Figure 30:
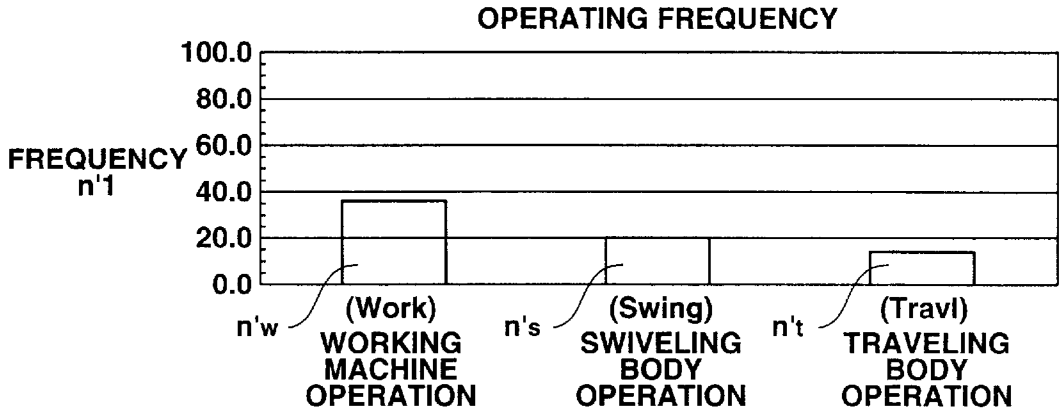
FIG. 30 is a figure showing ratios for the frequencies of working machine operation, swiveling body operation and traveling body operation.

In the present mode of embodiment, the frequencies n11, n12 and n13 for the blocks for the working machine Prw among the blocks Bij of the operating frequency map shown in FIG. 29 are totalled, and the working machine operating frequency n'w is determined. In the same way, the frequencies n21, n22 and n23 for the blocks for the swiveling body Prs are totalled, and the swiveling-body operating frequency n's is determined. In the same way, the frequencies n31, n32 and n33 for the blocks for the traveling body Prt are totalled, and the traveling-body operating frequency nt is determined. The working machine operating frequency nw, the swiveling-body operating frequency ns and the traveling-body operating frequency nt are converted to percentages. FIG. 30 gives an example of the ratios of the percentage-coverted working machine operating frequency n'w, swiveling-body operating frequency n's and traveling-body operating frequency n't.

FIG. 30 shows the working machine, swiveling-body and traveling body on the horizontal axis, and the percentage-converted working machine frequency n'w, swiveling-body operating frequency nds and traveling-body operating frequency n't on the vertical axis.

In the present mode of embodiment, the constituent percentage of loading $\beta$ is computed using the following formula (9) based on the percentage-converted working machine frequency nw, swiveling-body operating frequency n's and traveling-body operating frequency n't.

$$\beta=1+n't/(n'w+n's) \quad (9)$$

The second term on the right in the above formula indicates a value n't/(n'w+n's) giving the ratio of the traveling-body operating frequency nt with respect to the sum (n'w+n's) of the working machine operating frequency nrw and the swiveling-body operating frequency n's. Thus, this indicates that the smaller the value of the constituent percentage of loading $\beta$, the longer the time of operation of the working machine with respect to traveling, and the greater the time spent essentially carrying out loading work.

To explain the significance of the abovementioned formula (9), if the working machine operating frequency n'w is large, the productivity will be high. The larger the working machine operating frequency n'w, therefore, the smaller the value of the ratio n't/(n'w+n's). Because of this, the value of the constituent percentage of loading $\beta$ is reduced.

Further, if the swiveling-body operating frequency n's is large, the value of the ratio n't/(n'w+n's) is reduced. Thus the value of the constituent percentage of loading $\beta$ is reduced.

Further, if the traveling-body operating frequency n't is large, the value of the ratio n't/(n'w+n's) is increased. Thus the value of the constituent percentage of loading $\beta$ increases.

The constituent percentage of loading β is not limited to the abovementioned formula (9) and any formula can be used provided that it evaluates the magnitude of the time over which essentially loading work is carried out from the ratio of the working machine operating frequency n'w, swiveling-body operating frequency n's and traveling-body operating frequency n't. By way of example, the following formula (9)' may be used instead of formula (9).

$$\beta=(n't+n's)/(n'w+n's) \qquad (9)'$$

From the abovementioned formula (9)', in cases involving a long swiveling time and a short time of operation of the working machine, the constituent percentage of loading β increases, and it proves possible to evaluate that the working machine is essentially not operating.

In the present invention it is sufficient to use a computational formula which makes it possible to evaluate whether or not the working machine is essentially operating, using the ratios shown in FIG. 30.

Further, the frequency ratio has been used in the present mode of embodiment, but the constituent percentage of loading β may also be computed by measuring the time of operation of the working machine, the time of operation of the swiveling body, and the time of operation of the traveling body, and using the ratios of these times.

Thus, when the present mode of embodiment is employed, the constituent percentage of loading β can be accurately obtained, and the work volume V can be accurately calculated using the accurate constituent percentage of loading β even in cases involving work conditions where the traveling and swiveling times are long and there is a commensurately short time when the working machine is used to actually load earth and sand.

In the information management controller 1, the work volume V is computed using the abovementioned computed operating percentage a and constituent percentage of loading β. In this case, non-static values such as Q and S are excluded from the abovementioned formula (1), and the work volume V is determined from the computational formula $V=\alpha\cdot(1/\beta)$, and this is compared with a reference work volume Vref to evaluate the work volume of the construction machine. The results of the evaluation can be reflected in an improvement in execution methods and efficiency of productivity.

Further, fuel consumption (1/h) may be computed, and the work volume V' (m3/l) per unit of fuel (liters) may be computed based on the fuel consumption and on the work volume V per hour (m3/h) obtained as discussed hereinabove.

Figure 27:
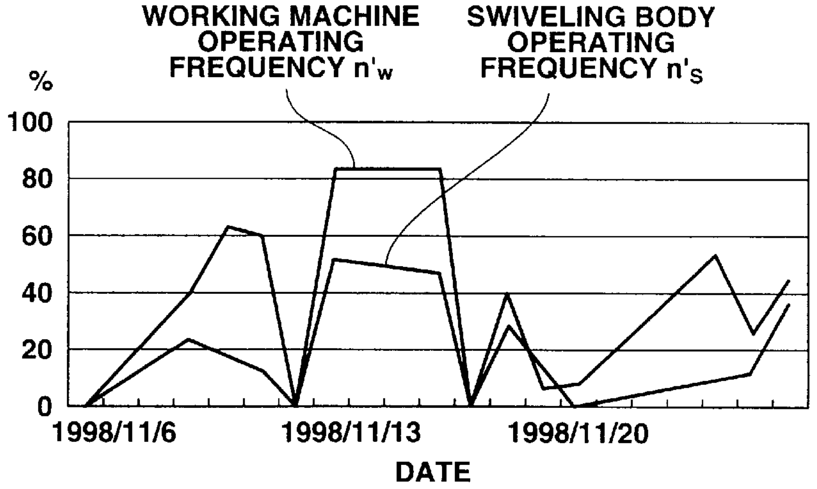
FIG. 27 is a figure showing how the working machine operating frequency and the swiveling body operating frequency change together with changes in the date.

FIG. 27 shows how the working machine operating frequency n'w and the swiveling-body operating frequency n's change over time. The horizontal axis in FIG. 27 shows the date, and the vertical axes shows the percentage-converted values of the frequencies. The proportion of operation by the swiveling body and operation by the working machine can be ascertained from this graph. This is to say, information can be acquired about the operating state of the construction machine, such as whether the time spent swiveling during loading work is long or short, and whether the time spent actually loading earth and sand using the working machine is commensurately short or long.

Figure 31A:
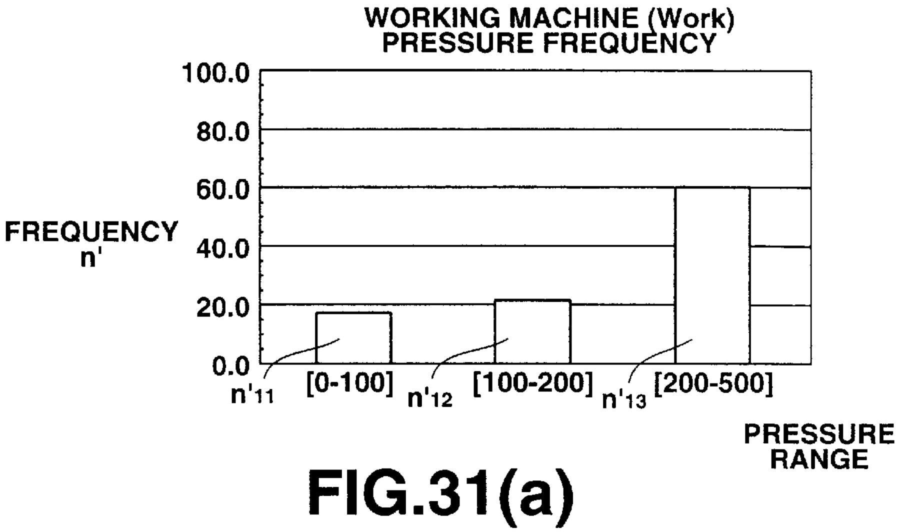
FIGS. 31(*a*), 31(*b*) and 31(*c*) are figures showing frequency distributions at different pressure levels, showing the working machine, swiveling body and traveling body separately.
Figure 31B:
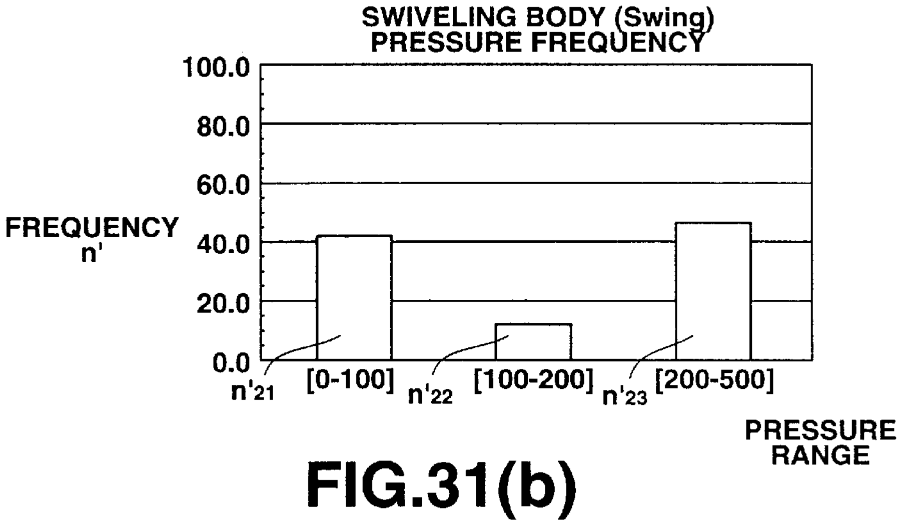
Figure 31C:
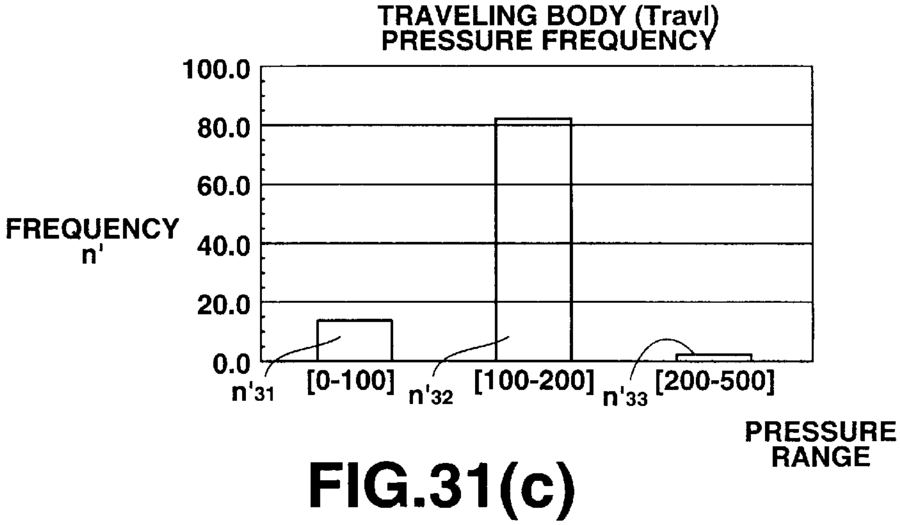

Further, graphs of frequencies corresponding to various pressure levels can be compiled, as shown in FIGS. 31(*a*) to 31(*c*), for the working machine, swiveling body and traveling body based on the operating frequency map shown in FIG. 29.

FIG. 31(*a*) is a graph relating to the working machine. FIG. 31(*a*) places various pressure ranges (0 to 100 $kg/cm^2$), (100 to 200 $kg/cm^2$) and (200 to 500 $kg/cm^2$) on the horizontal axis. The percentage-converted frequency n'is placed on the vertical axis. The frequencies n'11, n'12 and n'13 are matched with the different pressure ranges (see FIG. 29).

Similarly, FIG. 31(*b*) is a graph relating to the swiveling body. The frequencies n'21, n'22 and n'23 are matched with the different pressure ranges (see FIG. 29). Similarly, FIG. 31(*c*) is a graph relating to the traveling body. The frequencies n'31, n'32 and n'33 are matched with the different pressure ranges (see FIG. 29).

The graphs shown in FIGS. 31(*a*) to 31(*c*) possible, for example, to evaluate the hardness of a substance to be excavated when the working machine is used for excavation (evaluation of whether work is proceeding on a bench where blasting has good effect), and to evaluate whether the speed of work has reduced and work efficiency has reduced due to resistance to work during swiveling and/or traveling. The results of such evaluation can be reflected by an improvement in execution methods.

Further, when the present mode of embodiment is employed, information about the operating state which is more detailed than hitherto can be acquired since 3 service meters SM1, SM2 and SM3 are used.

This is to say, as shown in FIG. 25 or FIG. 26, the standby time, when the engine is not actually operating even though the key switch of the engine has been turned on, can be calculated from the value of the difference between the integrated value SMR1 of the first service meter SM1 and the integrated value SMR2 of the second service meter SM2.

Further, the warm time (dump waiting time), when a working machine such as a boom does not actually operate even though the engine is operating, can be calculated from the value of the difference between the integrated value SMR2 of the second service meter SM2 and the integrated value SER of the third service meter.

Thus the present mode of embodiment makes it possible to acquire detailed information about not only the engine operating time pure and simple, but also the stand-by time when the engine is not actually operating even though the key switch of the engine has been turned to "on", and the warm time (dump waiting time) when a working machine such as a boom is not actually operating even though the engine is operating. Thus the operating state of the construction machine can be more accurately managed and monitored than hitherto.

Data about the work state shown in FIG. 25 to FIGS. 31(*a*) to 31(*c*), and the work volume V discussed hereinabove computed by the information management controller 1 is sent to the monitoring station 19. Thus the monitoring station 19 can manage the work volume V and the operating state of a plurality of construction machines.

Further, data about the operating state and the work volume V computed by the information management controller 1 is downloaded to a service tool 18. Thus the operating state and the work volume of the construction machine can be checked promptly without the need for the task of analyzing data on site.

There now follows a description of details of the display given on the information management monitor 2. It should be noted that the following description envisages the configuration of FIG. 1.

The information management monitor 2 displays on screen, in accordance with switch operations, data gathered from the various controllers by the information management controller 1, and data resulting from the processing of the gathered data.

FIG. 32 to FIG. 41 show how the display screen on an information management monitor 2 undergoes transition. Of these, FIG. 32, FIG. 33, FIGS. 35(*a*) and 35(*b*) are screens for use by an operator (screens for operating) and which can be seen by the operator, and FIG. 34 and FIGS. 36 to 41 are screens for use when servicing (screens for servicing) which are not displayed (do not allow input operations) unless a specific operation is performed.

As shown in these figures, the information management monitor 2 uses a graphic user interface (GUI). An operator or service man can input instructions in an input operation such as an operation of clicking on, or an operation of touching a switch such as a "button" displayed on the screen. Moreover, instructions may be input using an input device such as a keyboard.

Figure 32:
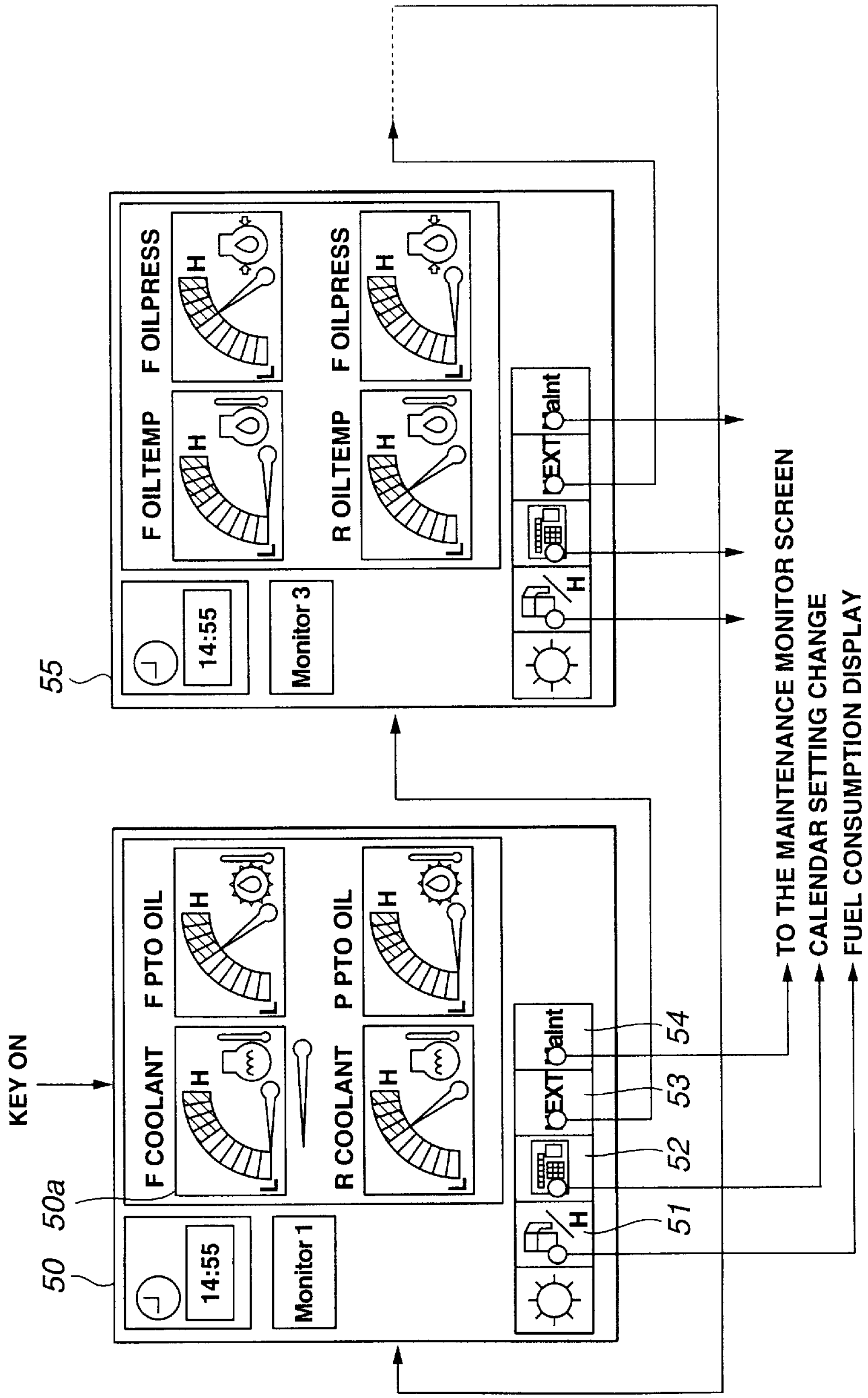
FIG. 32 is a figure showing how the display screen on an information management monitor undergoes transition.

When an engine key switch is turned on and the power source is connected up, the display screen of the information management monitor 3 passes through an initial screen and transits to the screen 50 of FIG. 32.

FIG. 32 shows a running state monitor screen displaying the running state of the construction machine. The screen 50 has, inter alia, a display part 50*a* which displays the current temperature of the coolant of the front engine. When the button 51 on the screen 50 is operated, the monitor transits to a screen displaying fuel consumption. When the button 52 on the screen 50 is operated, the monitor transits to a screen for setting the calendar (date and time).

When the button 53 on the screen 50 is operated, the monitor transits to the next running state monitor screen 55. Each time that the button 53 on the screen is operated after that, the screen changes in sequence, and screen transition is repeated such that the monitor returns to the initial running state monitor screen 50 again.

Figure 33:
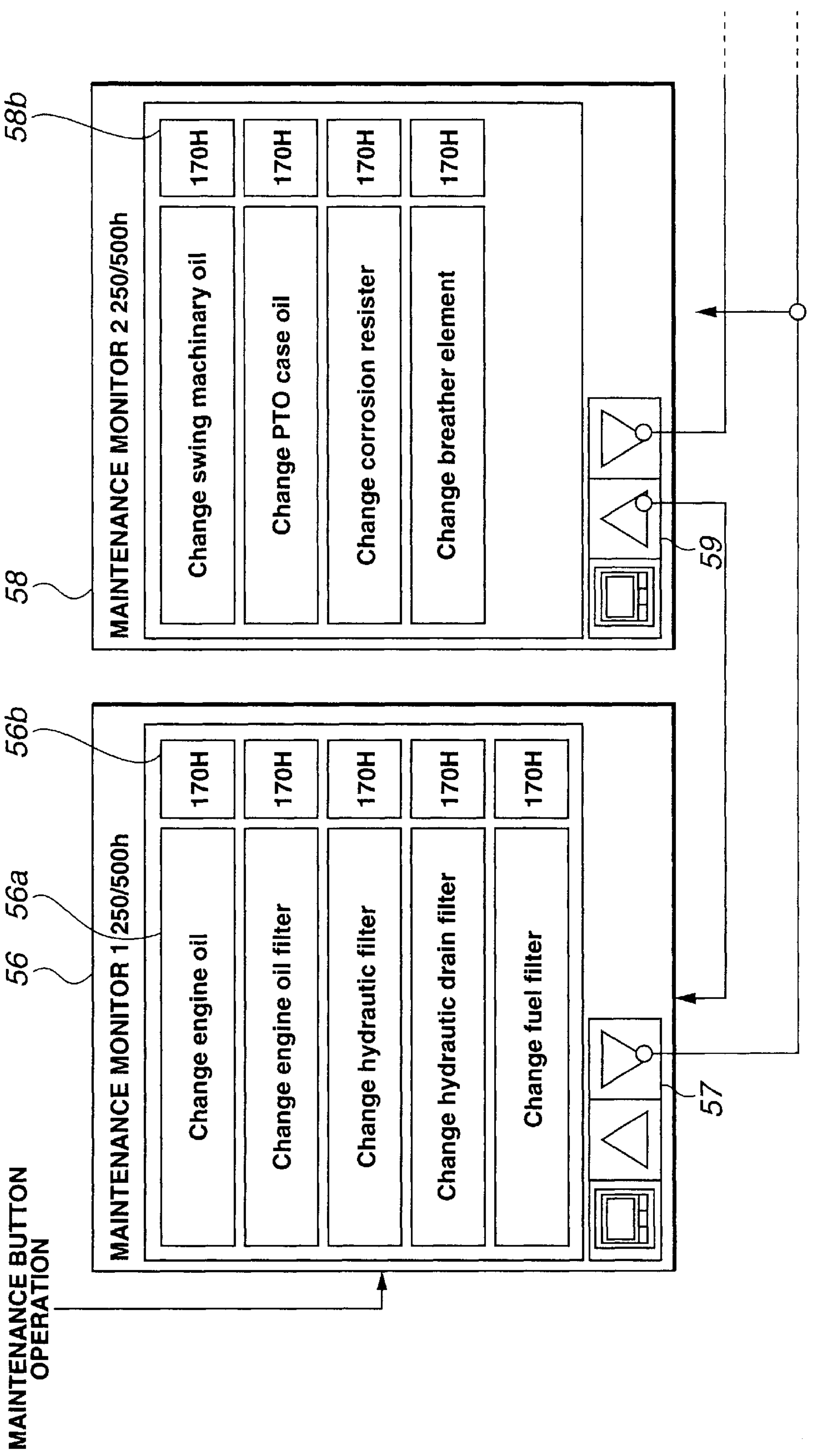
FIG. 33 is a figure showing how the display screen on an information management monitor undergoes transition.

When the maintenance button 54 on the running state monitor screens 50, 55. is operated, the monitor transits to the screen 56 of FIG. 33.

FIG. 33 shows the maintenance state monitor screen which displays the state of maintenance (maintenance and checking) of the construction machine. The screen 56 displays the time remaining until replacements and checking, related to various maintenance entries. For example there is a display area 56*b* which displays a time of "170H" remaining until replacement, related to a display area 56*a* showing "engine oil".

When the button 57 on the screen 56 is operated, the monitor transits to the next maintenance state monitor screen 58. For example, there is a display area 58*b* which displays a time of "170H" remaining with replacement, relating to a display showing "swing machinery oil." Each time that the button 57 on the screen is operated after that, the screen changes in sequence. When the button 59 on the screen is operated, the screen is changed in the opposite direction to the direction in which it changes when the button 57 is operated.

Figure 34:
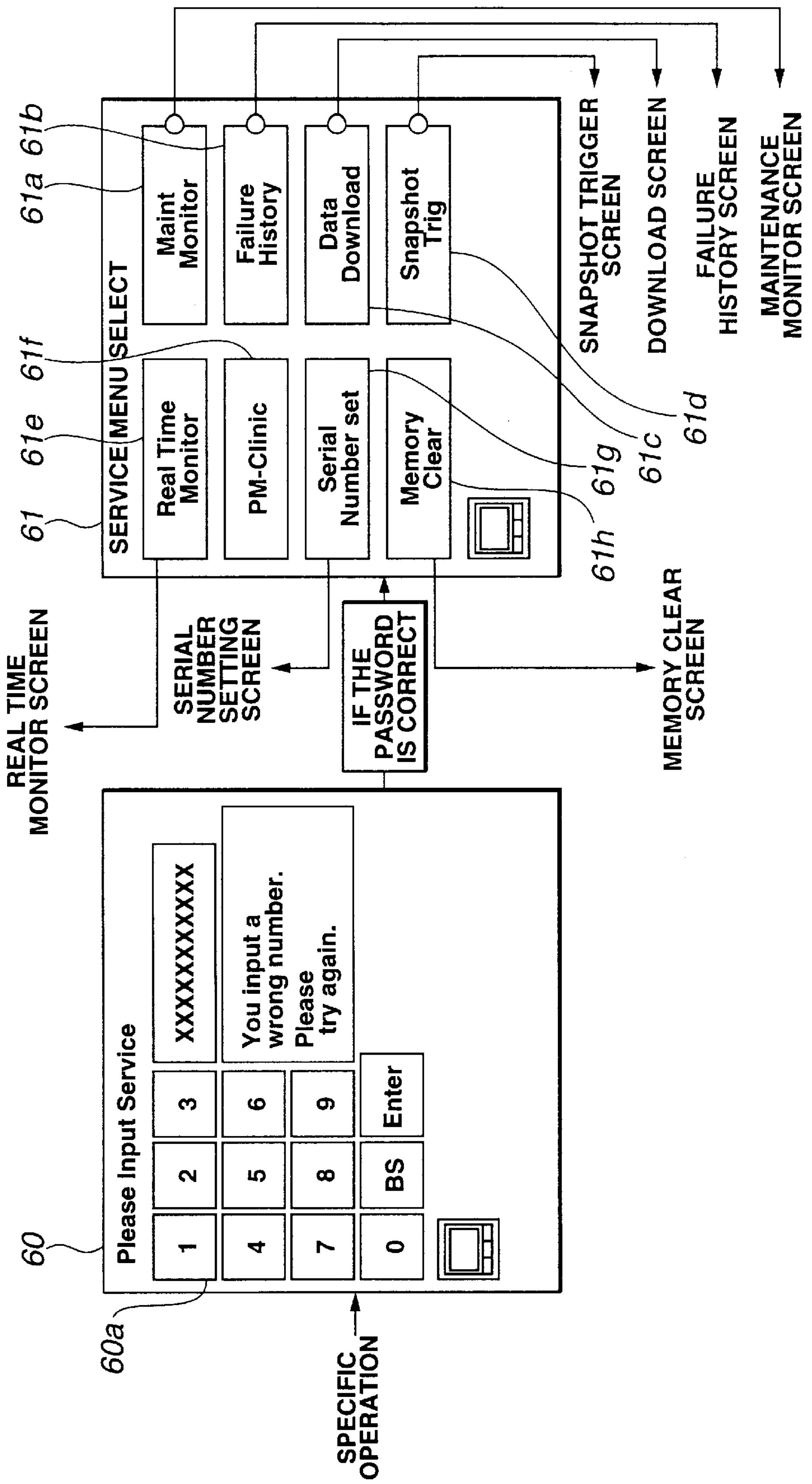
FIG. 34 is a figure showing how the display screen on an information management monitor undergoes transition.

FIG. 34 shows a screen for servicing. When a specific operation is carried out on the screen for operating, the monitor transits to screen 60 of FIG. 34. A numeric key pad 60*a* is provided on the screen 60. Provided that the numeric key pad 60*a* is operated and specific data (a password) set in advance is input, the monitor transits to the following service menu selection screen 61. The service menu selection screen 61 has buttons 61*a* to 61*h* for giving instructions for various service menus. The monitor transits to a corresponding screen when a predetermined button is operated.

There now follows a description giving details of the procedure when an irregularity such as a failure occurs in a construction machine. The situation envisaged involves an irregular temperature increase in the temperature of the coolant of the front engine.

FIG. 42(*a*) is a flow chart showing a routine for a procedure when an irregularity occurs.

The front-engine controller 6 successively decides whether or not an irregularity has occurred based on the detection output of a sensor group 26. For example, if the coolant temperature goes above a threshold value (Step 101), an irregularity signal is input (Step 102), and a decision is taken (Step 103) as to whether or not the coolant temperature has dropped below the threshold value within a predetermined time. Here if, as shown in FIG. 42(*b*), the irregularity is transient, the irregularity procedure is terminated (Step 109).

In contrast, if, as shown in FIG. 42(*c*), the irregularity continues, an error code corresponding to "front engine coolant temperature irregularity" is generated (Step 104). It should be noted that this generation of an error code may be undertaken by the controller 6 where the irregularity occurs, and the error code sent to the information management controller 1. Further, an error code may be generated on the information management controller 1 side by continuing to send data from the controller 6 to the information management controller 1 when an irregularity occurs.

The information management controller 1 executes a procedure whereby, when an error code is generated, snapshot data of that time is automatically acquired and stored in memory. Here, "snapshot data" refers to time-sequenced data within a predetermined time span around the time that the error code was generated. Data about parameters (coolant temperature, engine rotational speed, oil temperature, oil pressure etc.) associated with the error is acquired as snapshot data (Step 105). Further, timing values (date and time), and the integrated value SMR2 of the service meter SM2 (second service meter SM2 which integrates the operating time of the engine) at the time that the error code was generated is stored in memory (Step 106).

In this way, an error code, an error message giving error details corresponding to the error code, data giving the date and time that the error occurred, and other such information is sent to the information management monitor 2 (Step 107).

The error code, the service meter value, the date and time of error occurrence, and the error message are stored in memory as failure history data (Step 108).

When an error code is generated, an error-occurrence flag becomes logical 1. This flag becomes logical 0 when the detection signal from the sensor returns below the threshold value. The service meter value and the calendar timing value at the moment when the flag becomes logical 0 are stored in memory as "rectification service meter value" and "rectification completion date".

FIG. 43 shows details of failure history (irregularity history) data generated and stored in memory by the information management controller 1. As shown in the FIG. 43, matches are made with error codes, error-occurrence service meter values, date and time of error-occurrence, error rectification service meter values, date and time of rectification completion, confirmation, and error messages. Also, these are stored in memory in time sequence in error-occurrence order. In the FIG. 43, the comment "confirmation" signifies data which switches from 0 to 1 when there has been an input operation to the effect that the details of the error have been confirmed on the screen for servicing as discussed hereinbelow. Further, the comments "rectification service meter value" and "date of rectification completion" refer to the service meter value and the counter timing value at the time when rectification or the like has taken place and the detection signal of the sensor which detected the signal above the threshold value has returned back below the threshold value.

There now follows a description of details of the procedure on the information management monitor 2 when an irregularity occurs.

Figure 35A:
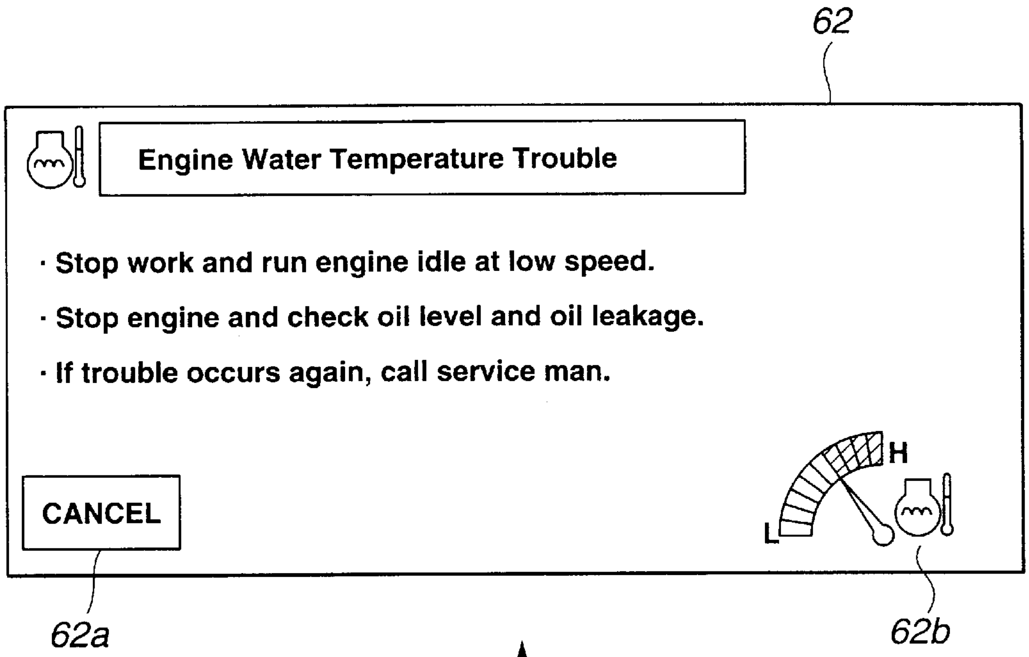
FIGS. 35(*a*) and 35(*b*) are figures showing how the display screen on an information management monitor undergoes transition.
Figure 35B:
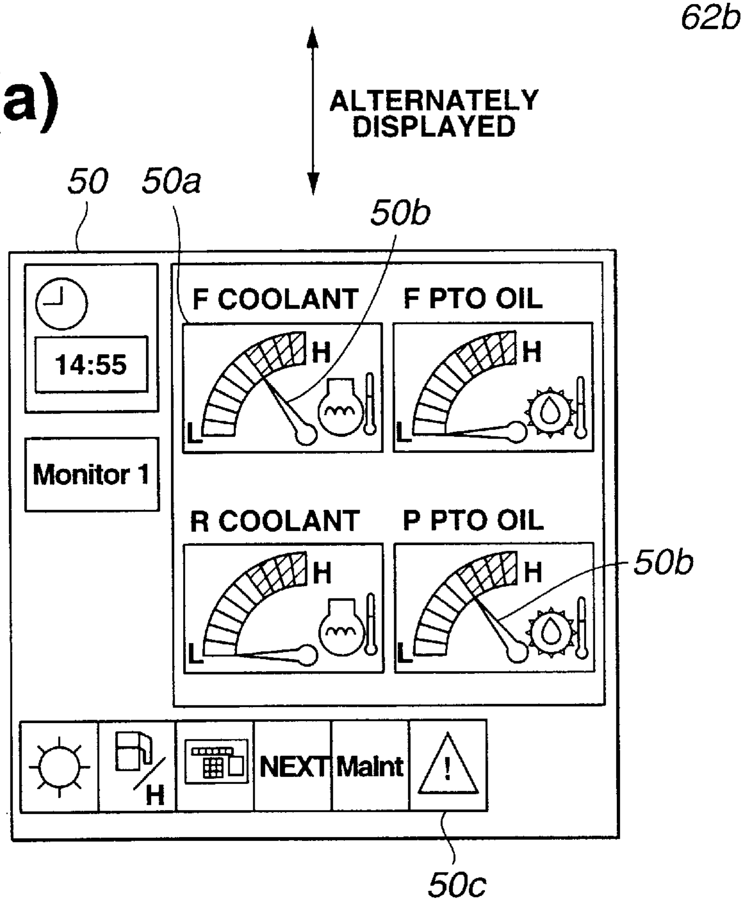

As shown in FIGS. 35(*a*) and 35(*b*), when an error code or the like has been sent from the information management controller 1 to the information management monitor 2, the monitor automatically transits to the irregularity screen 62 shown in FIG. 35(*a*), regardless of which screen for operating it is in. The normal screen 50 before transition shown in FIG. 35(*b*) and the irregularity screen 62 are display alternately at predetermined intervals. Moreover, in cases where a plurality of types of error codes are input, a plurality of irregularity screens and the normal screen 50 are displayed in a cycle.

The normal screen 62 displays an error message, details of corresponding measures, and an icon 62*b* giving the extent of the irregularity. Thus the operator can rapidly take appropriate measures in accordance with the details of the measures given on the display. When the button 62*a* on the irregularity screen 62 is operated, the irregularity screen 62 disappears and the monitor returns to the display of only the normal screen 50. However, as shown in FIG. 35(*b*), the normal screen 50 also has an irregularity display in addition to the normal display.

In the front engine coolant display area 50*a* on the running state monitor screen 50, an icon 50*b* of a gauge, indicating temperature, changes to a color (e.g. red) denoting irregularity. Further, an icon 50*c* indicating irregularity is generated on the screen 50. These give a caution to the operator and urge the operator to take care. Moreover, when the icon 50*c* is operated, the monitor transits to the irregularity screen 62.

From the irregularity display on the screen for operating, the operator can call a service man.

Figure 39A:
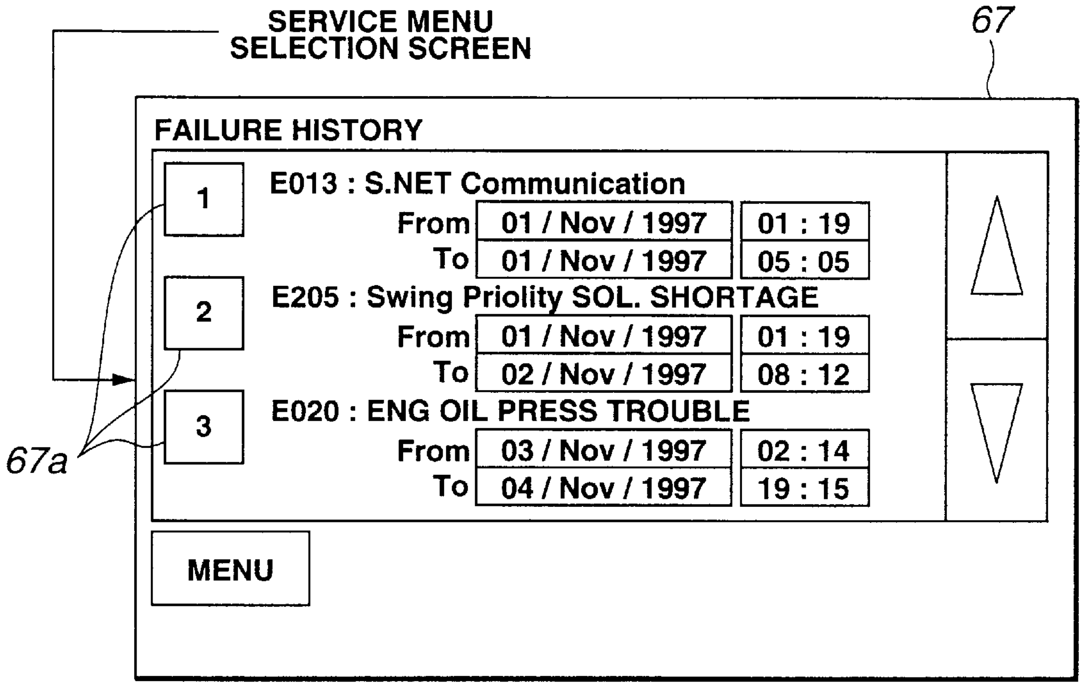
FIGS. 39(*a*) and 39(*b*) are figures showing how the display screen on an information management monitor undergoes transition.
Figure 39B:
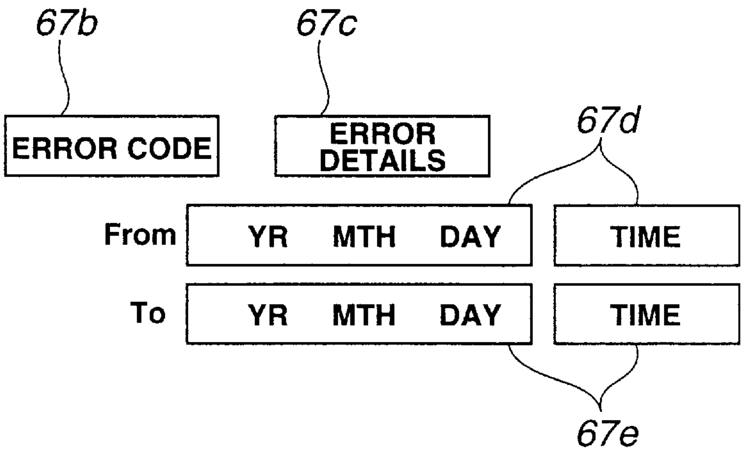

Thereupon, on the service menu selection screen 61 shown in FIG. 34, the "failure history" button 61*b* is operated. In this way the monitor transits to the failure history screen 67 in FIG. 39(*a*). As shown in FIG. 39(*b*), the failure history screen 67 correlates an "error code" display area 67*b*, an "error details (error message)" display area 67*c*, an "error occurrence date and time" display area 67*d*, and a "rectification completion date and time" display area 67*e*. Also, these are displayed in time sequence in error occurrence order. This is to say the content of the display of the failure history screen 67 corresponds with the content of the memory of failure history shown in FIG. 43.

The content of the "rectification completion date and time" display area 67*e* for entries corresponding to the currently occurring irregularity ("front engine coolant temperature irregularity") is either blank or is the current time.

The cause of irregularity can be discovered in the following way using the screen for servicing.

This is to say, when the "download" button 61c on the service menu selection screen 61 shown in FIG. 34 is operated, the monitor transits to a download screen for giving an instruction to download. When an operation giving an instruction to download is carried out on the download screen, the failure history data shown in FIG. 43 is downloaded to a service tool 18 such as a personal computer or IC card. The causes of irregularities and methods of rectification can be rapidly discovered from the failure history data. Further, snapshot data from the time when the irregularity occurred can be downloaded, and causes of the irregularity and methods of rectification can be rapidly discovered from the downloaded data. The snapshot data is stored in memory in time sequence in error occurrence order. Thus snapshot data for a single irregularity entry can be downloaded, and causes of the irregularity and methods of rectification can be rapidly discovered from the snapshot data.

Further, when the "snapshot trigger" button 61*d* on the service menu selection screen 61 shown in FIG. 34 is operated, the monitor transits to a snapshot trigger screen for giving an instruction to acquire snapshot data. When an operation giving an instruction to acquire snapshot data is carried out on the snapshot trigger screen, snapshot data from the time around the time of operation is acquired. Thus causes of the irregularity and methods of rectification can be rapidly discovered by downloading this snapshot data.

Figure 40:
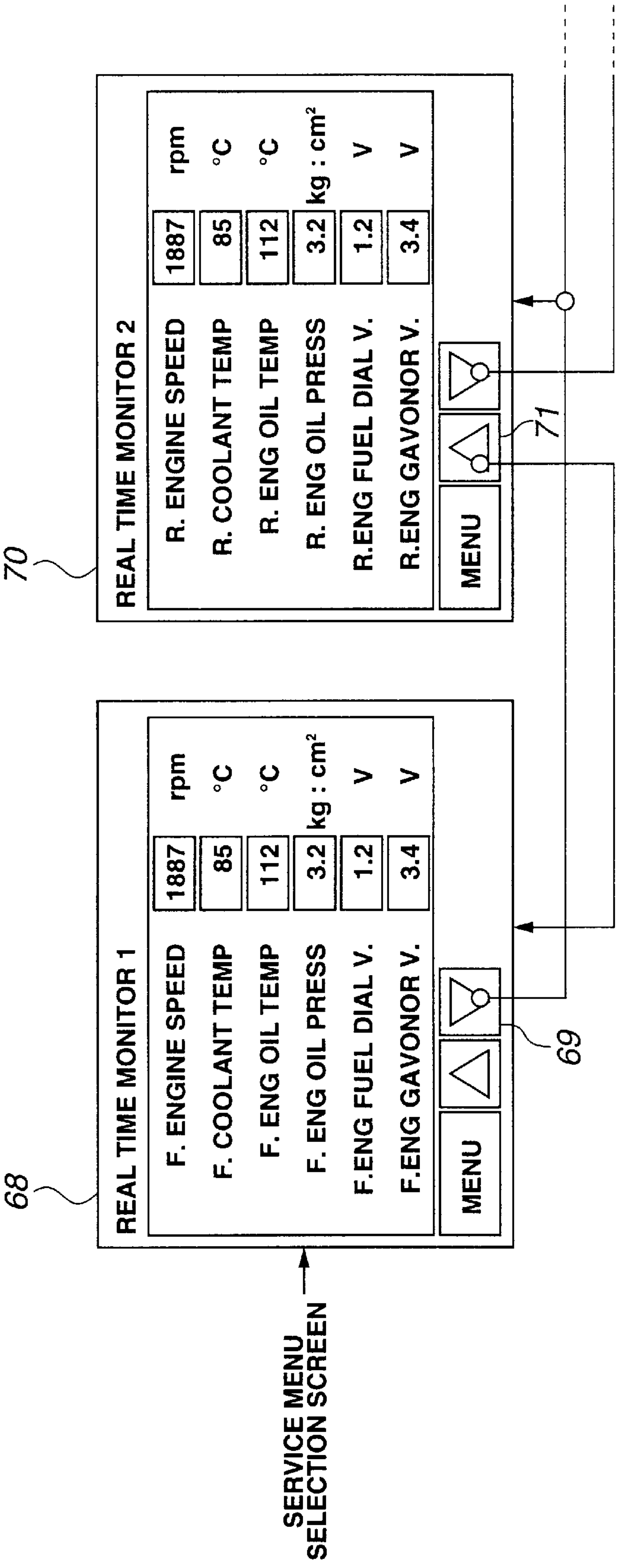
FIG. 40 is a figure showing how the display screen on an information management monitor undergoes transition.
Figure 41:
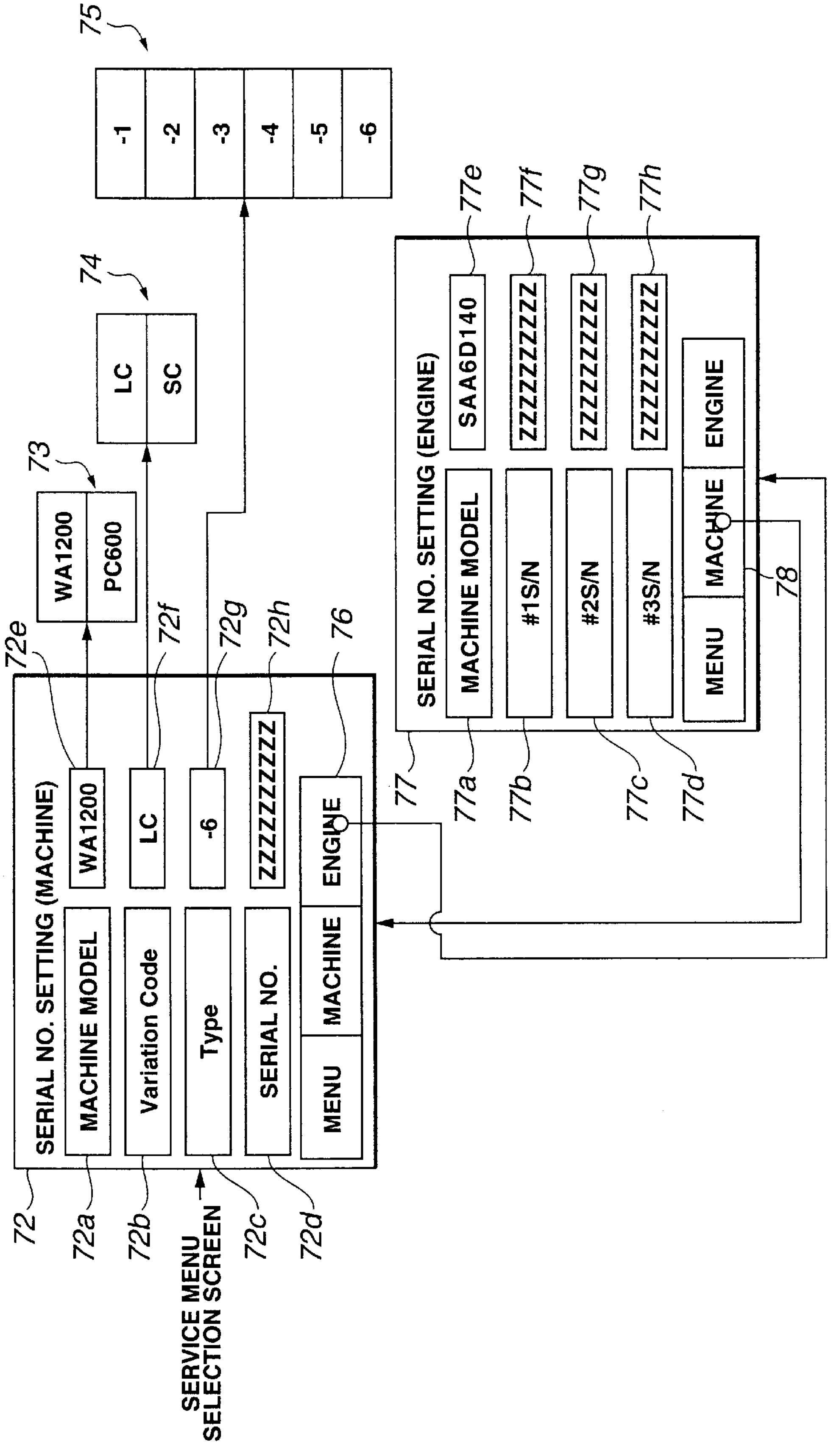
FIG. 41 is a figure showing how the display screen on an information management monitor undergoes transition.

Further, when the "real-time monitor" button 61e on the service menu selection screen 61 shown in FIG. 34 is operated, the monitor transits to the screen 68 shown in FIG. 40.

FIG. 40 shows a real-time screen displaying current detection values of various sensors provided in the construction machine. The screen 68 displays detection values at the current time correlated with various detection entries. For example there is a display area showing a current rotational speed of "1887" rpm correlated with a display area showing "front engine rotational speed".

When the button 69 on the screen 68 is operated, the monitor transits to the next real-time monitor screen 70. Every time that the button 69 on the screen is operated after that, screens change in sequence. If the button 71 on the screen is operated, the screen is changed in the opposite direction to the direction in which it changes when the button 69 is operated.

Thus causes of irregularities and methods of rectification can be rapidly discovered from the details of the display on the real-time monitor screen.

Further, the real-time monitor screen may also display time-sequenced changes over a predetermined time band including current values, and not just display numerical values of the current sensor detection values alone.

Figure 46:
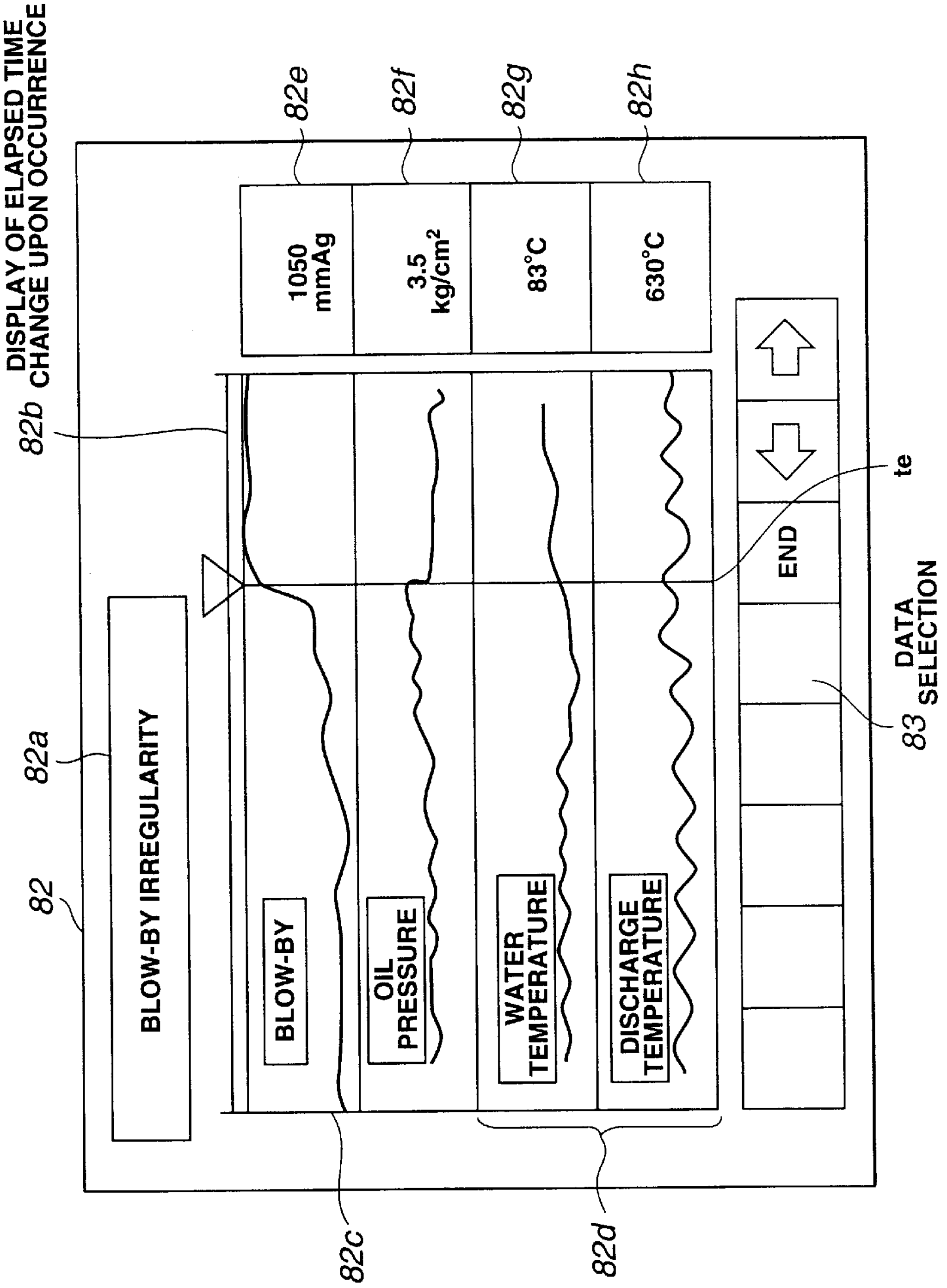
FIG. 46 is a figure illustrating a real-time monitor screen.

FIG. 46 shows an example of a real-time monitor display 82. The engine of the construction machine is provided with a blow-by pressure sensor which detects the blow-by pressure. It will now be assumed that a "blow-by pressure irregularity" error has occurred.

When this happens, the error details display area 82*a* of the screen 82 displays the error message "blow-by irregularity". Further, the irregularity entry display area 82*c* of an occurrence-time time-related changes display area 82*b* displays the detection signal of the blow-by pressure sensor corresponding to the irregularity entry "blow-by pressure irregularity", which it does in the form of time-sequenced snapshot data. The display contains sensor detection values within a predetermined time around the time te when the irregularity occurred (the time of error code generation). Further, a display area 82*e* displays the blow-by pressure at the time te when the irregularity occurred. Sensor data relating to the irregularity entry is selected by means of a selection operation using a data selection button 83. Snapshot data obtained from the selected sensor is displayed in a display area 82*d* in the same way as in the irregularity entry display area 82*c*. Further, values detected by the selected sensor at the time te when the irregularity occurred is displayed in display areas 82*f*, 82*g* and 82*h*.

It is assumed that the irregularity is appropriately rectified. When this is done, the detection signal of the sensor which detected the signal above the threshold value returns back to below the threshold value.

When an error code is generated, an error-occurrence flag becomes logical 1. However, the flag becomes logical 0 when the detection signal from the sensor returns below the threshold value following rectification. It should be noted that if rectification takes place when the engine key switch has been turned off, the flag becomes logical 0 at the time when it is confirmed that the detection signal of the sensor which detected the signal above the threshold value has returned below the threshold value, after the engine key switch has been turned on again.

When the flag becomes logical 0, the integrated value of the service meter and the value timed by the calendar at the time in question are stored in memory under the corresponding entry ("front engine coolant temperature irregularity") of the failure history data shown in FIG. 43, as "rectification service meter value" and "rectification completion date".

Further, on the failure history screen 67 shown in FIGS. 39(*a*) and 39(*b*), similarly, when the flag becomes logical 0, the details of the display area 67*e* for the entry "rectification completion date and time" where the irregularity ("front engine coolant temperature irregularity") occurred is fixed to the value timed by the calendar at the time when it became logical 0.

When it is confirmed on the failure history screen 67 that rectification has taken place, the button 67*a* is operated. In this way the corresponding entry "confirmation" of the failure history data shown in FIG. 43 is changed from 0 to 1.

As outlined above, when the present mode of embodiment is employed, appropriate and rapid measures can be taken against an irregularity from the content of the display on the information management monitor 2, and thus work efficiency is dramatically improved.

It should be noted that, when the "memory clear" button 61*h* on the service menu selection screen 61 shown in FIG. 34 is operated, the monitor transits to the memory clear screen for giving an instruction to erase predetermined storage data. When an operation is performed giving an instruction to erase data on the memory clear screen, the failure history data shown in FIG. 43 is erased. Further, the snapshot data, the load frequency map M1 (resetable data MDB) discussed hereinabove, and maintenance history data discussed hereinbelow can all be erased by operations on the memory clear screen. By way of example stored data is erased upon factory shipping, upon receipt and after overhaul of the construction machine.

There now follows a description of a mode of embodiment in which maintenance information is managed.

Figures 44, 45:
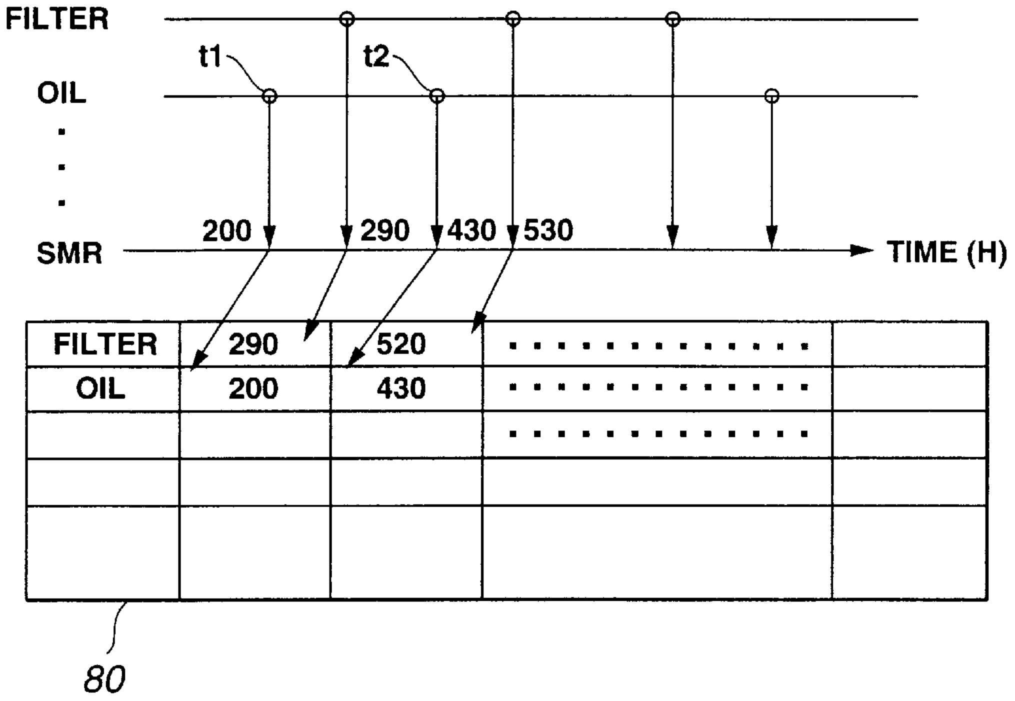
FIG. 44 is a figure showing how service meter integrated values are stored every time that maintenance is carried out.
FIG. 45 is a figure showing details of maintenance history data.

FIG. 45 shows details of maintenance history data 81 produced and stored by the information management controller 1. As shown in the FIG. 45, each maintenance entry is matched with a reference interval, a set interval, and a first, second, third, fourth etc. maintenance (change/replacement) episode-count.

In the FIG. 45, the comment "reference interval" is the maintenance interval (H) recommended by the manufacturer. The comment "set interval" is a set value by which the reference interval in the servicing plan has been shortened or extended as desired in a way discussed hereinbelow. The maintenance history is managed in accordance with the set interval.

When maintenance is actually carried out and there has been an input operation to this effect, the actual maintenance interval ("200 H") of the corresponding "maintenance entry" (e.g. "engine oil"), obtained from the service meter value at the time in question, is stored in memory in the corresponding "episode-count" ("1st time").

There now follows a description of details of the procedure in the information management monitor 2.

Figure 36:
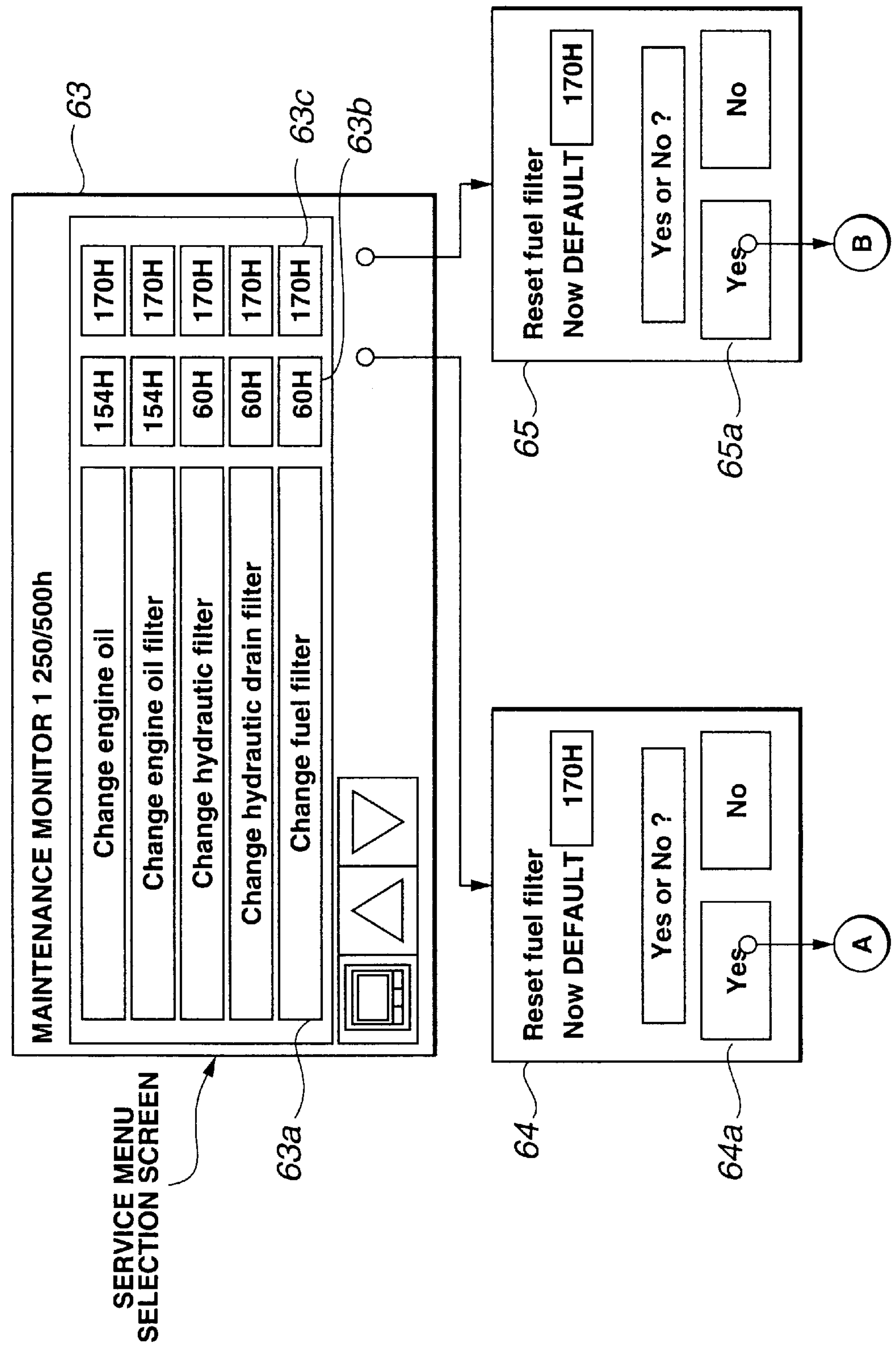
FIG. 36 is a figure showing how the display screen on an information management monitor undergoes transition.

When the "maintenance monitor" button 61*a* on the service menu selection screen 61 shown in FIG. 34 is operated, the monitor transits to the screen 63 shown in FIG. 36.

FIG. 36 shows a maintenance monitor screen with which the state of maintenance is managed on a screen for servicing.

The screen 63 displays time remaining before replacement and checking, and set intervals, matched with various maintenance entries. By way of example, the display area 63*a* which shows "fuel filter change" (fuel filter replacement) has been matched with a display area 63*b* showing the remaining time "60 H" before a maintenance operation such as replacement, and with a display area 63*c* showing the set interval "170 H". This is to say, the contents of the display of the maintenance monitor screen 63 correspond with the details, held in memory, of the maintenance history 81 shown in FIG. 45.

Figure 37:
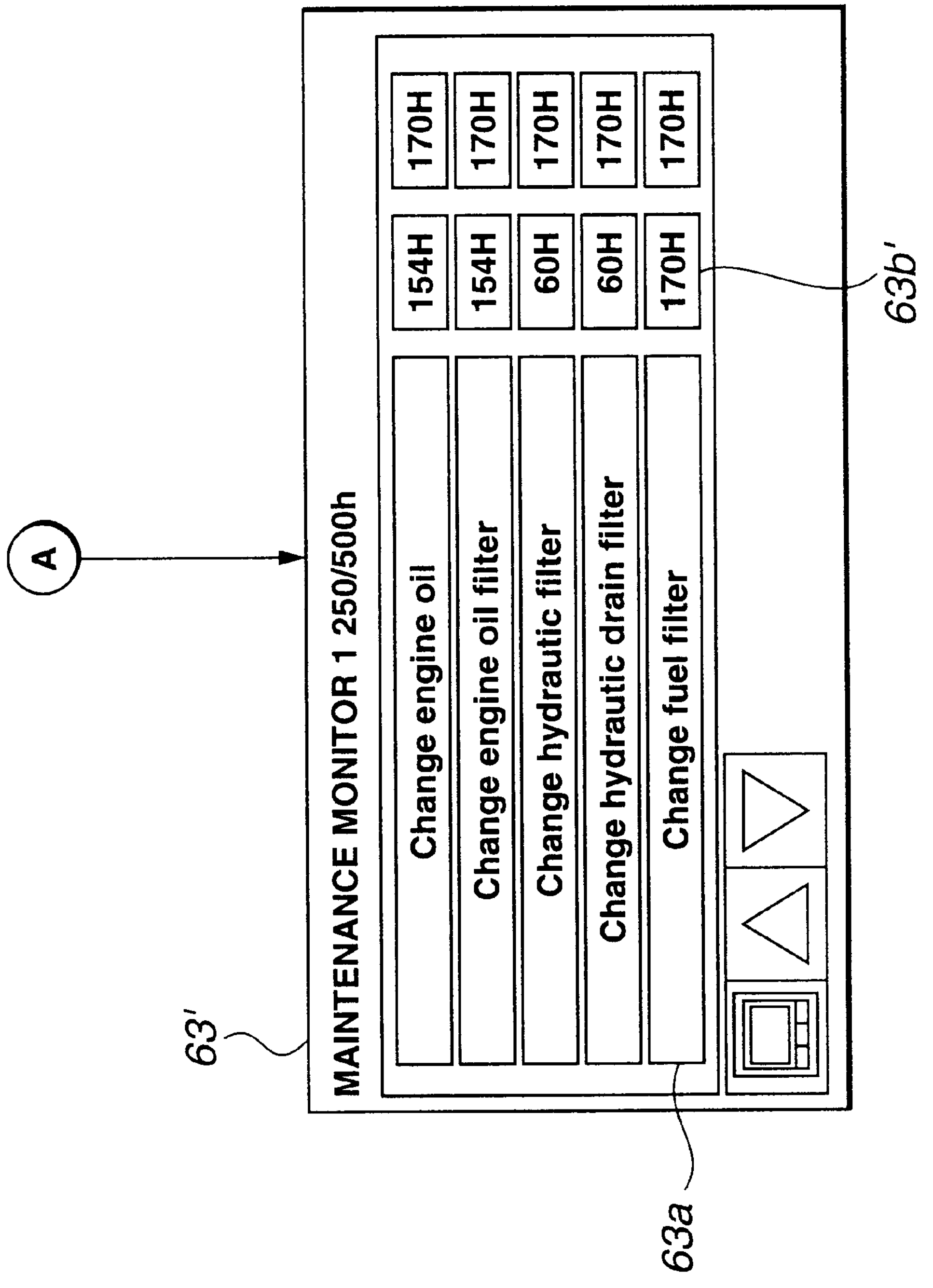
FIG. 37 is a figure showing how the display screen on an information management monitor undergoes transition.
Figure 38:
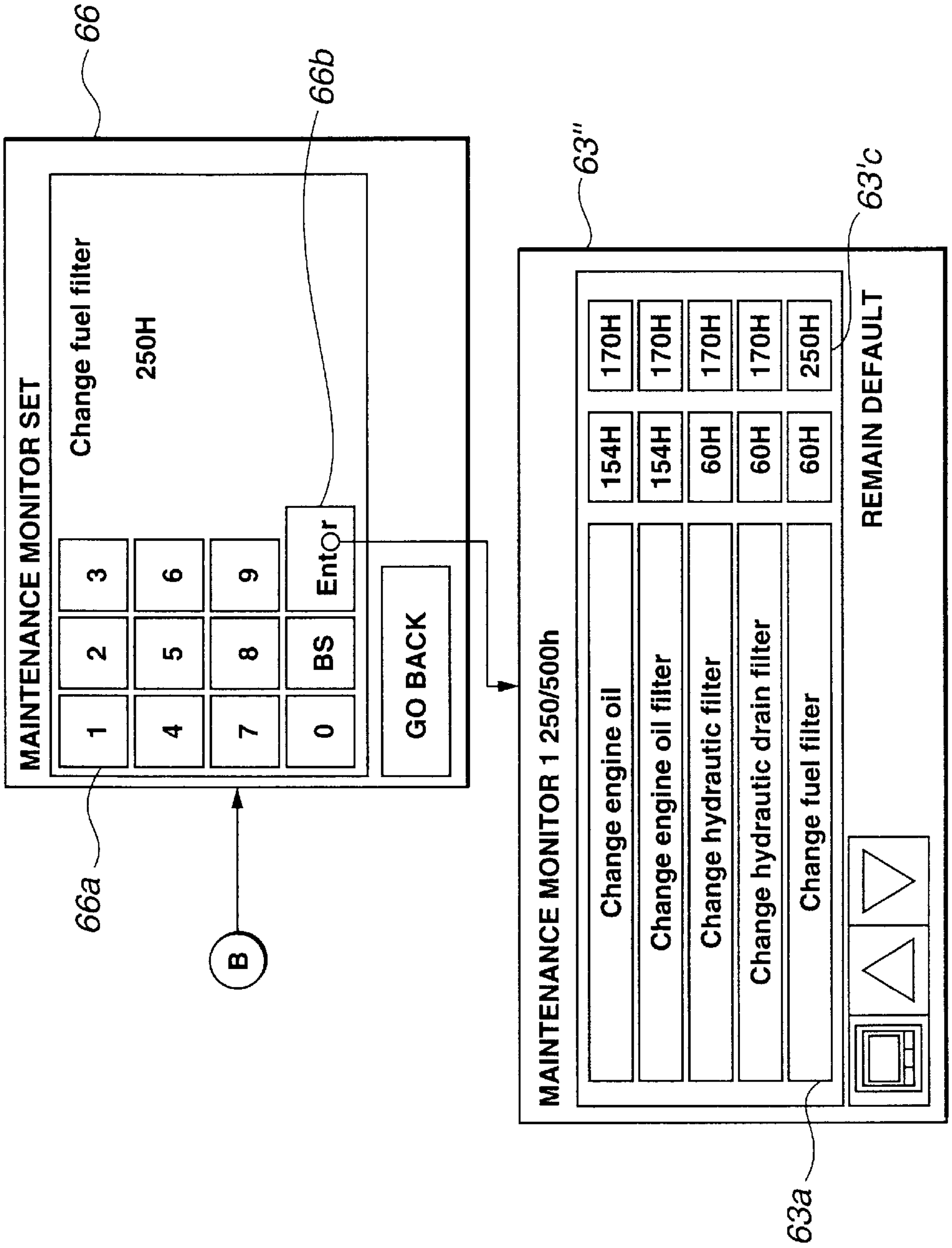
FIG. 38 is a figure showing how the display screen on an information management monitor undergoes transition.

By carrying out maintenance, the button 63*b* of the corresponding maintenance entry on the screen 63 is operated. In this way the monitor transits to the reset screen 64. When a resetting button 64*a* on the resetting screen 64 is operated, the maintenance monitor screen 63 is updated to the details of the screen 63', as shown in FIG. 37. This is to say the contents of the maintenance remaining time display area 63'*b* on the maintenance monitor screen 63' are reset to the set interval (170 H).

Here a description is given of the contents of the display of the maintenance remaining time display area 63*b* with reference to FIG. 44. FIG. 44 shows time changes when the engine oil filter and engine oil are successively replaced at times indicated with a circle, the abovementioned resetting button 64*a* is operated whenever this is done, at which time the integrated value SMR2 of the service monitor SM2 is stored in memory in a storage area 80.

Taking engine oil as an example, the engine oil is replaced at a 1st time t1 after resetting at the time of factory shipping, and at this time the resetting button 64*a* is operated. Thereupon, the service meter value of 200 H at the time of the 1st replacement of engine oil is stored in memory in the storage area 80. Then the value is found of the difference between the integrated value SMR2 obtained from the service meter SM2 and the service meter value of 200 H at the time of the 1st replacement, and this difference value is subtracted from 250 H which is the set interval for the engine oil (see FIG. 45). The value after subtraction is taken to be the time remaining before replacement of the engine oil and is displayed on the maintenance remaining time display area 63*b* corresponding to the entry "engine oil replacement" on the maintenance monitor screen 63.

Similarly, at the time t2 the engine oil is replaced for the 2nd time and the resetting button 64*a* is operated, whereupon the service meter value of 430 H at the time of the 2nd replacement of the engine oil is stored in memory in the storage area 80. The same procedure is then repeated. The same procedure is carried out for the engine oil filter as well.

The maintenance history data 81 is updated as shown in FIG. 45 based on the data stored in the storage area 80 shown in FIG. 44.

The maintenance remaining time display area 56*b* on the operator's maintenance state monitor screen 56 shown in FIG. 33 also gives a display similar to the maintenance remaining time display area 63*b* on the service screen 63.

The maintenance state monitor screen 56 displays a caution to the operator that the maintenance time is approaching. For example, the details of the maintenance remaining time display area 56*b* corresponding to the "engine oil" on the screen 56 change color to yellow and flashes when the remaining time is "1 to 30 H". Also, it changes color to red and flashes when the remaining time is "1 to 1 H".

There now follows a description of the operation of altering a set interval.

When a set interval is altered, the button 63*c* of the maintenance entry which it is desired to alter is operated on the maintenance monitor screen 63 of FIG. 36. In this way the monitor transits to screen 65. When the button 65*a* on the screen 65 is operated, the monitor transits to the setting alteration screen 66 shown in FIG. 38. The numeric key 66*a* on the setting alteration screen 66 is operated and an altered value of set interval is input. Also, when the setting end button 66*b* is operated, the maintenance monitor screen 63 is updated to the contents of the screen 63". This is to say, the contents of the set interval display area 63'*c* on the maintenance monitor screen 63" are altered to the value of the set interval (250 H) altered using the setting alteration screen 66.

When an operation of altering a set interval is carried out on the setting alteration screen 66, the data of the corresponding entry "set interval" of the maintenance history data 81 shown in FIG. 45 is altered. Moreover, the maintenance history data 81 stores the time interval with which maintenance is actually carried out, but it may also store values timed by the calendar every time that maintenance is carried out, and store, in maintenance order, the date and time when maintenance was carried out for different entries.

It should be noted that the reason for using the screen for servicing to reset the maintenance remaining time after maintenance has finished and to alter the set interval is to avoid a situation where inattention by the operator means that aspects such as the reliability and safety of the construction machine are no longer ensured because an operation has been carried out.

When the "download" button 61*c* on the service menu selection screen 61 shown in FIG. 34 is operated, the monitor transits to the download screen for giving an instruction to download. When an operation giving an instruction to download is carried out on the download screen, the maintenance history data 81 shown in FIG. 45 is downloaded to a service tool 18 such as a personal computer or IC card. Then items of maintenance history data 81 and the abovementioned failure history data are collated. Thus, causes of an irregularity and methods of rectification can be rapidly discovered by, for example, regarding entries where maintenance was incomplete as being factors behind the irregularity.

Serial numbers of components such as engines and hydraulic pumps mounted on the construction machine are managed according to the different sources of production of the components. Thus, when components such as engines are re-mounted, it is difficult for the personnel responsible for managing to associate the serial numbers of the components mounted on a construction machine with the serial number of the construction machine.

Further, as discussed hereinabove, in the present mode of embodiment, lifespan information is managed by part (component) and by construction machine. Therefore there is no need to make arrangements to allow follow-through matching of serial numbers of construction machines and serial numbers of mounted components, not even in cases where components are re-mounted.

The information management monitor 2 is provided with a function for storing the serial numbers of components in cases where components are re-mounted.

This is to say a "serial number setting" button 61*g* is operated on the service menu selection screen 61 shown in FIG. 34. In this way the monitor transits to the serial number setting screen 72 shown in FIG. 41. The serial number setting screen 72 has a construction machine model name display area 72*e* corresponding to a "construction machine model name" button 72*a*. Further it has a variation code display area 72*f* corresponding to a "variation code" button 72*b*. Further it has a type display area 72*g* corresponding to a "type" button 72. Further it has a serial number display area 72*h* corresponding to a "serial number" button 72*d*.

When the button 72*a* is operated, the display details in the construction machine model name display area 72*e* alter as shown by 73. Further, when the button 72*b* is operated, the display details in the variation code display area 72*f* alter as shown by 74. Further, when the button 72*c* is operated, the display details in the type display area 72*g* alter as shown by 75. Further, when the button 72*d* is operated, the display details in the serial number display area 72*h* alter.

When the button 76 on the screen 72 is operated, the monitor transits to the engine alteration screen 77.

The engine alteration screen 77 has an engine model name display area 77*e* corresponding to an "engine model name" button 77*a*. Further it has a first unit serial number display area 77*f* corresponding to a "first unit serial number" button 77*b*, Further it has a second unit serial number display area 77*g* corresponding to a "second unit serial number" button 77*c*. Further it has a third unit serial number display area 77*h* corresponding to a "third unit serial number" button 77*d*.

When the button 77*b* is operated during first unit engine mounting, for example upon shipping the construction machine, the first unit serial number display area 77*f* displays "first unit engine serial number". Similarly, when the button 77*c* is operated during second unit engine mounting, the second unit serial number display area 77*g* displays "second unit engine serial number", and, when the button 77*h* is operated during third unit engine mounting, the third unit serial number display area 77*h* displays "third unit engine serial number". Moreover, when the button 78 on the screen 77 is operated, the monitor returns to screen 72.

It should be noted that the present mode of embodiment has envisaged an engine as the component of the construction machine, but it may also be arranged such that it allows input of serial numbers of various components such as hydraulic pumps, hydraulic motors, PTO, torque converters and transmissions.

Data about serial numbers input from the information management monitor 2 in this way is matched with, for example, lifespan data by the information management controller 1. Thus, when such data is sent to the monitoring station 19, lifespan information and the like can be managed by matching with various serial numbers of a plurality of construction machines. Thus the lifespan times of a component can be followed through even in cases where the component has been re-mounted, and accurate lifespan times can be decided upon regardless of whether re-mounting has taken place or not.

The information management controller 1 does not just download data produced by the controller 1 to a service tool 18, but is also provided with an upload function whereby the data of a service tool 18 is read into memory within the controller.

Here, data inputting work can be easily carried out on a production line in a factory by uploading data from a computer into the controller.

What is claimed is:

1. An information management device for a construction machine, in which a plurality of on-board controllers in the construction machine are connected with freedom to communicate with each other by means of a serial communications line allowing communications in accordance with a predetermined communications protocol, and information relating to the construction machine is managed based on data acquired by each of the plurality of on-board controllers, wherein the information management device is arranged in such a way that on an inside of the construction machine is provided an information management controller which manages information about the inside of the construction machine, and on an outside of the construction machine is provided a monitoring station which manages information relating to at least one construction machine including the construction machine;

the serial communications line within the construction machine and the monitoring station are connected with freedom to communicate with each other via the information management controller; and the information management controller gathers, processes and stores data acquired by each of the plurality of on-board controllers, and sends the stored data to the monitoring station.

2. An information management device for a construction machine, in which a plurality of on-board controllers in the construction machine are connected with freedom to communicate with each other by means of a serial communications line allowing communications in accordance with a predetermined communications protocol, and information relating to the construction machine is managed based on data acquired by each of the plurality of on-board controllers, wherein the information management device is arranged in such a way that on an inside of the construction machine is provided an information management controller which manages information about the inside of the construction machine, and on an outside of the construction machine is provided an information gathering means which gathers information about the inside of the construction machine and stores it on a storage medium;

the serial communications line within the construction machine and the information gathering means are connected with freedom to communicate with each other via the information management controller; and the information management controller gathers, processes and stores data acquired by each of the plurality of on-board controllers, and collectively sends the stored data to the information gathering means.

3. An information management device for a construction machine, in which a plurality of on-board controllers in the construction machine are connected with freedom to communicate with each other by means of a first serial communications line allowing communications in accordance with a predetermined communications protocol, a frame signal is transmitted between the plurality of on-board controllers, data is sent and received between the plurality of on-board controllers, and data acquired by each of the plurality of on-board controllers is described in the frame signal, and information relating to the construction machine is gathered by reading the data described in the frame signal, wherein the information management device is arranged in such a way that on an inside of the construction machine is provided an information management controller which manages information about the inside of the construction machine;

an on-board controller which differs from the plurality of on-board controllers is connected in a freely communicating fashion with a second serial communications line allowing communications in accordance with a communications protocol which differs from the predetermined communications protocol;

the serial communications lines in the construction machine are inter-connected with freedom to communicate with each other via the information management controller; and the information management controller ensures that data is sent and received between an on-board controller connected to the second serial communication line and an on-board controller connected to the second serial communications line, and information relating to the construction machine is gathered by reading data respectively described in the frame signal transmitted over one of the serial communications lines and the frame signal transmitted over the other serial communications line.

4. An information management device for a construction machine, which gathers data about operating parameters with variable values during operation of an engine of the construction machine, and which computes a lifespan of each type of constituent part of the engine based on the data about operating parameters and manages information about the lifespan of each type of part so computed, wherein the information management device comprises a load frequency integrating means which divides a torque of the engine or a rotational speed of the engine into various levels, and integrates frequencies with which values of the operating parameters fall into the various levels, for each level until a predetermined time has elapsed;

a rotational variation range frequency integrating means which divides a variation range of the rotational speed of the engine into various levels, and integrates the frequencies with which the values of the operating parameters fall into the various levels, for each level until a predetermined time has elapsed;

a variation locus frequency integrating means which classifies a variation locus of the torque of the engine or a variation locus of the rotational speed of the engine into various loci, and integrates a frequency with which values of the operating parameters vary along each locus, for each locus until a predetermined time has elapsed; and a lifespan computing means which prearranges one of or a combination of two or more of the load frequency integrating means, the rotational variation range frequency integrating means and the variation locus frequency integrating means for each of types of part, and computes the lifespan for each type of part based on the integrated value obtained from the corresponding one or more frequency integrating means.

5. An information management device for a construction machine, which gathers data about operating parameters with variable values during operation of an engine of the construction machine, and which computes a lifespan of a hydraulic pump or a hydraulic motor actuated in accordance with driving of the engine based on the data about operating parameters, and manages the lifespan of the hydraulic pump or hydraulic motor so computed, wherein the information management device comprises bearing-part lifespan computing means which successively measures loads imposed on the hydraulic pump or hydraulic motor until a predetermined time has elapsed and, based on the measured successive load values, computes the lifespan of a bearing part comprised in the hydraulic pump or hydraulic motor;

a hydraulic-sealing part lifespan computing means which successively measures a temperature of the discharge hydraulic oil of the hydraulic pump or of an activating oil of the hydraulic motor until a predetermined time has elapsed and, based on the measured successive temperature values, computes the lifespan of a hydraulic-sealing part comprised in the hydraulic pump or hydraulic motor; and a lifespan computing means which computes the lifespan of the hydraulic pump or hydraulic motor based on various lifespan values obtained from the parts lifespan computing means.

6. An information management device for a construction machine, which computes a work volume of a construction machine comprising a working machine, and manages the computed work-volume information, wherein the information management device comprises a timing means which measures a length of time over which the working machine operates; and a work-volume computing means which computes the work volume based on the time measured by the timing means and a planned operating time of the construction machine.

7. An information management device for a construction machine, which computes a work volume of a construction machine comprising a working machine, a swiveling body and a traveling body, and which manages data of the computed work-volume, wherein the information management device comprises a working machine integrating means which integrates a frequency of operation or length of time of operation of the working machine, until a predetermined time has elapsed;

a swiveling-body integrating means which integrates a frequency of operation or length of time of operation of the swiveling body, until a predetermined time has elapsed;

a traveling-body integrating means which integrates a frequency of operation or length of time of operation of the traveling body, until a predetermined time has elapsed; and a work-volume computing means which computes the work volume based on a ratio of the integrated working-machine value obtained by the integration using the working machine integrating means, the integrated swiveling-body value obtained by the integration using the swiveling-body integrating means, and the integrated traveling-body value obtained by the integration using the traveling-body integrating means.

8. An information management device for a construction machine, in which a power source is turned on in accordance with a switch means, and in which there is management of information about an operating state of the construction machine comprising a working machine activated using an engine as a power source, wherein the information management device comprises a first timing means which measures a time during which the switch means is turned on;

a second timing means which measures a time during which the engine is operating;

a third timing means which measures a time during which the working machine is operating; and an operating information gathering means which determines values of differences between the times measured by the first, second and third timing means, and gathers information about the operating state of the construction machine based on the difference values.

* * * * *